United States Patent
Gerrity et al.

(10) Patent No.: US 10,455,284 B2
(45) Date of Patent: Oct. 22, 2019

(54) DYNAMIC CUSTOMIZATION AND MONETIZATION OF AUDIO-VISUAL CONTENT

(75) Inventors: Daniel A. Gerrity, Seattle, WA (US); William H. Gates, III, Medina, WA (US); Paul Holman, Seattle, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Richard T. Lord, Tacoma, WA (US); Robert W. Lord, Seattle, WA (US); Mark A. Malamud, Seattle, WA (US); Nathan P. Myhrvold, Bellevue, WA (US); John D. Rinaldo, Jr., Bellevue, WA (US); Keith D. Rosema, Olympia, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/602,058

(22) Filed: Aug. 31, 2012

(65) Prior Publication Data

US 2014/0068661 A1    Mar. 6, 2014

(51) Int. Cl.
*H04N 21/458* (2011.01)
*H04N 21/44* (2011.01)
(Continued)

(52) U.S. Cl.
CPC ....... *H04N 21/458* (2013.01); *H04N 21/2668* (2013.01); *H04N 21/441* (2013.01);
(Continued)

(58) Field of Classification Search
CPC ......... H04N 21/44016; H04N 21/2668; H04N 21/44222; H04N 21/441; H04N 21/4542;
(Continued)

(56) References Cited

U.S. PATENT DOCUMENTS

| | | |
|---|---|---|
| 4,260,229 A | 4/1981 | Bloomstein |
| 4,569,026 A | 2/1986 | Best |

(Continued)

OTHER PUBLICATIONS

PCT International Search Report; International App. No. PCT/US2013/053444; Jan. 17, 2014; pp. 1-2.
(Continued)

*Primary Examiner* — Benjamin R Bruckart
*Assistant Examiner* — Akshay Doshi

(57) ABSTRACT

Systems and methods for dynamic customization of audio-visual content are described. In some implementations, a process may include receiving at least one audio-visual core portion, receiving at least one selection signal indicative of a viewer preference, modifying the audio-visual core portion with at least one revised content portion in accordance with the at least one selection signal to create a dynamically customized audio-visual content, outputting the dynamically-customized audio-visual content; and receiving a consideration for the dynamically-customized audio-visual content.

30 Claims, 31 Drawing Sheets

(51) Int. Cl.
  *H04N 21/45* (2011.01)
  *H04N 21/442* (2011.01)
  *H04N 21/658* (2011.01)
  *H04N 21/2668* (2011.01)
  *H04N 21/441* (2011.01)
  *H04N 21/454* (2011.01)

(52) U.S. Cl.
  CPC . *H04N 21/44016* (2013.01); *H04N 21/44218* (2013.01); *H04N 21/44222* (2013.01); *H04N 21/4524* (2013.01); *H04N 21/4532* (2013.01); *H04N 21/4542* (2013.01); *H04N 21/6582* (2013.01)

(58) Field of Classification Search
  CPC ......... H04N 21/4532; H04N 21/44218; H04H 20/10; H04H 60/33; G06F 11/34; H04L 29/08675
  USPC ...................................... 725/32–36, 12, 14
  See application file for complete search history.

(56) References Cited

U.S. PATENT DOCUMENTS

| | | |
|---|---|---|
| 4,600,281 A | 7/1986 | Bloomstein |
| 4,827,532 A | 5/1989 | Bloomstein |
| 4,884,972 A | 12/1989 | Gasper |
| 5,111,409 A | 5/1992 | Gasper et al. |
| 5,623,587 A | 4/1997 | Bulman |
| 5,926,575 A | 7/1999 | Ohzeki et al. |
| 6,054,999 A | 4/2000 | Strandberg |
| 6,317,593 B1 | 11/2001 | Vossler |
| 7,020,888 B2 | 3/2006 | Reynolds et al. |
| 7,109,993 B2 | 9/2006 | Peleg et al. |
| 7,631,327 B2 | 12/2009 | Dempski et al. |
| 7,865,567 B1 | 1/2011 | Hendricks et al. |
| 7,945,926 B2 | 5/2011 | Dempski et al. |
| 8,016,653 B2 | 9/2011 | Pendleton et al. |
| 8,059,201 B2 | 11/2011 | Aarts et al. |
| 8,650,591 B2 | 2/2014 | Prieto |
| 8,725,559 B1 | 5/2014 | Kothari et al. |
| 8,726,312 B1* | 5/2014 | Hewinson ........ H04N 21/23614 725/32 |
| 9,965,768 B1 | 5/2018 | Doane et al. |
| 2002/0029384 A1 | 3/2002 | Griggs |
| 2002/0063714 A1 | 5/2002 | Haas et al. |
| 2002/0075318 A1 | 6/2002 | Yang et al. |
| 2002/0077900 A1 | 6/2002 | Thompson et al. |
| 2002/0120931 A1 | 8/2002 | Huber et al. |
| 2002/0133397 A1 | 9/2002 | Wilkins |
| 2003/0051256 A1 | 3/2003 | Uesaki et al. |
| 2003/0163371 A1 | 8/2003 | Beard |
| 2004/0181592 A1 | 9/2004 | Samra et al. |
| 2005/0125718 A1* | 6/2005 | Van Doorn ............ G08C 17/00 715/234 |
| 2005/0138656 A1 | 6/2005 | Moore et al. |
| 2006/0010240 A1 | 1/2006 | Chuah |
| 2006/0037037 A1 | 2/2006 | Miranz |
| 2006/0064717 A1 | 3/2006 | Shibata et al. |
| 2006/0074550 A1 | 4/2006 | Freer et al. |
| 2006/0116965 A1* | 6/2006 | Kudo .................... G06Q 99/00 705/52 |
| 2006/0174264 A1 | 8/2006 | Candelore |
| 2007/0005795 A1* | 1/2007 | Gonzalez ....................... 709/232 |
| 2007/0099684 A1 | 5/2007 | Butterworth |
| 2007/0122786 A1* | 5/2007 | Relan ..................... G09B 19/00 434/308 |
| 2007/0155307 A1 | 7/2007 | Ng et al. |
| 2007/0162951 A1 | 7/2007 | Rashkovskiy et al. |
| 2007/0165022 A1 | 7/2007 | Peleg et al. |
| 2007/0214473 A1 | 9/2007 | Barton et al. |
| 2007/0244750 A1 | 10/2007 | Grannan et al. |
| 2007/0271580 A1 | 11/2007 | Tischer et al. |
| 2007/0288978 A1 | 12/2007 | Pizzurro et al. |
| 2007/0294740 A1* | 12/2007 | Drake et al. ................... 725/131 |
| 2008/0028422 A1 | 1/2008 | Cohen et al. |
| 2008/0065468 A1 | 3/2008 | Berg et al. |
| 2008/0109843 A1* | 5/2008 | Ullah ..................... G06Q 30/02 725/34 |
| 2008/0126193 A1 | 5/2008 | Robinson |
| 2008/0168489 A1 | 7/2008 | Schraga |
| 2008/0215436 A1 | 9/2008 | Roberts |
| 2008/0250468 A1 | 10/2008 | Sullivan et al. |
| 2008/0266324 A1 | 10/2008 | Lynch et al. |
| 2008/0320545 A1 | 12/2008 | Schwartz |
| 2009/0048914 A1* | 2/2009 | Shenfield et al. .............. 705/14 |
| 2009/0083814 A1* | 3/2009 | Sekine ................. G11B 27/105 725/104 |
| 2009/0089249 A1 | 4/2009 | Verosub et al. |
| 2009/0118016 A1 | 5/2009 | Ben-Artzi et al. |
| 2009/0119704 A1 | 5/2009 | Dimitrova et al. |
| 2009/0138332 A1 | 5/2009 | Kanevsky et al. |
| 2009/0138805 A1 | 5/2009 | Hildreth |
| 2009/0144772 A1 | 6/2009 | Fink et al. |
| 2009/0172022 A1* | 7/2009 | Bathiche ............. G06F 17/2229 |
| 2009/0187944 A1* | 7/2009 | White et al. ..................... 725/46 |
| 2009/0210902 A1* | 8/2009 | Slaney et al. ................... 725/34 |
| 2009/0222853 A1 | 9/2009 | White et al. |
| 2009/0249409 A1 | 10/2009 | Bhogal et al. |
| 2009/0254931 A1* | 10/2009 | Pizzurro ................ G06Q 30/02 725/5 |
| 2009/0265214 A1 | 10/2009 | Jobs et al. |
| 2009/0282093 A1 | 11/2009 | Allard et al. |
| 2010/0077314 A1 | 3/2010 | Hushyar et al. |
| 2010/0083306 A1* | 4/2010 | Dempski ............... H04N 5/4401 725/34 |
| 2010/0088406 A1 | 4/2010 | Yu et al. |
| 2010/0094841 A1* | 4/2010 | Bardwil ............. G06F 17/30843 707/705 |
| 2010/0125544 A1 | 5/2010 | Lee et al. |
| 2010/0188579 A1* | 7/2010 | Friedman ................. H04N 5/45 348/565 |
| 2010/0202750 A1* | 8/2010 | Senftner ................. G06T 7/2046 386/278 |
| 2010/0257551 A1 | 10/2010 | Sweeney et al. |
| 2011/0010231 A1 | 1/2011 | Price et al. |
| 2011/0029099 A1 | 2/2011 | Benson |
| 2011/0064388 A1* | 3/2011 | Brown et al. .................. 386/285 |
| 2011/0066730 A1* | 3/2011 | Julia et al. ..................... 709/226 |
| 2011/0106744 A1* | 5/2011 | Becker ................... H04N 5/445 706/46 |
| 2011/0122094 A1 | 5/2011 | Tsang et al. |
| 2011/0125777 A1* | 5/2011 | Begeja ................... G06Q 30/02 707/769 |
| 2011/0200303 A1 | 8/2011 | Pujol Alcolado et al. |
| 2011/0211094 A1 | 9/2011 | Schraga |
| 2011/0271301 A1 | 11/2011 | Kennedy |
| 2011/0321075 A1 | 12/2011 | Brunkhorst et al. |
| 2011/0321082 A1 | 12/2011 | Weerasinghe |
| 2012/0005595 A1 | 1/2012 | Gavade et al. |
| 2012/0030699 A1 | 2/2012 | Amin |
| 2012/0060176 A1* | 3/2012 | Chai et al. ....................... 725/10 |
| 2012/0072936 A1 | 3/2012 | Small et al. |
| 2012/0072940 A1 | 3/2012 | Fuhrer |
| 2012/0072944 A1* | 3/2012 | Felt ................... H04N 21/42202 725/25 |
| 2012/0089908 A1 | 4/2012 | Miyaki |
| 2012/0094768 A1* | 4/2012 | McCaddon .............. A63F 13/12 463/42 |
| 2012/0110027 A1* | 5/2012 | Falcon ................... G06Q 30/02 707/802 |
| 2012/0112877 A1 | 5/2012 | Gravino et al. |
| 2012/0124456 A1 | 5/2012 | Perez et al. |
| 2012/0124604 A1 | 5/2012 | Small et al. |
| 2012/0135684 A1* | 5/2012 | Shrum et al. ................. 455/41.2 |
| 2012/0157197 A1* | 6/2012 | Watkins, Jr. ............. A63F 13/12 463/30 |
| 2012/0159327 A1 | 6/2012 | Law et al. |
| 2012/0223952 A1* | 9/2012 | Kanemaru ............... G06T 13/40 345/473 |
| 2012/0246223 A1 | 9/2012 | Newhouse et al. |
| 2012/0304206 A1 | 11/2012 | Roberts et al. |

(56) References Cited

U.S. PATENT DOCUMENTS

| | | |
|---|---|---|
| 2012/0317593 A1 | 12/2012 | Myslinski |
| 2012/0324493 A1 | 12/2012 | Holmdahl et al. |
| 2012/0327172 A1 | 12/2012 | El-Saban et al. |
| 2013/0006754 A1 | 1/2013 | Horvitz et al. |
| 2013/0014145 A1 | 1/2013 | Bhatia et al. |
| 2013/0024282 A1 | 1/2013 | Kansal et al. |
| 2013/0046637 A1* | 2/2013 | Slutsky ............... G06Q 30/0241 705/14.66 |
| 2013/0055087 A1* | 2/2013 | Flint .................... G11B 27/034 715/723 |
| 2013/0067052 A1* | 3/2013 | Reynolds ................ H04L 67/02 709/223 |
| 2013/0085805 A1 | 4/2013 | Kursar et al. |
| 2013/0091243 A1 | 4/2013 | Harnevo et al. |
| 2013/0132999 A1 | 5/2013 | Pandey |
| 2013/0145240 A1 | 6/2013 | Anderson et al. |
| 2013/0160051 A1 | 6/2013 | Armstrong et al. |
| 2013/0205332 A1 | 8/2013 | Martin et al. |
| 2013/0219417 A1 | 8/2013 | Gilson et al. |
| 2013/0283162 A1 | 10/2013 | Aronsson et al. |
| 2013/0290233 A1 | 10/2013 | Ferren et al. |
| 2013/0298180 A1* | 11/2013 | Mountain ......... G06F 17/30017 725/151 |
| 2013/0312018 A1 | 11/2013 | Elliott et al. |
| 2014/0007148 A1 | 1/2014 | Ratliff et al. |
| 2014/0036152 A1 | 2/2014 | Jackson et al. |
| 2014/0136318 A1 | 5/2014 | Alberth, Jr. et al. |
| 2014/0195345 A1 | 7/2014 | Lyren |
| 2014/0223464 A1 | 8/2014 | Moran et al. |

OTHER PUBLICATIONS

Young, Robert; "Google . . . the OS for Advertising," GIGAOM; Nov. 9, 2006; http://gigaom.com/2006/11/09/google-the-os-for-advertising/.

* cited by examiner

DYNAMIC CUSTOMIZATION AND MONETIZATION OF AUDIO-VISUAL CONTENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements: (1) the present application is related to, and claims the benefit of priority of, U.S. patent application Ser. No. 13/566,723, entitled "Dynamic Customization and Monetization of Audio-Visual Content," naming William H. Gates, III, Nathan P. Myhrvold, Edward K. Y. Jung, Casey Tegreene, Roderick A. Hyde, Lowell L. Wood, Jr., Keith D. Rosema, Pablos Holman, Daniel A. Gerrity, Jordin T. Kare, Royce A. Levien, Robert W. Lord, Richard T. Lord, Mark A. Malamud, and John D. Rinaldo, Jr., filed on Aug. 3, 2012, which is currently co-pending or which is an application of which a currently co-pending application is entitled to the benefit of the filing date;

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

FIELD OF THE DISCLOSURE

The present disclosure relates generally to dynamic customization of audio-visual broadcasts (e.g. television broadcasts, data streams, etc.), and more specifically, to monetization of dynamically customized audio-visual broadcasts.

BACKGROUND

Conventional audio-visual content streams, including television broadcasts or the like, typically consist of either pre-recorded content or live events that do not allow viewers to interact with or control any of the audio-visual content that is displayed. Various concepts have recently been introduced that allow for television broadcasts to be modified to a limited degree to accommodate viewer choices, as disclosed by U.S. Pat. Nos. 7,945,926 and 7,631,327 entitled "Enhanced Custom Content Television" issued to Dempski et al. Such prior art systems and methods are relatively limited, however, in their ability to accommodate and assimilate viewer-related information to provide a dynamically tailored audio-visual content stream. Systems and methods for monetization of dynamically customized audio-visual broadcasts that provide an improved degree of accommodation or assimilation of viewer-related choices and characteristics would have considerable utility.

SUMMARY

The present disclosure teaches systems and methods for dynamic customization and monetization of audio-visual content, such as television broadcasts, internet streams, podcasts, audio broadcasts, and the like. For example, in at least some implementations, a process for providing audio-visual content in accordance with the teachings of the present disclosure may include receiving at least one audio-visual core portion, receiving at least one selection signal indicative of a viewer preference, modifying the audio-visual core portion with at least one revised content portion in accordance with the at least one selection signal to create a dynamically customized audio-visual content, outputting the dynamically-customized audio-visual content, and receiving a consideration for the dynamically-customized audio-visual content.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

DETAILED DESCRIPTION

Techniques for dynamic customization and monetization of audio-visual content, such as television broadcasts or other audio-visual content streams, will now be disclosed in the following detailed description. It will be appreciated that many specific details of certain implementations will be described and shown in FIGS. 1 through 33 to provide a thorough understanding of such implementations. One skilled in the art will understand, however, that the present disclosure may have other possible implementations, and that such other implementations may be practiced with or without some of the particular details set forth in the following description.

In the following discussion, exemplary systems or environments for implementing one or more of the teachings of the present disclosure are described first. Next, exemplary flow charts showing various embodiments of processes for dynamic customization and monetization of audio-visual content in accordance with one or more of the teachings of the present disclosure are described.

Exemplary Systems for Dynamic Customization and Monetization of Audio-Visual Content Embodiments of methods and systems in accordance with the present disclosure may be implemented in a variety of environments. Initially, methods and systems in accordance with the present disclosure will be described in terms of dynamic customization of broadcasts. It should be remembered, however, that inventive aspects of such methods and systems may be applied to other environments that involve audio-visual content streams, and are not necessarily limited to the specific audio-visual broadcast implementations shown herein.

Figure 1:
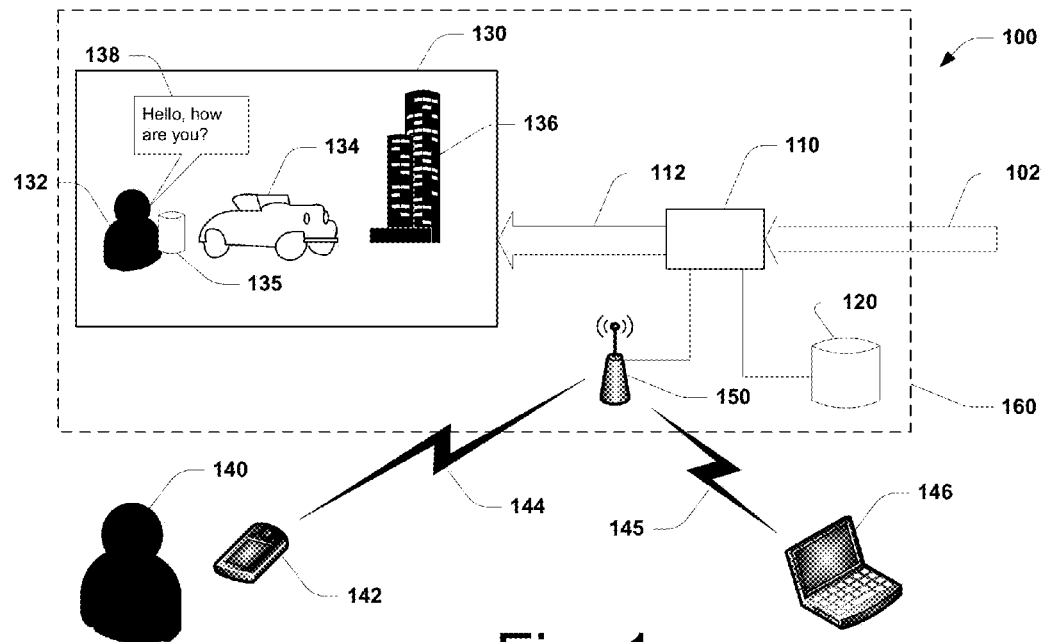
FIGS. 1-5 show schematic views of systems for dynamic customization and monetization of audio-visual content in accordance with possible implementations of the present disclosure.

FIG. 1 is a schematic view of a representative system 100 for dynamic customization and monetization of audio-visual content in accordance with an implementation of the present disclosure. In this implementation, the system 100 includes a processing component 110 that receives an audio-visual core portion 102, such as a television broadcast, and provides a dynamically customized audio-visual content 112 to a display 130. In some implementations, a viewer 140 uses a control device 142 to provide one or more selection signals 144 to a sensor 150 which, in turn, provides inputs corresponding to the selection signals 144 to the processing component 110. Alternately, the processing component 110 may operate without selection signals 144, such as by accessing default inputs stored within a memory. In some embodiments, the sensor 150 may receive further supplemental selection signals 145 from a processing device 146 (e.g. laptop, desktop, personal data assistant, cell phone, iPad, iPhone, etc.) associated with the viewer 140.

As described more fully below, based on the one or more selection signals 144 (or default inputs if specific inputs are not provided), the processing component 110 may modify one or more aspects of the incoming audio-visual core portion 102 to provide the dynamically customized audio-visual content 112 that is shown on the display 130. In at least some implementations, the processing component 110 may access a data store 120 having revised content portions stored therein to perform one or more aspects of the processes described below.

In at least some implementations, the processing component 110 may modify the core portion 102 by a rendering process. The rendering process is preferably a real-time (or approximately real-time) process. The rendering process may receive the core portion 102 as a digital signal stream, and may modify one or more aspects of the core portion 102, such as by replacing one or more portions of the core portion 102 with one or more revised content portions retrieved from the data store 120, in accordance with the selection signals 144 (and/or default inputs). It should be appreciated that, in some embodiments, the audio-visual core portion 102 may consist of solely an audio portion, or solely a visual (or video) portion, or may include a separate audio portion and a separate visual portion. In further embodiments, the audio-visual core portion 102 may include a plurality of audio portions or a plurality of visual portions, or any suitable combination thereof.

As used herein, the term "visual" in such phrases as "audio-visual portion," "audio-visual core portion," "visual portion," etc. is used broadly to refer to signals, data, information, or portions thereof that are associated with something which may eventually be viewed on a suitable display device by a viewer (e.g. video, photographs, images, etc.). It should be understood that a "visual portion" is not intended to mean that the signals, data, information, or portions thereof are themselves visible to a viewer. Similarly, as used herein, the term "audio" in such phrases as "audio-visual portion," "audio-visual core portion," "audio portion," etc. is used broadly to refer to signals, data, information, or portions thereof that are associated with something which may eventually produce sound on a suitable output device to a listener, and are not intended to mean that the signals, data, information, or portions thereof are themselves audible to a listener.

It will be appreciated that the components of the system 100 shown in FIG. 1 are merely exemplary, and represent one possible implementation of a system in accordance with the present disclosure. The various components of the system 100 may communicate and exchange information as needed to perform the functions and operations described herein. More specifically, in various implementations, each of the components of the system 100 may be implemented using software, hardware, firmware, or any suitable combinations thereof. Similarly, one or more of the components of the system 100 may be combined, or may be divided or separated into additional components, or additional components may be added, or one or more of the components may simply be eliminated, depending upon the particular requirements or specifications of the operating environment.

It will be appreciated that other suitable embodiments of systems for dynamic customization of audio-visual broadcasts may be conceived. For example, in some embodiments, the display 130 may be that associated with a conventional television or other conventional audio-visual display device, and the processing component 110 may be a separate component, such as a gaming device (e.g. Microsoft Xbox®, Sony Playstation®, Nintendo Wii®, etc.), a media player (e.g. DVD player, Blu Ray device, Tivo, etc.), or any other suitable component. Similarly, the sensor 150 may be a separate component or may alternately be integrated into the same component with the display 130 or the processing component 110. Similarly, the information store 120 may be a separate component or may alternately be integrated into the same component with the processing component 110, the display 130, or the sensor 150. Alternately, some or all of the components (e.g. the processing component 110, the information store 120, the display 130, the sensor 150, etc.) may be integrated into a common component 160.

Figure 2:
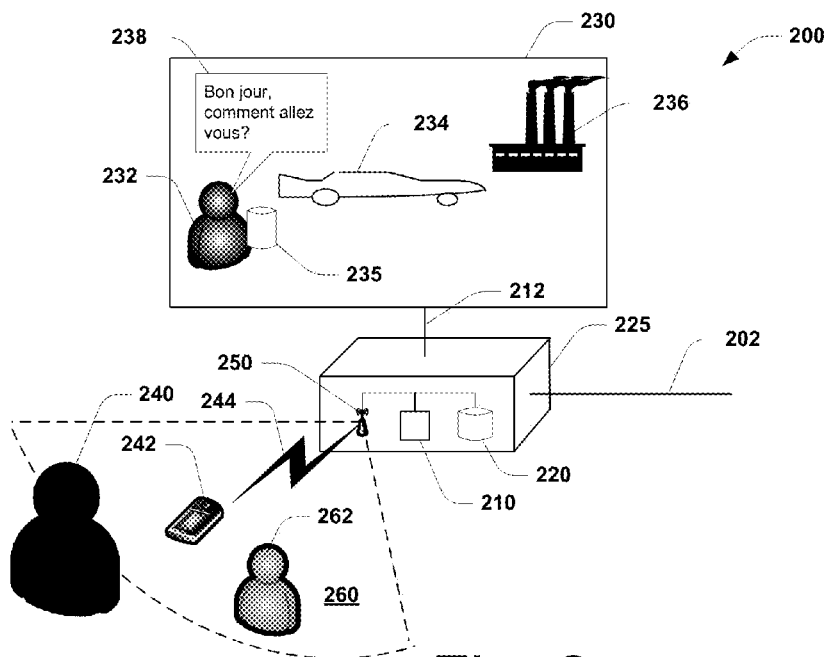

FIG. 2 is a schematic view of another representative system 200 for dynamic customization of television broadcasts in accordance with an implementation of the present disclosure. In this implementation, the system 200 includes a processing component 210 that receives an audio-visual core portion 202, and provides a dynamically customized audio-visual content 212 to a display 230. A viewer 240 uses a control device 242 to provide one or more selection signals 244 to a sensor 250 which, in turn, provides inputs corresponding to the selection signals 244 to the processing component 210. As described above, the processing component 210 may also operate without selection signals 244, such as by accessing default inputs stored within a memory 220. The sensor 250 may sense a field of view 260 to detect the viewer 240 or other one or more other persons 262. In the implementation shown in FIG. 2, the processing component 210, the memory 220, and the sensor 250 are housed within a single device 225.

As described more fully below, based on the one or more selection signals 244 (or default inputs if specific inputs are not provided), the processing component 210 may modify one or more aspects of the incoming audio-visual core portion 202 to provide the dynamically customized audio-visual content 212 that is shown on the display 230. The processing component 210 may also modify one or more aspects of the incoming audio-visual core portion 202 based on one or more persons (e.g. viewer 240, other person 262) sensed within the filed of view 260. In at least some implementations, the processing component 210 may retrieve revised content portions stored in the memory 220 to perform one or more aspects of the processes described below.

Figure 3:
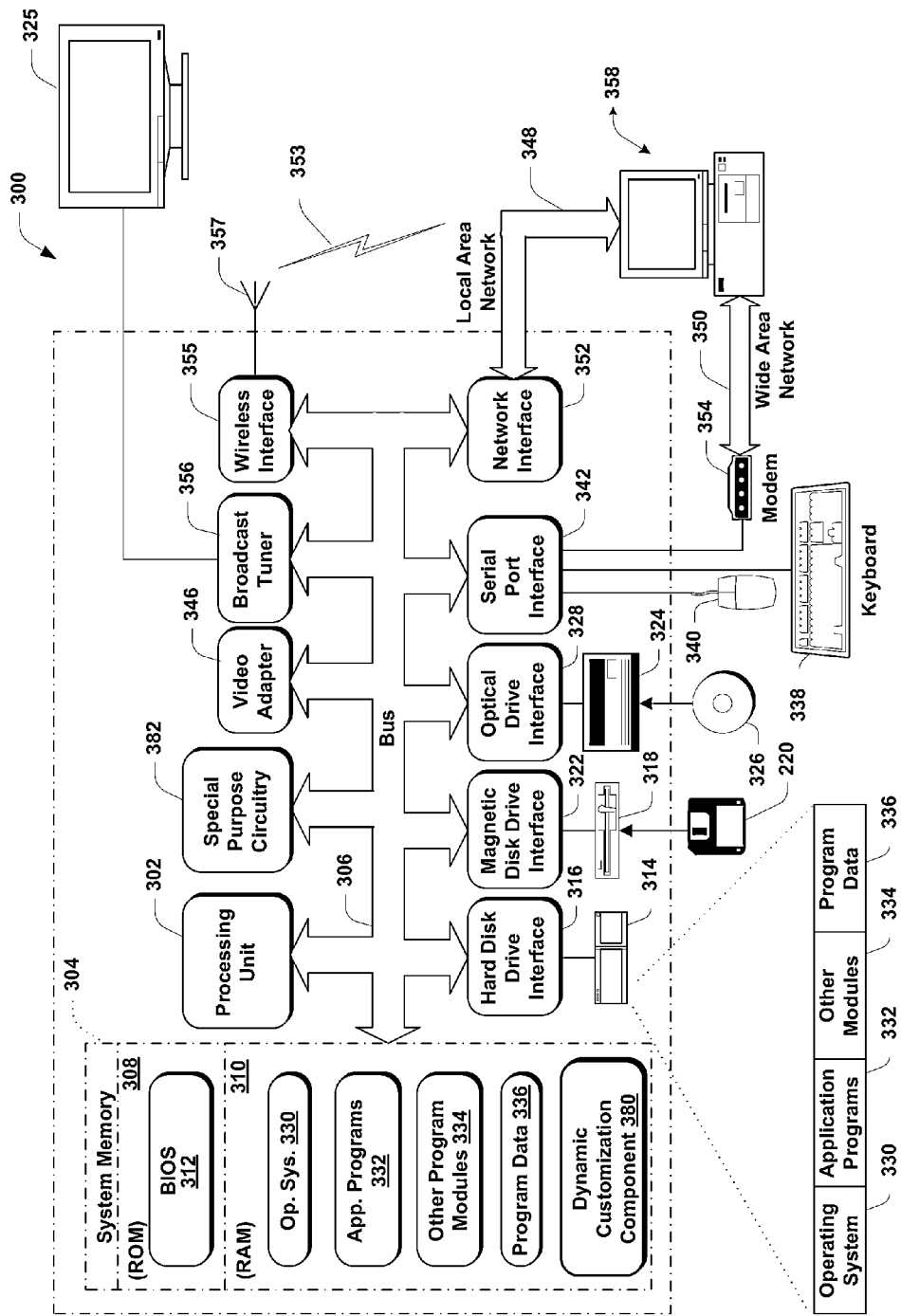

FIG. 3 shows another representative implementation of a system 300 for dynamic customization of audio-visual content in accordance with another possible embodiment. In this implementations the system 300 may include one or more processors (or processing units) 302, special purpose circuitry 382, a memory 304, and a bus 306 that couples various system components, including the memory 304, to the one or more processors 302 and special purpose circuitry 382 (e.g. ASIC, FPGA, etc.). The bus 306 represents one or more of any of several types of bus structures, including a memory bus or memory controller, a peripheral bus, an accelerated graphics port, and a processor or local bus using any of a variety of bus architectures. In this implementation, the memory 304 includes read only memory (ROM) 308 and random access memory (RAM) 310. A basic input/output system (BIOS) 312, containing the basic routines that help to transfer information between elements within the system 300, such as during start-up, is stored in ROM 308.

The exemplary system 300 further includes a hard disk drive 314 for reading from and writing to a hard disk (not shown), and is connected to the bus 306 via a hard disk driver interface 316 (e.g., a SCSI, ATA, or other type of interface). A magnetic disk drive 318 for reading from and writing to a removable magnetic disk 320, is connected to the system bus 306 via a magnetic disk drive interface 322. Similarly, an optical disk drive 324 for reading from or writing to a removable optical disk 326 such as a CD ROM, DVD, or other optical media, connected to the bus 306 via an optical drive interface 328. The drives and their associated computer-readable media provide nonvolatile storage of computer readable instructions, data structures, program modules and other data for the system 300. Although the exemplary system 300 described herein employs a hard disk, a removable magnetic disk 320 and a removable optical disk 326, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 3, a number of program modules may be stored on the memory 304 (e.g. the ROM 308 or the RAM 310) including an operating system 330, one or more application programs 332, other program modules 334, and program data 336 (e.g. the data store 320, image data, audio data, three dimensional object models, etc.). Alternately, these program modules may be stored on other computer-readable media, including the hard disk, the magnetic disk 320, or the optical disk 326. For purposes of illustration, programs and other executable program components, such as the operating system 330, are illustrated in FIG. 3 as discrete blocks, although it is recognized that such programs and components reside at various times in different storage components of the system 300, and may be executed by the processor(s) 302 or the special purpose circuitry 382 of the system 300.

A user may enter commands and information into the system 300 through input devices such as a keyboard 338 and a pointing device 340. Other input devices (not shown) may include a microphone, joystick, game pad, satellite dish, scanner, or the like. These and other input devices are connected to the processing unit 302 and special purpose circuitry 382 through an interface 342 that is coupled to the system bus 306. A monitor 325 (e.g. display 130, display 230, or any other display device) may be connected to the bus 306 via an interface, such as a video adapter 346. In addition, the system 300 may also include other peripheral output devices (not shown) such as speakers and printers.

The system 300 may operate in a networked environment using logical connections to one or more remote computers (or servers) 358. Such remote computers (or servers) 358 may be a personal computer, a server, a router, a network PC, a peer device or other common network node, and may include many or all of the elements described above relative to system 300. The logical connections depicted in FIG. 3 may include one or more of a local area network (LAN) 348 and a wide area network (WAN) 350. Such networking environments are commonplace in offices, enterprise-wide computer networks, intranets, and the Internet. In this embodiment, the system 300 also includes one or more broadcast tuners 356. The broadcast tuner 356 may receive broadcast signals directly (e.g., analog or digital cable transmissions fed directly into the tuner 356) or via a reception device (e.g., via sensor 150, sensor 250, an antenna, a satellite dish, etc.).

When used in a LAN networking environment, the system 300 may be connected to the local network 348 through a network interface (or adapter) 352. When used in a WAN networking environment, the system 300 typically includes a modem 354 or other means for establishing communications over the wide area network 350, such as the Internet. The modem 354, which may be internal or external, may be connected to the bus 306 via the serial port interface 342. Similarly, the system 300 may exchange (send or receive) wireless signals 353 (e.g. selection signals 144, signals 244, core portion 102, core portion 202, etc.) with one or more remote devices (e.g. remote 142, remote 242, computers 258, etc.), using a wireless interface 355 coupled to a wireless communicator 357 (e.g., sensor 150, sensor 250, an antenna, a satellite dish, a transmitter, a receiver, a transceiver, a photoreceptor, a photodiode, an emitter, a receptor, etc.).

In a networked environment, program modules depicted relative to the system 300, or portions thereof, may be stored in the memory 304, or in a remote memory storage device. More specifically, as further shown in FIG. 3, a dynamic customization component 380 may be stored in the memory 304 of the system 300. The dynamic customization component 380 may be implemented using software, hardware, firmware, or any suitable combination thereof. In cooperation with the other components of the system 300, such as the processing unit 302 or the special purpose circuitry 382, the dynamic customization component 380 may be operable to perform one or more implementations of processes for dynamic customization in accordance with the present disclosure.

It will be appreciated that while the system 300 shown in FIG. 3 is capable of receiving an audio-visual core portion (e.g. core portion 102, core portion 202, etc.) from an external source (e.g. via the wireless device 357, the LAN 348, the WAN 350, etc.), in further embodiments, the audio-visual core portion may itself be generated within the system 300, such as by playing media stored within the system memory 304, or stored within the hard disk drive 314, or played on the disk drive 318, the optical drive 328, or any other suitable component of the system 300. In some implementations, the audio-visual core portion may be generated by suitable software routines operating within the system 300.

Figure 4:
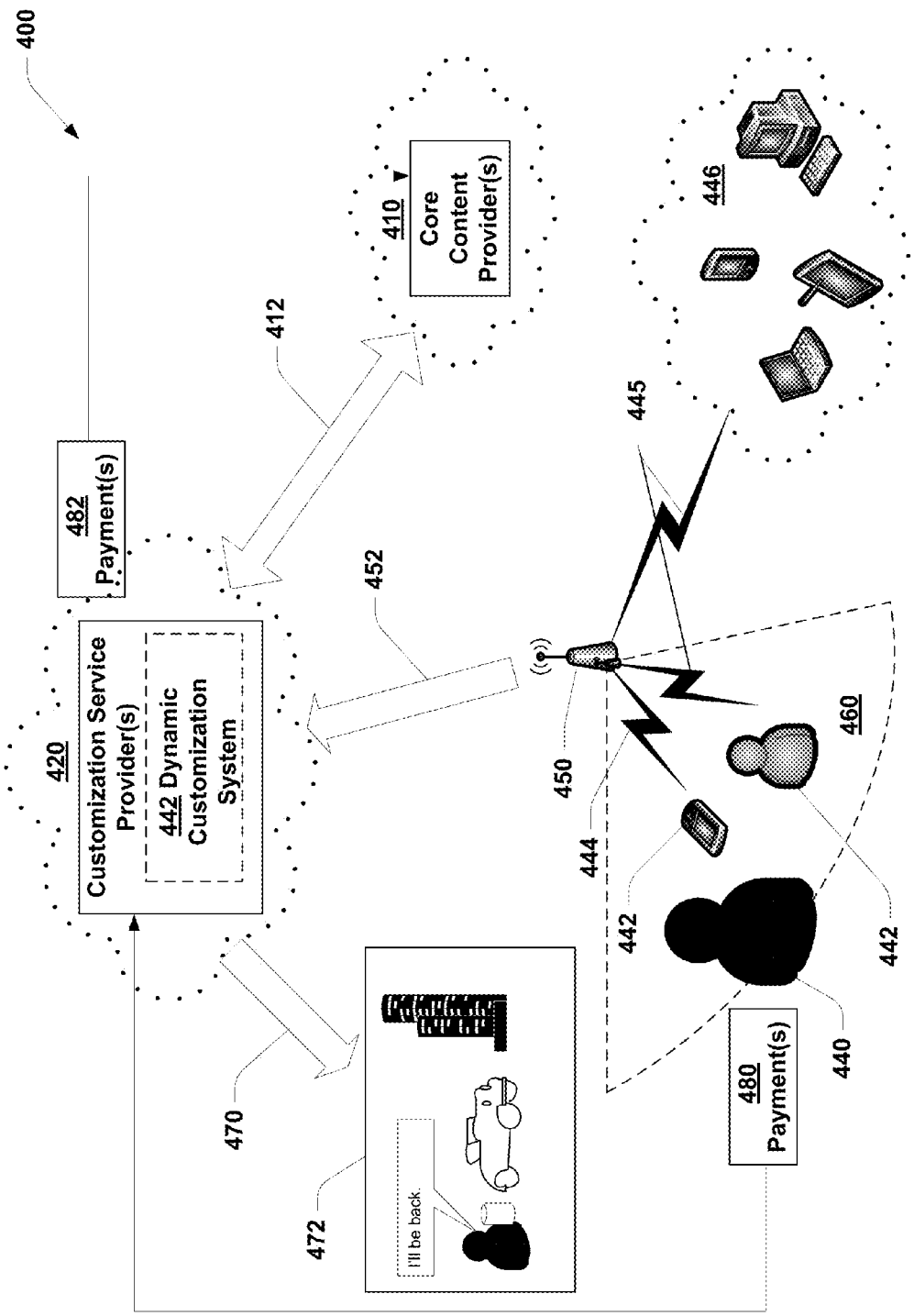

FIG. 4 is a schematic view of a representative system 400 for dynamic customization of audio-visual content in accordance with an alternate implementation of the present disclosure. In this implementation, the system 400 includes one or more core content providers 410 that provide one or more audio-visual core portions 412 to one or more customization service providers 420. The one or more customization service providers 420 include at least one dynamic customization system 422, which may include one or more of the components described above with respect to FIGS. 1-3.

It will be appreciated that, in at least some implementations, one or more of the core content providers 410, or one or more of the customization service providers 420, may be based or partially based in what is referred to as the "cloud" or "cloud computing," or may be provided using one or more "cloud services." For the purposes of this application, cloud computing is the delivery of computational capacity and/or storage capacity as a service. The "cloud" refers to one or more hardware and/or software components that deliver or assist in the delivery of computational and/or storage capacity, including, but not limited to, one or more of a client, an application, a platform, an infrastructure, and a server, and associated hardware and/or software. Cloud and cloud computing may refer to one or more of a computer, a processor, a storage medium, a router, a modem, a virtual machine (e.g., a virtual server), a data center, an operating system, a middleware, a hardware back-end, a software back-end, and a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., the Internet.

As used in this application, a cloud or cloud services may include one or more of infrastructure-as-a-service ("IaaS"), platform-as-a-service ("Paas"), software-as-a-service ("SaaS"), and desktop-as-a-service ("DaaS"). As a non-exclusive example, IaaS may include, e.g., one or more virtual server instantiations that may start, stop, access, and configure virtual servers and/or storage centers (e.g., providing one or more processors, storage space, and network resources on-demand, e.g., GoGrid and Rackspace). PaaS may include, e.g., one or more software and/or development tools hosted on an infrastructure (e.g., a computing platform and/or a solution stack from which the client can create software interfaces and applications, e.g., Microsoft Azure. SaaS may include, e.g., software hosted by a service provider and accessible over a network (e.g., the software for the application and the data associated with that software application are kept on the network, e.g., Google Apps, SalesForce). DaaS may include, e.g., providing desktop, applications, data, and services for the user over a network (e.g., providing a multi-application framework, the applications in the framework, the data associated with the applications, and services related to the applications and/or the data over the network, e.g., Citrix). The foregoing is intended to be exemplary of the types of systems referred to in this application as "cloud" or "cloud computing" and should not be considered complete or exhaustive.

As further shown in FIG. 4, a viewer 440 may provide one or more selection signals 444 using a manual input device 442. In some implementations, the one or more selections signals 444 may be provided to a sensor 450 which, in turn, provides selection inputs 452 corresponding to the selection signals 444 to the one or more dynamic customization service providers 420. Alternately, the sensor 450 may be eliminated, and the selection signals 444 may be communicated directly to the one or more dynamic customization service providers 420.

As further shown in FIG. 4, in some embodiments, the sensor 450 may receive one or more supplemental selection signals 445 from one or more electronic devices 446 (e.g. laptop, desktop, personal data assistant, cell phone, iPad, iPhone, etc.) associated with the viewer 440. As described above, the one or more supplemental selection signals 445 may be based on a variety of suitable information, including, for example, browsing histories, purchase records, call records, downloaded content, or any other suitable information or data. In some implementations, one or more supplemental selection signals 445 may be automatically determined from one or more characteristics of a viewing area 460, such as a presence of one or more additional viewers 442 (e.g. a child, spouse, friend, visitor, etc.).

In operation, the one or more customization service providers 420 receive the one or more selection inputs 452 (or default inputs if specific inputs are not provided), and the audio-visual core portion 412 from the one or more core content providers 610, and using the one or more dynamic customization systems 422, provide a dynamically customized audio-visual content 470 to a display 472 visible to the one or more viewers 440, 442 in the viewing area 460.

In at least some embodiments, one or more viewers 440, 442 may provide one or more payments (or other consideration) 480 to the one or more customization service providers 420 in exchange for the dynamically customized audio-visual content 470. Similarly, in at least some embodiments the one or more customization service providers 420 may provide one or more payments (or other consideration) 482 to the one or more core content providers 410 in exchange for the core audio-visual content 412. In some embodiments, the amounts of at least one of the one or more payments 480, or the one or more payments 482, may be at least partially determined using one or more processes in accordance with the teachings of the present disclosure, as described more fully below.

Again, it should be appreciated that, in some embodiments, the audio-visual core portion 412 may consist of solely an audio portion, or solely a visual (or video) portion, a separate audio portion, a separate visual portion, a plurality of audio portions, a plurality of visual portions, or any suitable combination thereof. Similarly, in various embodiments, the dynamically customized audio-visual core portion 470 may consist of solely an audio portion, or solely a visual (or video) portion, a separate audio portion, a separate visual portion, a plurality of audio portions, a plurality of visual portions, or any suitable combination thereof.

Figure 5:
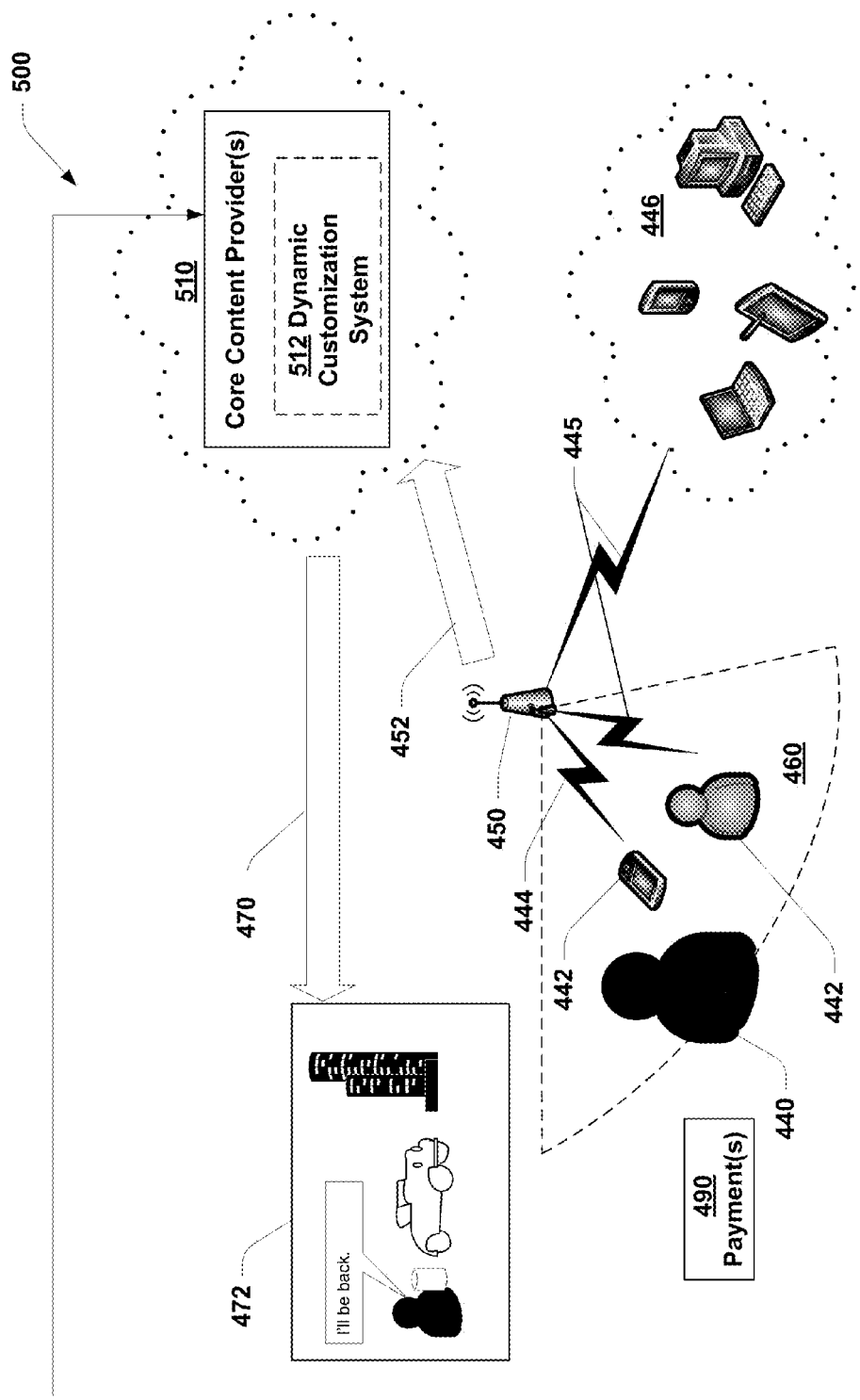

FIG. 5 shows a schematic view of another representative system 500 for dynamic customization of audio-visual broadcasts in accordance with an alternate implementation of the present disclosure. It will be appreciated that, in this implementation, the system 500 includes several of the same components as described above for the system 500 shown in FIG. 5, however, the one or more customization service providers 420 have been eliminated. For the sake of brevity, a description of the components described above with respect to FIG. 4 will not be repeated, but rather, the significant new aspects of the system 500 shown in FIG. 5 will be described.

As shown in FIG. 5, in some implementations, the one or more selection inputs 552 are provided to one or more core content providers 510. The one or more core content providers 510 have one or more dynamic customization systems 512. In operation, the one or more core content providers 510 receive the one or more selection inputs 512 (or default inputs if specific inputs are not provided), and modify an audio-visual core portion using the one or more dynamic customization systems 512 to provide a dynamically customized audio-visual content 470 to a display 472 visible to one or more viewers 440, 442 in a viewing area 460. Thus, in at least some implementations, the one or more customization service providers 420 shown in FIG. 4 may be eliminated, and the same one or more entities that normally provide an audio-visual core portion (e.g. normal television broadcasts, etc.) may perform the dynamic customization to provide the desired dynamically customized audio-visual content to viewers.

In at least some embodiments, the one or more viewers 440, 442 may provide one or more payments (or other consideration) 490 to the one or more core content providers 510 in exchange for the dynamically customized audio-visual content 470. In some embodiments, the amount of the one or more payments 490 may be defined using one or more processes in accordance with the teachings of the present disclosure, as described more fully below.

Of course, other environments may be implemented to perform the dynamic customization of audio-visual content in accordance with the present disclosure, and systems in accordance with the present disclosure are not necessarily limited to the specific implementations shown and described herein. Additional functions and operational aspects of systems in accordance with the teachings of the present disclosure are described more fully below.

Exemplary Processes for Dynamic Customization and Monetization of Audio-Visual Content In the following description of exemplary processes for dynamic-customization of audio-visual content, reference will be made to specific components of the exemplary systems described above and shown in FIGS. 1 through 5. It will be appreciated, however, that such references are merely exemplary, and that the inventive processes are not limited to being implemented on the specific systems described above, but rather, the processes described herein may be implemented on a wide variety of suitable systems and in a wide variety of suitable environments.

Figure 6:
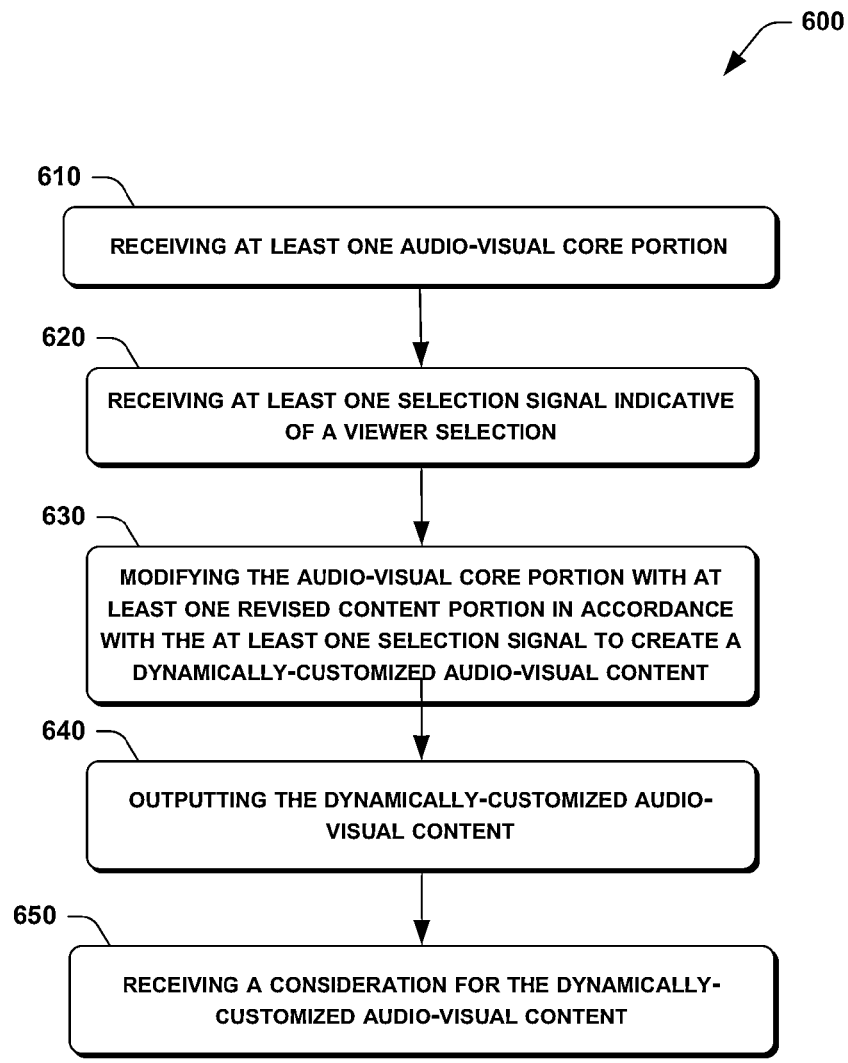
FIGS. 6 through 33 are flowcharts of processes for dynamic customization and monetization of audio-visual content in accordance with further possible implementations of the present disclosure.

FIG. 6 shows a flowchart of a process 600 for dynamic-customization of audio-visual content in accordance with an implementation of the present disclosure. In this implementation, the process 600 includes receiving at least one audio-visual core portion at 610, receiving at least one selection signal indicative of a viewer preference at 620, modifying the audio-visual core portion with at least one revised content portion in accordance with the at least one selection signal to create a dynamically customized audio-visual content at 630, outputting the dynamically-customized audio-visual content at 640, and receiving a consideration for the dynamically-customized audio-visual content at 650.

It will be appreciated that in accordance with the present disclosure, an incoming audio-visual core portion may be dynamically customized in accordance with a viewer's preferences, thereby increasing the viewer's satisfaction. The viewer (e.g. viewer 140) may indicate preferences for actresses (and actors) 132, vehicles 134, depicted products (or props) 135, environmental aspects 136 (e.g. buildings, scenery, setting, background, lighting, etc.), language 138, or other suitable preferences. In further implementations, virtually any desired aspect of the incoming core portion 102 may be dynamically customized in accordance with the viewer's selections, preferences, or characteristics as implemented by the selection signals 144.

Figure 7:
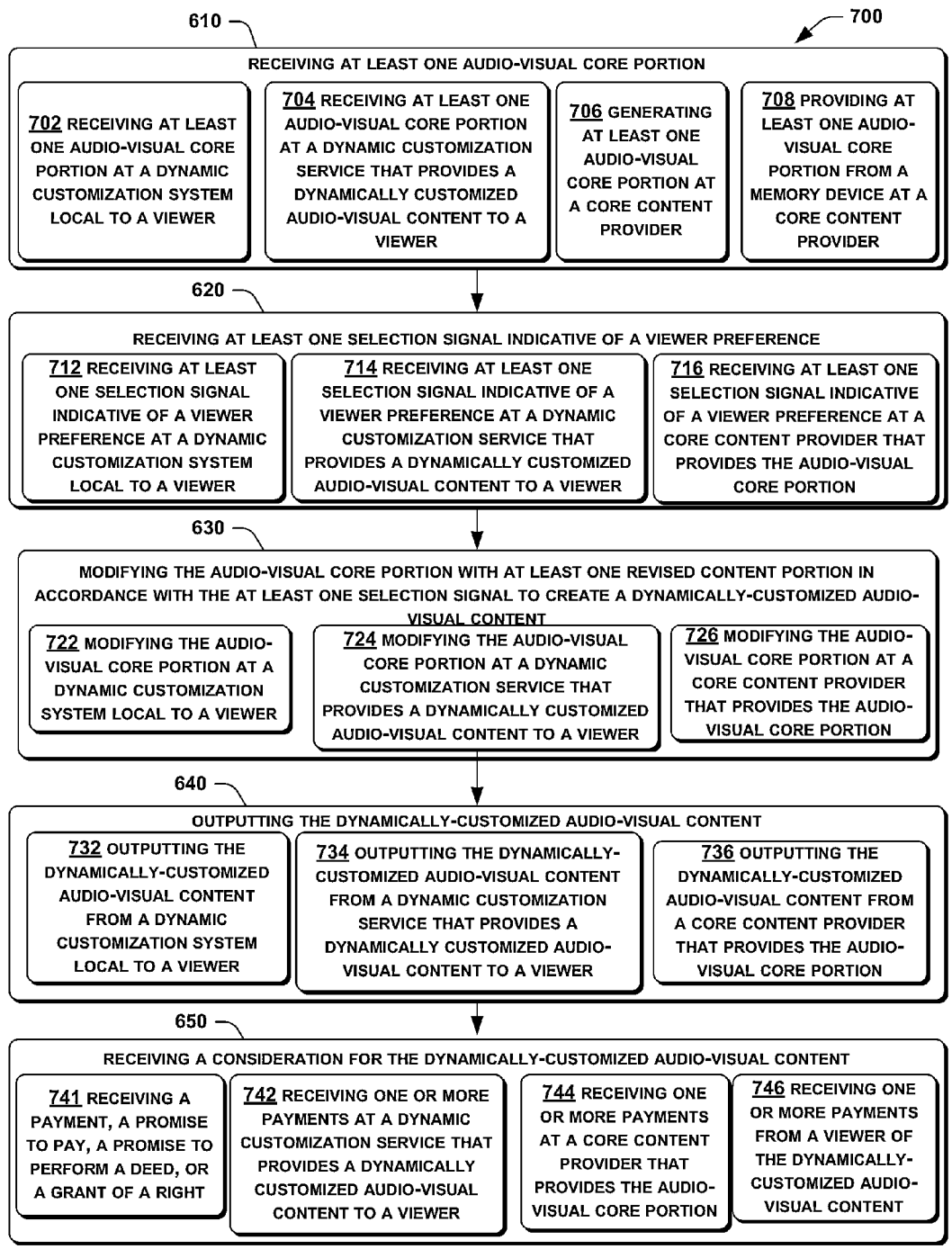

As shown in FIG. 7, in some implementations, receiving at least one audio-visual core portion at 610 may include receiving at least one audio-visual core portion at a dynamic customization system proximate to a viewer at 702 (e.g. dynamic customization system 100 shown in FIG. 1, a gaming console or other suitable processing device located in a viewer's home, etc.). In other implementations, receiving at least one audio-visual core portion at 610 may include receiving at least one audio-visual core portion at a dynamic customization service that provides a dynamically customized audio-visual content to a viewer at 704 (e.g. customization service provider 420 shown in FIG. 4). In still other implementations, receiving at least one audio-visual core portion at 610 may include generating at least one audio-visual core portion by a core content provider at 706 (e.g. core content provider 410 shown in FIG. 4). In additional implementations, receiving at least one audio-visual core portion at 610 may include providing at least one audio-visual core portion from a memory device by a core content provider at 708 (e.g. core content provider 510 shown in FIG. 5).

In still other implementations, receiving at least one selection signal indicative of a viewer preference at 620 may include receiving at least one selection signal indicative of a viewer preference at a dynamic customization system proximate to a viewer at 712 (e.g. dynamic customization system 100 shown in FIG. 1, an Xbox®, Playstation®, Wii®, personal computer, Mac®, or other suitable processing device located within a viewer's living space or sphere of influence, etc.). In further implementations, receiving at least one selection signal indicative of a viewer preference at 620 may include receiving at least one selection signal indicative of a viewer preference at a dynamic customization service that provides a dynamically customized audio-visual content to a viewer at 714 (e.g. customization service provider 420 shown in FIG. 4). In still further implementations, receiving at least one selection signal indicative of a viewer preference at 620 may include receiving at least one selection signal indicative of a viewer preference by a core content provider at 716 (e.g. core content provider 510 shown in FIG. 5).

As further shown in FIG. 7, in other implementations, modifying the audio-visual core portion with at least one revised content portion in accordance with the at least one selection signal to create a dynamically customized audio-visual content at 630 may include modifying the audio-visual core portion at a dynamic customization system proximate to a viewer at 722 (e.g. dynamic customization system 100 shown in FIG. 1). In further implementations, modifying the audio-visual core portion with at least one revised content portion in accordance with the at least one selection signal to create a dynamically customized audio-visual content at 630 may include modifying the audio-visual core portion at a dynamic customization service that provides a dynamically customized audio-visual content to a viewer at 724 (e.g. customization service provider 420 shown in FIG. 4). In still further implementations, modifying the audio-visual core portion with at least one revised content portion in accordance with the at least one selection signal to create a dynamically customized audio-visual content at 630 may include modifying the audio-visual core portion by a core content provider that provides the audio-visual core portion at 726 (e.g. core content provider 510 shown in FIG. 5).

In additional implementations, outputting the dynamically-customized audio-visual content at 640 may include outputting the dynamically-customized audio-visual content from a dynamic customization system proximate to a viewer at 732 (e.g. dynamic customization system 100 shown in FIG. 1, at the viewer's television set, at the viewer's viewing room, within the viewer's dwelling, etc.). In further implementations, outputting the dynamically-customized audio-visual content at 640 may include outputting the dynamically-customized audio-visual content from a dynamic customization service that provides the dynamically-customized audio-visual content to a viewer at 734 (e.g. customization service provider 420 shown in FIG. 4). In still further implementations, outputting the dynamically-customized audio-visual content at 640 may include outputting the dynamically-customized audio-visual content from a core content provider that provides the audio-visual core portion at 736 (e.g. core content provider 510 shown in FIG. 5).

As further shown in FIG. 7, in alternate implementations, receiving a consideration for the dynamically-customized audio-visual content at 650 may include receiving at least one of a payment, a promise to pay, a promise to perform a deed, or a grant of a right at 741. For example, in some implementations, the payment may be a one-time payment, a monthly subscription payment, a use-based or on-demand type of payment, or any other suitable payment. Similarly, in some implementations, the promise to pay may be a contractual commitment to provide future payment (or payments) based on amount or frequency of usage, or any other suitable terms. Further, the promise to perform a deed may include a promise to send payment, a promise to enable access private information, a promise to allow data gathering regarding viewing habits or preferences, or any other suitable promises. And the grant of a right may include a grant of access to gather personal data, a grant to share data gathered, a grant to perform market testing or market analysis, or any other suitable grant of one or more rights. Of course, these examples are merely exemplary, and the consideration received at 650 may be any suitable consideration as that term is generally understood in accordance with the principles of contracts and contract law, and as described more fully below.

As further shown in FIG. 7, in some implementations, receiving a consideration for the dynamically-customized audio-visual content at 650 may include receiving one or more payments at a dynamic customization service that provides a dynamically customized audio-visual content to a viewer at 742 (e.g. customization service provider 420 shown in FIG. 4). In further alternate implementations, receiving a consideration for the dynamically-customized audio-visual content at 650 may include receiving one or more payments by a core content provider that provides the audio-visual core portion at 744 (e.g. core content provider 510 shown in FIG. 5). Finally, in additional embodiments, receiving a consideration for the dynamically-customized audio-visual content at 650 may include receiving one or more payments from a viewer of the dynamically-customized audio-visual content at 746 (e.g. viewer 132, viewer 1840, etc.).

Figure 8:
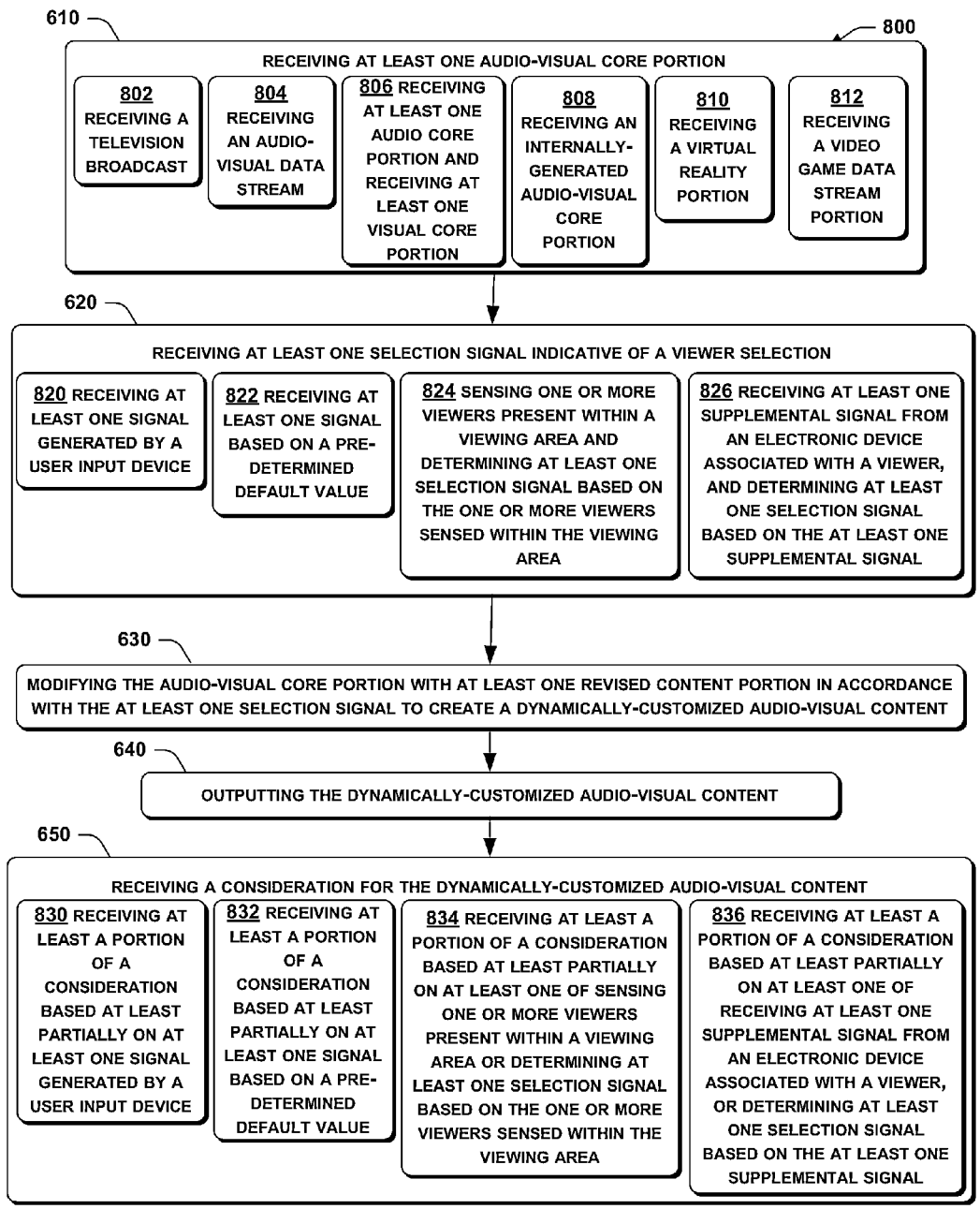

A wide variety of different types of input may serve as the audio-visual core portion. For example, as shown in FIG. 8, in some implementations, receiving at least one audio-visual core portion at 610 may include receiving a television broadcast at 802 (e.g. conventional wireless television broadcast, cable television broadcast, satellite television broadcast, etc.). In further implementations, receiving at least one audio-visual core portion at 610 may include receiving an audio-visual data stream at 804 (e.g. streaming audio-visual content via Internet, audio-visual data stream via LAN, etc.). In still further implementations, receiving at least one audio-visual core portion at 610 may include receiving at least one audio core portion and receiving at least one visual core portion at 806 (e.g. receiving an audio signal via a wireless connection and receiving a video data stream via a cable or vice versa, receiving an audio signal via a first wireless connection and receiving a video signal via a second wireless connection, etc.). In still further embodiments, receiving at least one audio-visual core portion at 610 may include receiving an internally-generated audio-visual core portion at 808 (e.g. receiving an audio-visual core portion from an internal media player, generating an audio-visual core portion using an internally-executing software routine, etc.). In additional implementations, receiving at least one audio-visual core portion at 610 may include receiving a virtual reality portion at 810 (e.g. receiving a core portion that provides a structure of a virtual reality, generating a virtual reality core portion using an internally-executing software routine or local processing unit, etc.). In still other implementations, receiving at least one audio-visual core portion at 610 may include receiving a video game data stream portion at 812 (e.g. receiving a video game signal as a data stream and where a server determines what is displayed on a viewer's display device based on the at least one selection signal, etc.).

As further shown in FIG. 8, a variety of different selection signals may be received in accordance with the present disclosure, and a variety of different payment schemes may be devised based on the different selection signal varieties. For example, in some implementations, receiving at least one selection signal indicative of a viewer preference at 620 may include receiving at least one selection signal generated by a user input device at 820 (e.g. receiving a signal generated by a keyboard, a joystick, a microphone, a touch screen, etc). In further implementations, receiving at least one selection signal indicative of a viewer preference at 620 may include receiving at least one selection signal based on a pre-determined default value at 822 (e.g. receiving one or more signals based on a user's previous selections stored in memory, or a pre-defined profile for a user stored in memory, etc.).

In other implementations, receiving at least one selection signal indicative of a viewer preference at 620 may include sensing one or more viewers present within a viewing area and determining at least one selection signal based on the one or more viewers sensed within the viewing area at 824 (e.g. sensing a parent and a child within a television viewing area, and determining a first selection signal based on the parent and a second selection signal based on the child, sensing a female and a male within a television viewing area, and determining a first selection signal based on the female and a second selection signal based on the male, etc.). In still other implementations, receiving at least one selection signal indicative of a viewer preference at 620 may include receiving at least one supplemental signal from an electronic device associated with a viewer (e.g. a cell phone, personal data assistant, laptop computer, desktop computer, smart phone, tablet, Apple iPhone, Apple iPad, Microsoft Surface, Kindle Fire, etc.) and determining at least one selection signal based on the at least one supplemental signal at 826.

It will be appreciated that various implementations of receiving a consideration for the dynamically-customized audio-visual content at 650 may be implemented in accordance with the various implementations of receiving at least one selection signal indicative of a viewer preference at 630. For example, as shown in FIG. 8, in some implementations, receiving a consideration for the dynamically-customized audio-visual content at 650 may include receiving at least a portion of a consideration based at least partially on the receiving at least one selection signal generated by the user input device at 830 (e.g. receiving a payment at least partially based on receiving a signal generated by a keyboard, a joystick, a microphone, a touch screen, etc). In other implementations, receiving a consideration for the dynamically-customized audio-visual content at 650 may include receiving at least a portion of a consideration based at least partially on the receiving at least one selection signal based on a pre-determined default value at 832 (e.g. receiving a payment at least partially based on receiving one or more signals based on a user's previous selections stored in memory, or a pre-defined profile for a user stored in memory, etc.).

In other implementations, receiving a consideration for the dynamically-customized audio-visual content at 650 may include receiving at least a portion of a consideration based at least partially on at least one of sensing one or more viewers present within a viewing area or determining at least one selection signal based on the one or more viewers sensed within the viewing area at 834 (e.g. receiving a payment at least partially based on sensing a parent and a child within a television viewing area and/or determining a first selection signal based on the parent and a second selection signal based on the child, receiving a payment at least partially based on sensing a female and a male within a television viewing area, and/or determining a first selection signal based on the female and a second selection signal based on the male, etc.). In still other implementations, receiving a consideration for the dynamically-customized audio-visual content at 650 may include receiving at least a portion of a consideration based at least partially on at least one of receiving at least one supplemental signal from an electronic device associated with a viewer or determining at least one selection signal based on the at least one supplemental signal at 836 (e.g. receiving a payment based at least partially on receiving at least one supplemental signal from a cell phone, personal data assistant, laptop computer, desktop computer, smart phone, tablet, Apple iPhone, Apple iPad, Microsoft Surface, Kindle Fire, etc. associated with a viewer, and/or determine at least one selection signal based on such a supplemental signal).

Figure 9:
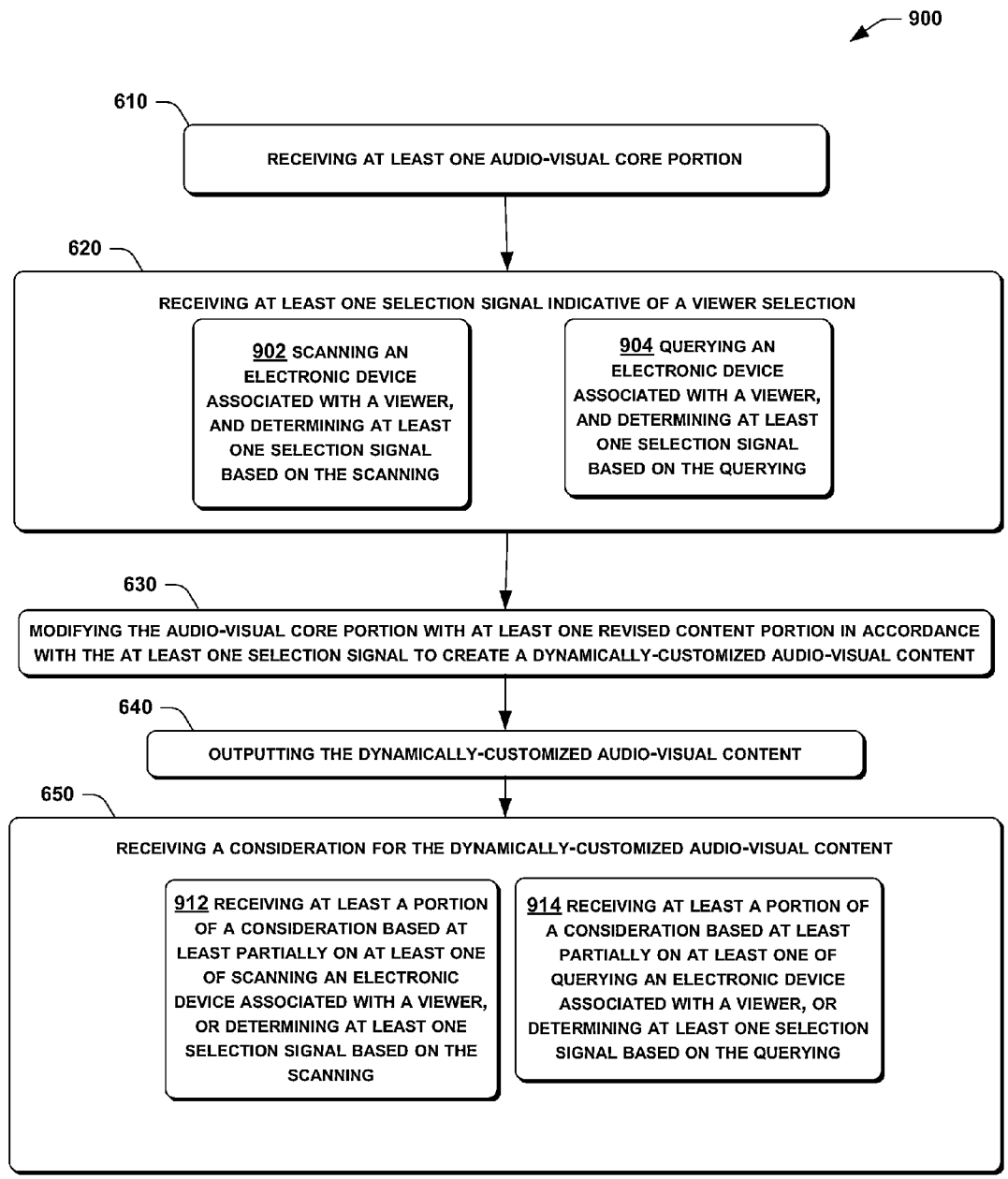

As shown in FIG. 9, in other implementations, receiving at least one selection signal indicative of a viewer preference at 620 may include scanning an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and determining at least one selection signal based on the scanning at 902. And in other implementations, receiving at least one selection signal indicative of a viewer preference at 620 may include querying an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and determining at least one selection signal based on the querying at 906.

As noted above, various implementations of receiving a consideration for the dynamically-customized audio-visual content at 650 may be implemented in accordance with the various implementations of receiving at least one selection signal indicative of a viewer preference at 630. For example, as shown in FIG. 9, in some implementations, receiving a consideration for the dynamically-customized audio-visual content at 650 may include receiving at least a portion of a consideration based at least partially on at least one of scanning an electronic device associated with a viewer or determining at least one selection signal based on the scanning at 912 (e.g. receiving a payment based at least partially on scanning a viewer's cell phone, personal data assistant, laptop computer, desktop computer, smart phone, tablet, Apple iPhone®, Apple iPad®, Microsoft Surface®, Kindle Fire®, etc., and/or determining a selection signal based on the scanning). And in other implementations, receiving a consideration for the dynamically-customized audio-visual content at 650 may include receiving at least a portion of a consideration based at least partially on at least one of querying an electronic device associated with a viewer or determining at least one selection signal based on the querying at 914 (e.g. receiving a payment based at least partially on a querying of a viewer's cell phone, personal data assistant, laptop computer, desktop computer, smart phone, tablet, Apple iPhone®, Apple iPad®, Microsoft Surface®, Kindle Fire®, etc., and/or determining a selection signal based on the querying).

Figure 10:
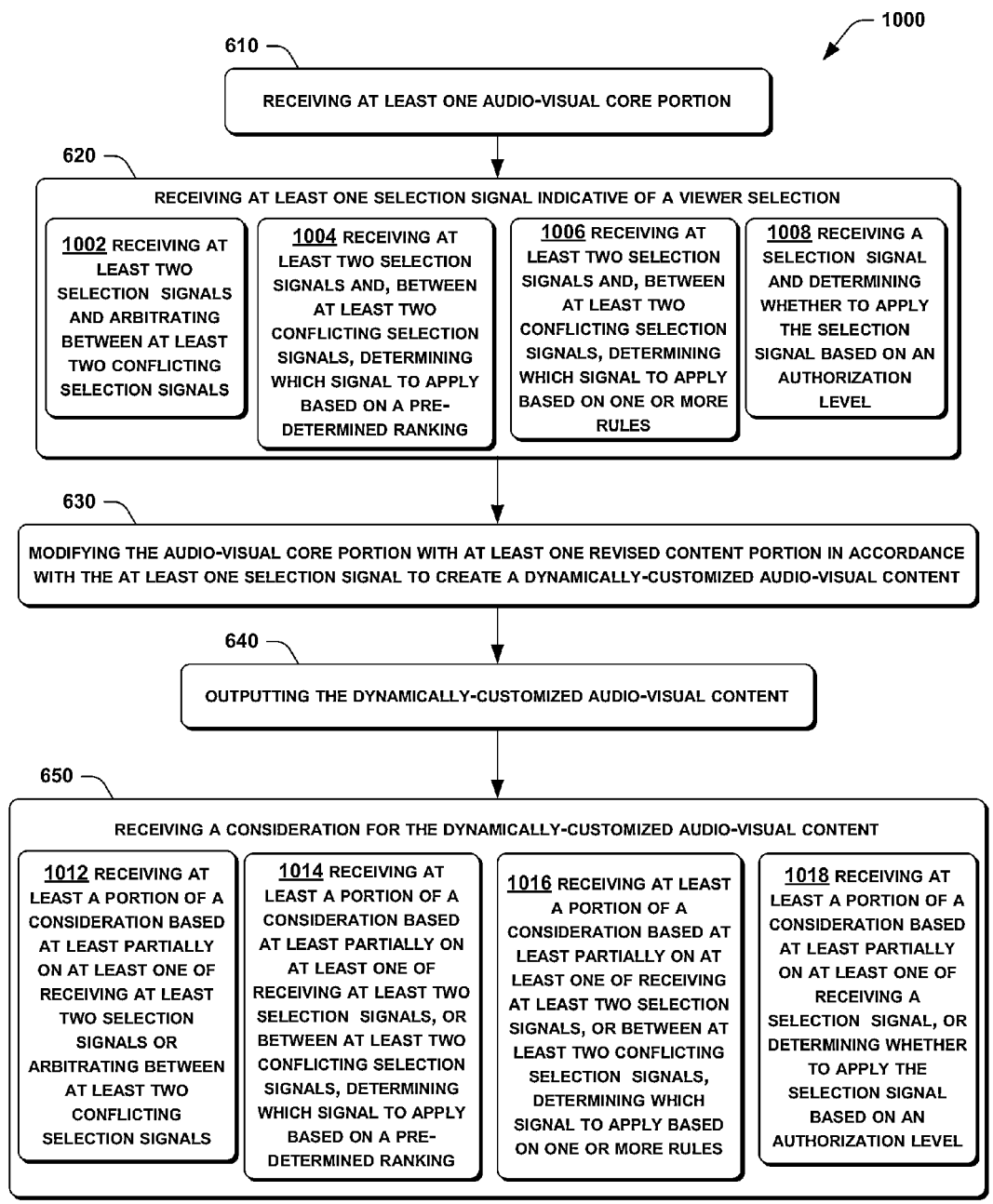

In some instances, one or more incoming signals may conflict with one or more other incoming signals. Such conflicts may be resolved in a variety of suitable ways. For example, as shown in FIG. 10, in some implementations, receiving at least one selection signal indicative of a viewer preference at 620 may include receiving at least two selection signals, and arbitrating between at least two conflicting selection signals at 1002 (e.g. receiving a first selection signal indicating a desire to view R-rated subject matter, and a second selection signal indicating that a child is in the viewing area, and arbitrating between the first and second selection signals such that the R-rated subject matter is not shown). In at least some implementations, receiving at least one selection signal indicative of a viewer preference at 620 may include receiving at least two selection signals, and between at least two conflicting selection signals, determining which signal to apply based on a pre-determined ranking at 1004 (e.g. receiving a first selection signal from a manual input device to view a movie in English and a second selection signal from a scanning of a laptop computer indicating a preference for French, and determining to apply the first selection signal based on a pre-determined ranking that gives higher ranking to manually input signals over signals determined by scanning; receiving a first selection signal from a parent's electronic device and a second selection signal from a child's electronic device, and determining to apply the first selection signal based on a ranking that gives priority to signals from the parent's electronic device over the child's electronic device, etc.).

In further implementations, receiving at least one selection signal indicative of a viewer preference at 620 may include receiving at least two selection signals, and between at least two conflicting selection signals, determining which signal to apply based on one or more rules at 1006 (e.g. receiving a first selection signal from a manual input device indicating a desire to view R-rated content, and a second selection signal from a scanning of a viewing area indicating a child in a viewing area, and determining not to display the R-rated content based on a rule that indicates that R-rated content will not be displayed when any child is present; receiving a first selection signal from a manual input device indicating a desire to view a first actor, and a second selection signal from an Android phone indicating a desire to view a second actor, and determining to apply the first selection signal based on a rule that gives priority to a manual input over an input determined from querying an electronic device, etc.). In still other implementations, receiving at least one selection signal indicative of a viewer preference at 620 may include receiving a selection signal, and determining whether to apply the selection signal based on an authorization level at 1008 (e.g. receiving a selection signal from a scanning of a viewer's electronic device indicating a desire to view R-rated content, and determining not to display the R-rated content based on a lack of authorization by an owner of the electronic device).

Again, it will be appreciated that various implementations of receiving a consideration for the dynamically-customized audio-visual content at 650 may be implemented in accordance with the various implementations of receiving at least one selection signal indicative of a viewer preference at 630. For example, as further shown in FIG. 10, in some implementations, receiving a consideration for the dynamically-customized audio-visual content at 650 may include receiving at least a portion of a consideration based at least partially on at least one of receiving at least two selection signals or arbitrating between at least two conflicting selection signals at 1012 (e.g. receiving a payment based at least partially on receiving and/or arbitrating between the first and second selection signals that conflict with respect to a preferred maturity level of content, a preferred language of content, a preferred setting of content, etc.). In at least some implementations, receiving a consideration for the dynamically-customized audio-visual content at 650 may include, receiving at least a portion of a consideration based at least partially on at least one of receiving at least two selection signals or between at least two conflicting selection signals, determining which signal to apply based on a pre-determined ranking at 1014 (e.g. receiving a payment based at least partially on receiving and/or determining which of two conflicting signals to apply based on a ranking hierarchy, etc.).

In further implementations, receiving a consideration for the dynamically-customized audio-visual content at 650 may include receiving at least a portion of a consideration based at least partially on at least one of receiving a selection signal, and determining whether to apply the selection signal based on an authorization level at 1016 (e.g. receiving a payment based at least partially on receiving first and second selection signals that conflict, and/or determining which to apply based on one or more rules regarding a content maturity level, a language preference, a content violence level, etc.). In still other implementations, receiving a consideration for the dynamically-customized audio-visual content at 650 may include receiving at least a portion of a consideration based at least partially on at least one of receiving a selection signal, and determining whether to apply the selection signal based on an authorization level at 1018 (e.g. receiving a payment based at least partially on receiving a selection signal from a scanning of a viewer's electronic device indicating a desire to view R-rated content and determining not to display the R-rated content based on a lack of authorization by an owner of the electronic device, etc.).

As noted above, a wide variety of aspects of audio-visual core portions may be dynamically customized in accordance with the preferences of a viewer. For example, as shown in FIG. 11, in at least some implementations, modifying the audio-visual core portion with at least one revised content portion in accordance with the at least one selection signal to create a dynamically customized audio-visual content at 630 may include replacing at least one actor of the audio-visual core portion with at least one replacement actor at 1102 (e.g. replacing the actor Brad Pitt in the movie Troy with replacement actor Mel Gibson, replacing the actor Meryl Streep in the movie The Manchurian Candidate with replacement actor Jessica Alba, the term "actor" being used herein a gender-neutral manner to include both males and females, etc.).

In further implementations, modifying the audio-visual core portion with at least one revised content portion in accordance with the at least one selection signal to create a dynamically customized audio-visual content at 630 may include replacing one or more of a facial appearance, a voice, a body appearance, or an apparel with a corresponding one or more of a replacement facial appearance, a replacement voice, a replacement body appearance, or a replacement apparel at 1104 (e.g. replacing a facial appearance and a voice of the actor Brad Pitt in the movie Troy with a replacement facial appearance of actor Mel Gibson and a replacement voice of actor Chris Rock, replacing a body appearance and an apparel of actor Meryl Streep in the movie The Manchurian Candidate with a replacement body appearance of actor Jessica Alba and a replacement apparel based on a browsing history of online clothing shopping recently viewed by the viewer as indicated by supplemental signals from the viewer's laptop computer, etc.).

Figure 11:
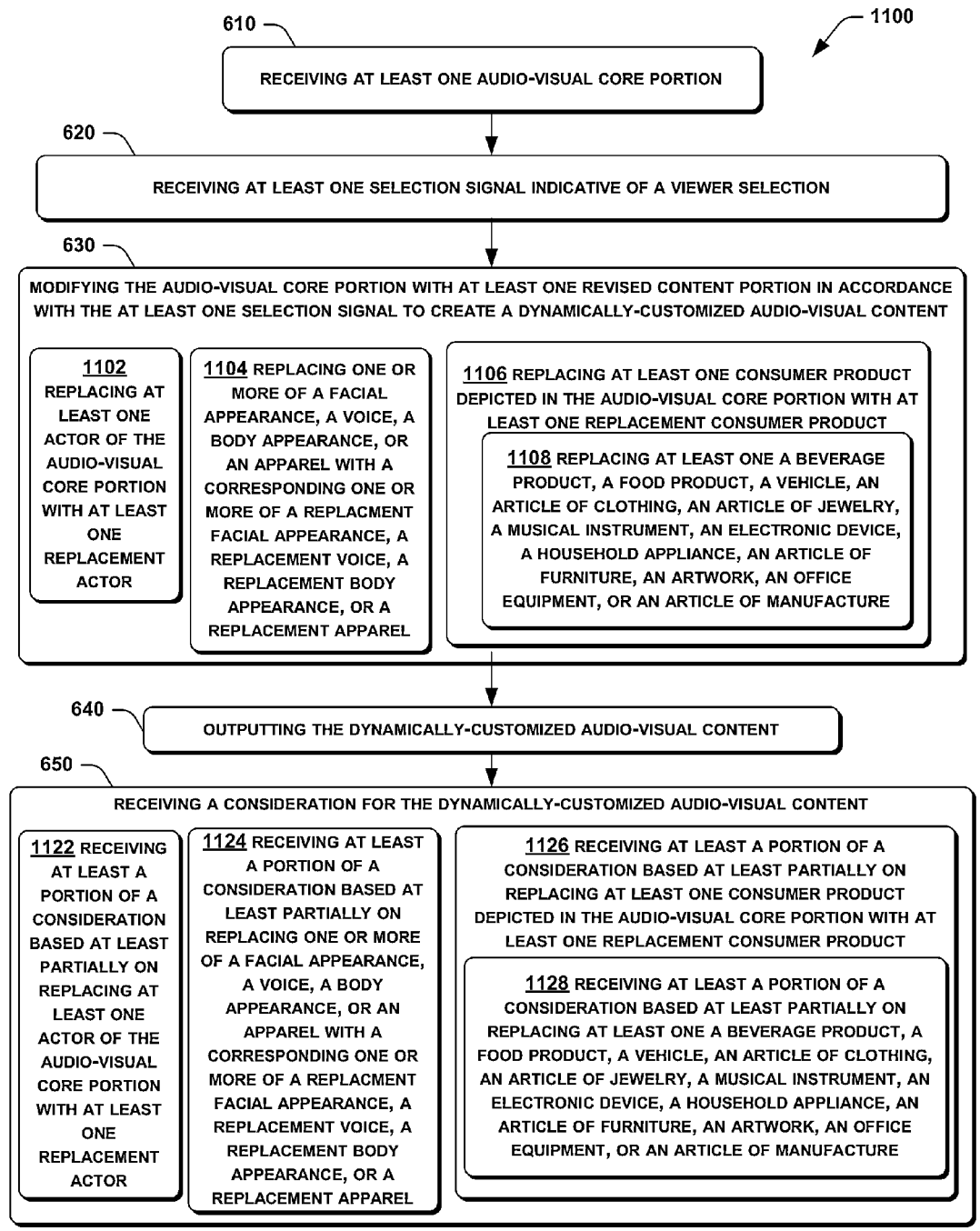

As further shown in FIG. 11, in still other implementations, modifying the audio-visual core portion with at least one revised content portion in accordance with the at least one selection signal to create a dynamically customized audio-visual content at 630 may include replacing at least one consumer product depicted in the audio-visual core portion with at least one replacement consumer product at 1106 (e.g. replacing a can of Coke® held by an actor in a television sitcom with a can of Dr. Pepper®, replacing a hamburger eaten by a character in a movie with a taco, replacing a Gibson® guitar played by a character in a podcast with a Fender® guitar, etc.). In further implementations, replacing at least one consumer product depicted in the audio-visual core portion with at least one replacement consumer product at 864 may include replacing at least one of a beverage product, a food product, a vehicle, an article of clothing, an article of jewelry, a musical instrument, an electronic device, a household appliance, an article of furniture, an artwork, an office equipment, or an article of manufacture at 1108.

It will be appreciated that various implementations of receiving a consideration for the dynamically-customized audio-visual content at 650 may be implemented in accordance with the various implementations of modifying the audio-visual core portion with at least one revised content portion in accordance with the at least one selection signal to create a dynamically customized audio-visual content at

630. For example, as further shown in FIG. 11, in some implementations, receiving a consideration for the dynamically-customized audio-visual content at 650 may include receiving at least a portion of a consideration based at least partially on replacing at least one actor of the audio-visual core portion with at least one replacement actor at 1122 (e.g. receiving a payment based at least partially on replacing an actor with a replacement actor, receiving a relatively higher payment based on replacing a lower-popularity actor with a higher-popularity actor, etc.).

In further implementations, receiving a consideration for the dynamically-customized audio-visual content at 650 may include receiving at least a portion of a consideration based at least partially on replacing one or more of a facial appearance, a voice, a body appearance, or an apparel with a corresponding one or more of a replacement facial appearance, a replacement voice, a replacement body appearance, or a replacement apparel at 1124 (e.g. receiving a payment based on replacing a facial appearance and a voice of a first actor with a second actor, receiving a relatively higher payment based at least partially on replacing a first body appearance of a lower-popularity actress with a body appearance of a higher-popularity actress, etc.).

In yet other implementations, receiving a consideration for the dynamically-customized audio-visual content at 650 may include receiving at least a portion of a consideration based at least partially on replacing at least one consumer product depicted in the audio-visual core portion with at least one replacement consumer product at 1126 (e.g. receiving a payment based at least partially on replacing a can of Coke® held by an actor in a television sitcom with a can of Dr. Pepper®, receiving a payment based at least partially on replacing a hamburger eaten by a character in a movie with a taco, replacing a Gibson® guitar played by a character in a podcast with a Fender® guitar, etc.). In further implementations, receiving a consideration for the dynamically-customized audio-visual content at 650 may include receiving at least a portion of a consideration based at least partially on replacing at least one of a beverage product, a food product, a vehicle, an article of clothing, an article of jewelry, a musical instrument, an electronic device, a household appliance, an article of furniture, an artwork, an office equipment, or an article of manufacture at 1108.

Figure 12:
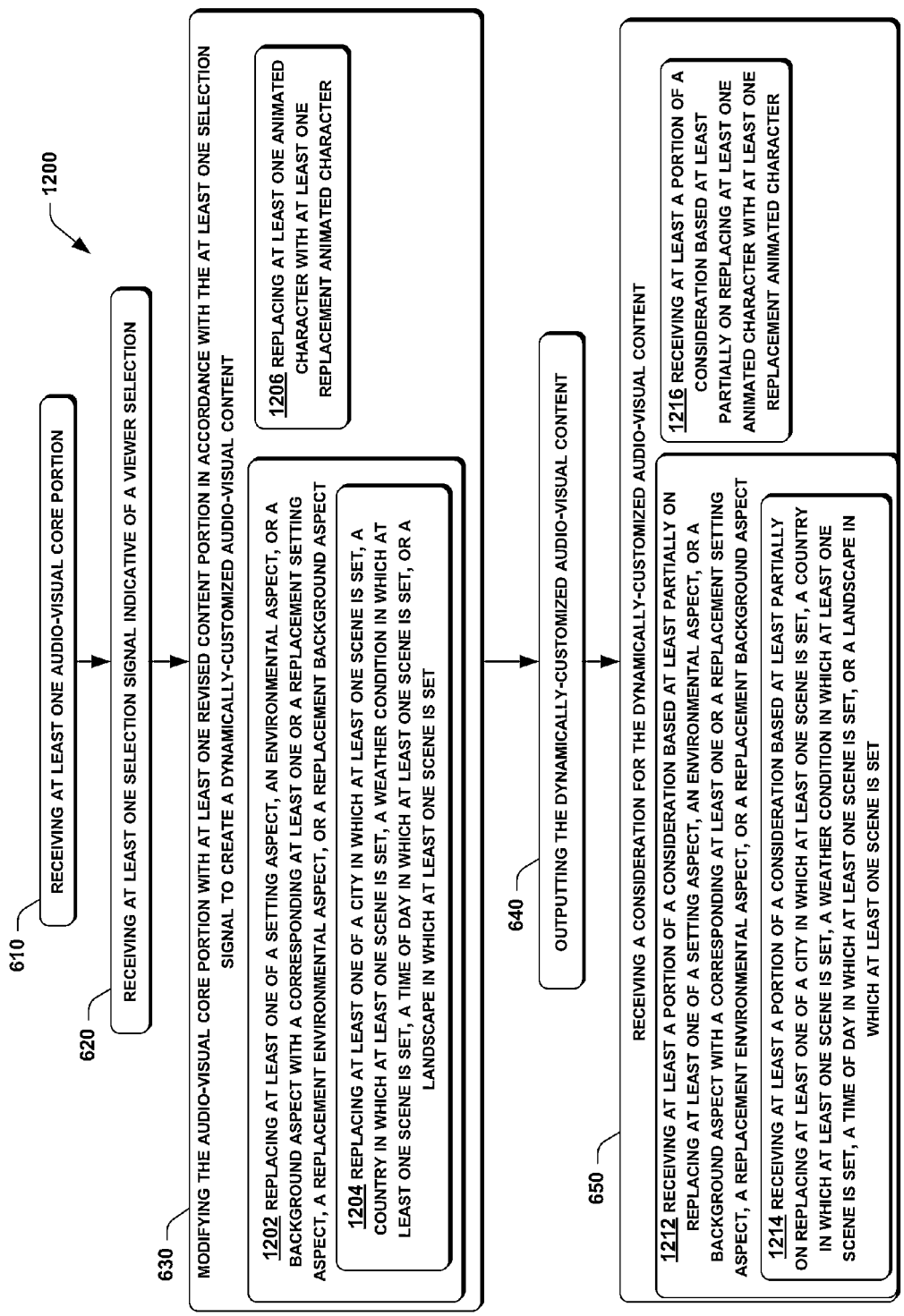

Referring now to FIG. 12, in additional implementations, modifying the audio-visual core portion with at least one revised content portion in accordance with the at least one selection signal to create a dynamically customized audio-visual content at 630 may include replacing at least one of a setting aspect, an environmental aspect, or a background aspect of the audio-visual core portion with a corresponding at least one of a replacement setting aspect, a replacement environmental aspect, or a replacement background aspect at 1202. For example, one or more scenes from a movie may be set in a different location (e.g. scenes from Sleepless in Seattle may be set in Cleveland, or a background with the Golden Gate bridge may be replaced with the Tower Bridge over the Thames River, etc.). Alternately, a weather condition may be replaced with a different weather condition (e.g. a surfing scene from Baywatch may take place in a snowstorm instead of a sunny day, etc.), or buildings in a background may be replaced with mountains or open countryside.

In some implementations, replacing at least one of a setting aspect, an environmental aspect, or a background aspect of the audio-visual core portion with a corresponding at least one of a replacement setting aspect, a replacement environmental aspect, or a replacement background aspect at 1202 may include replacing at least one of a city in which at least one scene is set, a country in which at least one scene is set, a weather condition in which at least one scene is set, a time of day in which at least one scene is set, or a landscape in which at least one scene is set at 1204.

As further shown in FIG. 12, in other implementations, modifying the audio-visual core portion with at least one revised content portion in accordance with the at least one selection signal to create a dynamically customized audio-visual content at 630 may include replacing at least one animated character with at least one replacement animated character at 1206 (e.g. replacing a cartoon Snow White from Snow White and the Seven Dwarfs with a cartoon Alice from Alice in Wonderland, replacing an animated elf with an animated dwarf, etc.).

Again, various implementations of receiving a consideration for the dynamically-customized audio-visual content at 650 may be implemented in accordance with the various implementations of modifying the audio-visual core portion with at least one revised content portion in accordance with the at least one selection signal to create a dynamically customized audio-visual content at 630. For example, as further shown in FIG. 12, in some implementations, receiving a consideration for the dynamically-customized audio-visual content at 650 may include receiving at least a portion of a consideration based at least partially on replacing at least one of a setting aspect, an environmental aspect, or a background aspect of the audio-visual core portion with a corresponding at least one of a replacement setting aspect, a replacement environmental aspect, or a replacement background aspect at 1212 (e.g. receiving a payment based at least partially on replacing scenes set in a first building setting with scenes set in a second building setting, etc.). In further implementations, receiving a consideration for the dynamically-customized audio-visual content at 650 may include receiving at least a portion of a consideration based at least partially on replacing at least one of a city in which at least one scene is set, a country in which at least one scene is set, a weather condition in which at least one scene is set, a time of day in which at least one scene is set, or a landscape in which at least one scene is set at 1214.

In still other implementations, receiving a consideration for the dynamically-customized audio-visual content at 650 may include receiving at least a portion of a consideration based at least partially on replacing at least one animated character with at least one replacement animated character at 1216 (e.g. receiving a payment based at least partially on replacing a cartoon Snow White with a cartoon Alice, receiving a payment based at least partially on replacing a cartoon Cartman with a cartoon Kenny, etc.).

Figure 13:
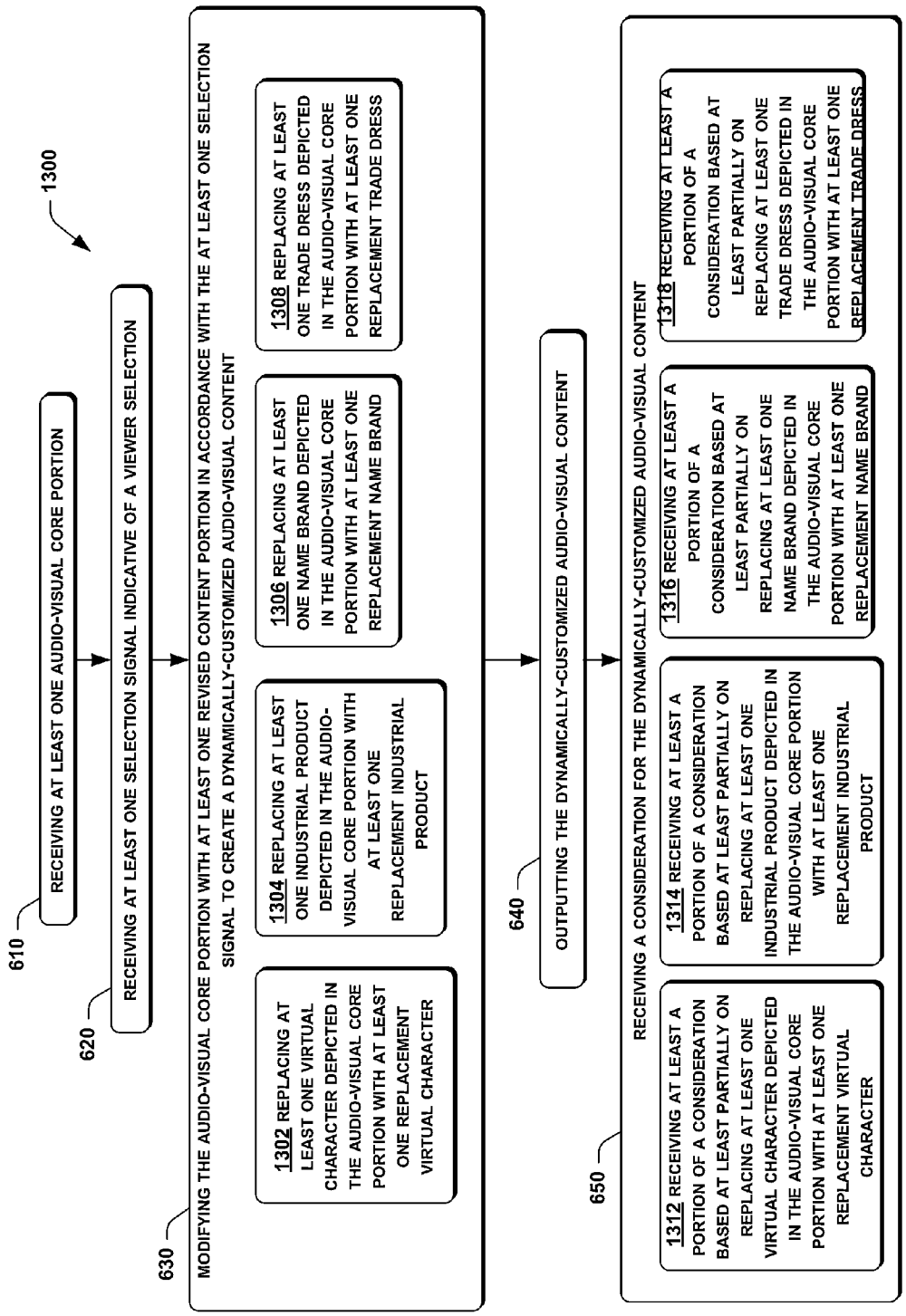

With reference to FIG. 13, in further implementations, modifying the audio-visual core portion with at least one revised content portion in accordance with the at least one selection signal to create a dynamically customized audio-visual content at 630 may include replacing at least one virtual character with at least one replacement virtual character at 1302 (e.g. replacing a virtual warrior with a virtual wizard, etc.). In still other implementations, modifying the audio-visual core portion with at least one revised content portion in accordance with the at least one selection signal to create a dynamically customized audio-visual content at 630 may include replacing at least one industrial product depicted in the audio-visual core portion with at least one replacement industrial product at 1304 (e.g. replacing a nameplace on a milling machine from "Cincinnati" to "Bridgeport" in a factory scene, replacing a name of a shipping line and/or the colors on a container ship from "Maersk" to "Evergreen," etc.).

In still further implementations, modifying the audio-visual core portion with at least one revised content portion in accordance with the at least one selection signal to create a dynamically customized audio-visual content at 630 may include replacing at least one name brand depicted in the audio-visual core portion with at least one replacement name brand at 1306 (e.g. replacing a leather label on character's pants from "Levis" to "J Brand," replacing an Izod alligator on a character's shirt with a Ralph Lauren horse logo, replacing a shoe logo from "Gucci" to "Calvin Klein," etc.). In yet other implementations, modifying the audio-visual core portion with at least one revised content portion in accordance with the at least one selection signal to create a dynamically customized audio-visual content at 630 may include replacing at least one trade dress depicted in the audio-visual core portion with at least one replacement trade dress at 1308 (e.g. replacing uniforms, packaging, colors, signs, logos, and any other items associated with a trade dress of "McDonald's" restaurant with corresponding trade dress items associated with "Burger King" restaurant, replacing brown trucks and uniforms associated with the "UPS" delivery company with red and yellow trucks and uniforms associated with the "DHL Express" delivery company, replacing helmets and jerseys associated with the Minnesota Vikings with replacement helmets and jerseys associated with the Seattle Seahawks, etc.).

Again, various implementations of receiving a consideration for the dynamically-customized audio-visual content at 650 may be implemented in accordance with the various implementations of modifying the audio-visual core portion with at least one revised content portion in accordance with the at least one selection signal to create a dynamically customized audio-visual content at 630. For example, as further shown in FIG. 13, in some implementations, receiving a consideration for the dynamically-customized audio-visual content at 650 may include receiving at least a portion of a consideration based at least partially on replacing at least one virtual character with at least one replacement virtual character at 1312 (e.g. receiving a payment based on replacing a virtual warrior with a virtual wizard, etc.). In still other implementations, receiving a consideration for the dynamically-customized audio-visual content at 650 may include receiving at least a portion of a consideration based at least partially on replacing at least one industrial product depicted in the audio-visual core portion with at least one replacement industrial product at 1314 (e.g. receiving a payment based on replacing a nameplace on a milling machine from "Cincinnati" to "Bridgeport" in a factory scene, replacing a name of a shipping line and/or the colors on a container ship from "Maersk" to "Evergreen," etc.).

In other implementations, receiving a consideration for the dynamically-customized audio-visual content at 650 may include receiving at least a portion of a consideration based at least partially on replacing at least one name brand depicted in the audio-visual core portion with at least one replacement name brand at 1316 (e.g. receiving a payment based at least partially on replacing a leather label on character's pants, replacing a trademark on a character's shirt, or replacing a logo on a character's computer, etc.). In yet other implementations, modifying the audio-visual core portion with at least one revised content portion in accordance with the at least one selection signal to create a dynamically customized audio-visual content at 630 may include receiving at least a portion of a consideration based at least partially on replacing at least one trade dress depicted in the audio-visual core portion with at least one replacement trade dress at 1318 (e.g. receiving payment based at least partially on replacing uniforms, packaging, colors, signs, logos, and any other items associated with a trade dress of "McDonald's" restaurant with corresponding trade dress items associated with "Burger King" restaurant, receiving payment based on replacing helmets and jerseys associated with the Dallas Cowboys with those of the Detroit Lions so a viewer may watch a depiction of the Lions winning a Super Bowl, etc.).

Figure 14:
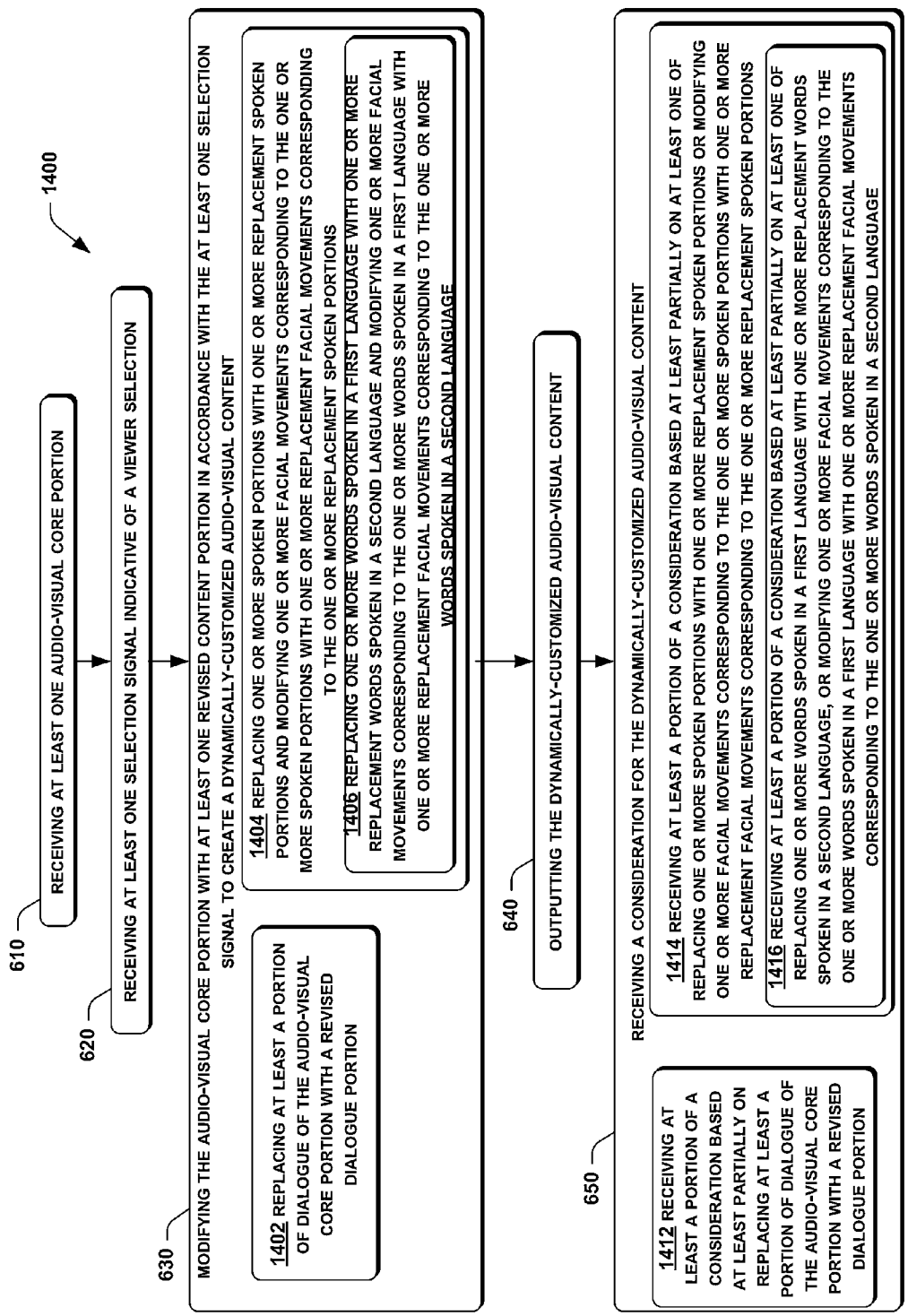

Additional possible implementations of modifying the audio-visual core portion with at least one revised content portion in accordance with the at least one selection signal to create a dynamically customized audio-visual content at 630 are shown in FIG. 14. For example, in some implementations, modifying the audio-visual core portion with at least one revised content portion in accordance with the at least one selection signal to create a dynamically customized audio-visual content at 630 may include replacing at least a portion of dialogue of the audio-visual core portion with a revised dialogue portion at 1402. For example, based on the at least one selection signal indicative of a viewer selection (e.g. a viewer selection indicating a desire for no profanity, or based on automatic detection using a sensor of a child entering a viewing area, etc.) at 620, a portion of dialogue of a movie that contains profanity or that may otherwise be offensive to the viewer is replaced with a replacement portion of dialogue that is not offensive to the viewer (e.g. a dialogue of a movie is modified from an R-rated dialogue to a lower-rated dialogue, such as PG-13-rated dialogue or a G-rated dialogue, such as "Frankly, my dear, I don't give a damn" being replaced with "Frankly, my dear, I don't really care", a dialogue that is threatening or violent may be replaced with a less-threatening or less-violent dialogue, etc.).

In some implementations, modifying the audio-visual core portion with at least one revised content portion in accordance with the at least one selection signal to create a dynamically customized audio-visual content at 630 may include replacing one or more spoken portions with one or more replacement spoken portions (e.g. replacing a profane word, such as "damn," with a non-profane word, such as "darn," replacing a first laughter, such as a "tee hee hee," with a second laugher, such as a "ha ha ha," etc.) and modifying one or more facial movements corresponding to the one or more spoken portions with one or more replacement facial movements corresponding to the one or more replacement spoken portions (e.g. replacing one or more lip movements corresponding with the profane word with one or more replacement lip movements corresponding with the non-profane word, replacing lip and eye movements corresponding with the first laughter with replacement lip and eye movements corresponding with the second laughter, etc.) at 1404. Accordingly, unlike conventional editing practices that change spoken words but leave facial movements unchanged, in accordance with at least some implementations, by replacing both the audible portions and the corresponding facial movements, it is not apparent to a viewer that any changes have been made to the dialogue of the audio-visual core portion.

As further shown in FIG. 14, in further implementations, replacing one or more spoken portions with one or more replacement spoken portions and modifying one or more facial movements corresponding to the one or more spoken portions with one or more replacement facial movements corresponding to the one or more replacement spoken portions at 1404 may include replacing one or more words spoken in a first language with one or more replacement words spoken in a second language (e.g. replacing "no" with "nyet," replacing "yes" with "oui," etc.), and modifying one or more facial movements corresponding to the one or more words spoken in the first language with one or more replacement facial movements corresponding to the one or more words spoken in the second language (e.g. replacing facial movements corresponding to "no" with replacement facial movements corresponding to "nyet," replacing facial movements corresponding to "yes" with replacement facial movements corresponding to "oui," etc.) at 1406. Again, in this way, it will not be apparent to a viewer that an actor was originally speaking a first language but the movie has been dubbed with a second language, and instead, it will appear to the viewer that the actor was originally speaking the second language.

As previously noted, various implementations of receiving a consideration for the dynamically-customized audio-visual content at 650 may be implemented in accordance with the various implementations of modifying the audio-visual core portion with at least one revised content portion in accordance with the at least one selection signal to create a dynamically customized audio-visual content at 630. For example, as further shown in FIG. 14, in some implementations, receiving a consideration for the dynamically-customized audio-visual content at 650 may include receiving at least a portion of a consideration based at least partially on replacing at least a portion of dialogue of the audio-visual core portion with a revised dialogue portion at 1412 (e.g. receiving payment based on modifying an audio-visual content to accommodate a viewer selection indicating a desire for no profanity, or based on automatic detection using a sensor of a child entering a viewing area, etc.).

In some implementations, receiving a consideration for the dynamically-customized audio-visual content at 650 may include receiving at least a portion of a consideration based at least partially on at least one of replacing one or more spoken portions with one or more replacement spoken portions or modifying one or more facial movements corresponding to the one or more spoken portions with one or more replacement facial movements corresponding to the one or more replacement spoken portions at 1414 (e.g. receiving payment for replacing a profane word with a non-profane word, and replacing one or more lip movements corresponding with the profane word with one or more replacement lip movements corresponding with the non-profane word, etc.). In further implementations, receiving at least a portion of a consideration based at least partially on at least one of replacing one or more spoken portions with one or more replacement spoken portions or modifying one or more facial movements corresponding to the one or more spoken portions with one or more replacement facial movements corresponding to the one or more replacement spoken portions at 1414 may include receiving at least a portion of a consideration based at least partially on at least one of replacing one or more words spoken in a first language with one or more replacement words spoken in a second language, or modifying one or more facial movements corresponding to the one or more words spoken in the first language with one or more replacement facial movements corresponding to the one or more words spoken in the second language at 1416 (e.g. receiving payment for replacing sounds and facial movements corresponding to Japanese speech with those corresponding to English speech, receiving payment for replacing sounds and facial movements corresponding to English speech with those corresponding to Chinese speech, etc.).

Figure 15:
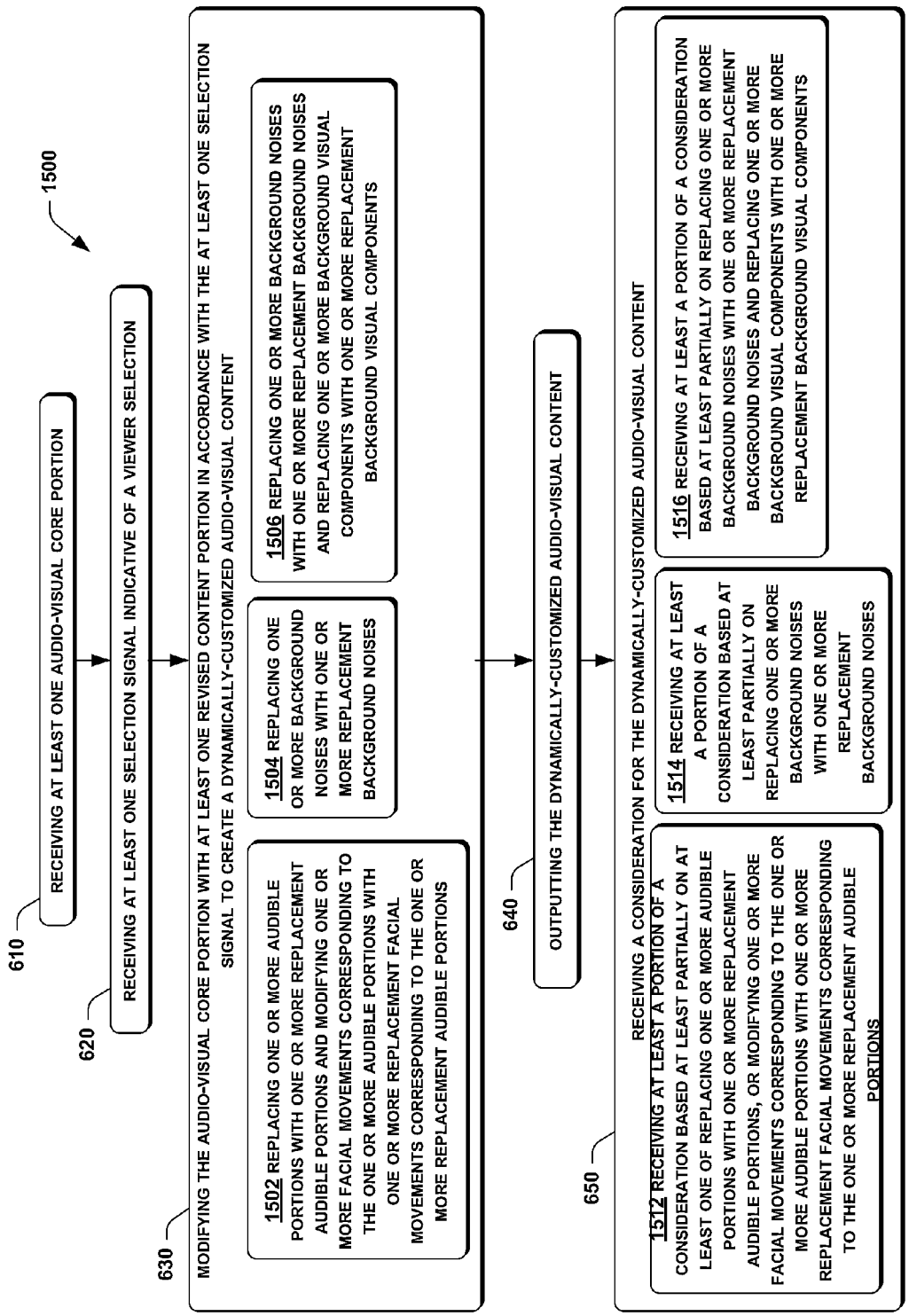

With reference to FIG. 15, in some implementations, modifying the audio-visual core portion with at least one revised content portion in accordance with the at least one selection signal to create a dynamically customized audio-visual content at 630 may include replacing one or more audible portions with one or more replacement audible portions (e.g. replacing a sound of a hand clap with a sound of snapping fingers, replacing a sound of a cough with a sound of a sneeze, replacing the sound of a piano with the sound of a violin, etc.) and modifying one or more body movements corresponding to the one or more audible portions with one or more replacement body movements corresponding to the one or more replacement audible portions (e.g. replacing two hands striking with two fingers snapping, replacing facial movements associated with a cough with facial movements associated with a sneeze, replacing visual components associated with a piano being played with replacement visual components associated with a violin being played, etc.) at 1502. Accordingly, by replacing both the audible and visual portions, it may not be apparent to the viewer that any changes have been made to the audio-visual core portion.

In other implementations, modifying the audio-visual core portion with at least one revised content portion in accordance with the at least one selection signal to create a dynamically customized audio-visual content at 630 may include replacing one or more background noises with one or more replacement background noises (e.g. replacing a sound of a bird singing with a sound of a dog barking, replacing a sound of an avalanche with a sound of an erupting volcano, etc.) at 1504.

In further implementations, modifying the audio-visual core portion with at least one revised content portion in accordance with the at least one selection signal to create a dynamically customized audio-visual content at 630 may include replacing one or more background noises with one or more replacement background noises (e.g. replacing a sound of a lion roaring with a sound of an elephant trumpeting, replacing a sound of an avalanche with a sound of an erupting volcano, etc.), and replacing one or more background visual components with one or more replacement background visual components (e.g. replacing a visual image of a lion roaring with a visual image of an elephant trumpeting, replacing a visual depiction of an avalanche with a visual depiction of an erupting volcano, etc.) at 1506.

With continued reference to FIG. 15, in some implementations, receiving a consideration for the dynamically-customized audio-visual content at 650 may include receiving at least a portion of a consideration based at least partially on at least one of replacing one or more audible portions with one or more replacement audible portions, or modifying one or more body movements corresponding to the one or more audible portions with one or more replacement body movements corresponding to the one or more replacement audible portions at 1512 (e.g. receiving payment based on replacing sounds and body movements associated with a hand clap with replacement sounds and body movements associated with snapping fingers, receiving payment based on replacing sounds and body movements associated with a cough with replacement sounds and movements associated with a sneeze, etc.).

In other implementations, receiving a consideration for the dynamically-customized audio-visual content at 650 may include receiving at least a portion of a consideration based at least partially on replacing one or more background noises with one or more replacement background noises at 1514 (e.g. receiving payment based on replacing jungle sounds with urban sounds, receiving payment based on replacing crowd noise with sounds of ocean surf, etc.). In further implementations, receiving a consideration for the dynamically-customized audio-visual content at 650 may include receiving at least a portion of a consideration based at least partially on at least one of replacing one or more background noises with one or more replacement background noises, or replacing one or more background visual components with one or more replacement background visual components at 1516 (e.g. receiving payment based on replacing sounds and images of a lion roaring with replacement sounds and images of an elephant trumpeting, receiving payment based on replacing sounds and video of an avalanche with replacement sounds and video of an erupting volcano, etc.).

It will be appreciated that systems and methods in accordance with the present disclosure may be utilized to adjust content to accommodate cultural differences. In some implementations, content that is categorized as being culturally inappropriate (e.g. vulgar, offensive, racist, derogatory, degrading, stereotypical, distasteful, etc.) may be either omitted (or deleted or removed), or may be replaced with alternate content that is categorized as being culturally appropriate, such as by retrieving replacement content from a library of lookup tables, or any other suitable source. For example, as shown in FIG. 16, in some implementations, modifying the audio-visual core portion with at least one revised content portion in accordance with the at least one selection signal to create a dynamically customized audio-visual content at 630 may include at least one of replacing a culturally inappropriate portion with a culturally appropriate portion or omitting the culturally inappropriate portion at 1602 (e.g. replacing terminology that may be considered a racial slur in a particular culture with replacement terminology that is not considered a racial slur in the particular culture, removing a content portion that includes a hand gesture that is insulting to a particular culture; etc.).

In other implementations, receiving at least one selection signal indicative of a viewer preference at 620 may include receiving a selection signal indicative of a cultural heritage of at least one viewer at 1604, and modifying the audio-visual core portion with at least one revised content portion in accordance with the at least one selection signal to create a dynamically customized audio-visual content at 630 may include at least one of replacing a portion considered inappropriate with respect to the cultural heritage of the at least one viewer with a replacement portion considered appropriate with respect to the cultural heritage of the at least one viewer, or omitting the inappropriate portion at 1606 (e.g. receiving a signal indicating that a viewer is Chinese, and replacing a reference to "Taiwan" with a reference to "Chinese Taipei;" receiving an indication that a viewer is Islamic, and replacing a reference to the Bible with a reference to the Quran; etc.).

Figure 16:
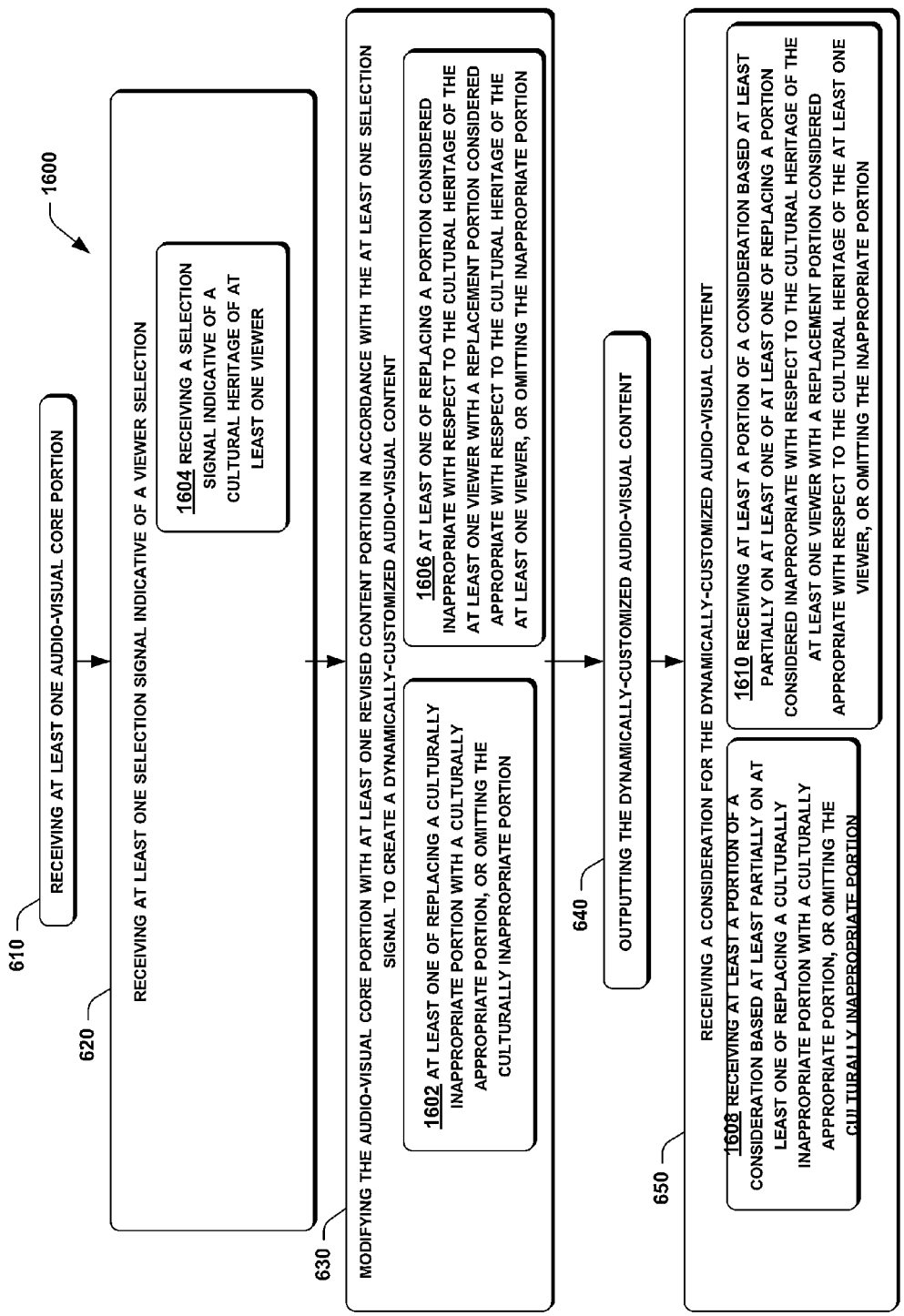

With continued reference to FIG. 16, in other implementations, receiving a consideration for the dynamically-customized audio-visual content at 650 may include receiving at least a portion of a consideration based at least partially on at least one of replacing a culturally inappropriate portion with a culturally appropriate portion or omitting the culturally inappropriate portion at 1608 (e.g. receiving payment based on replacing terminology that may be considered in poor taste in Iceland with replacement terminology that is not considered in poor taste, etc.).

In other implementations, receiving a consideration for the dynamically-customized audio-visual content at 650 may include receiving at least a portion of a consideration based at least partially on at least one of at least one of replacing a portion considered inappropriate with respect to the cultural heritage of the at least one viewer with a replacement portion considered appropriate with respect to the cultural heritage of the at least one viewer, or omitting the inappropriate portion at 1610 (e.g. receiving payment based on receiving a signal indicating that a viewer is Chinese, and replacing a reference to "Taiwan" with a reference to "Chinese Taipei;" receiving payment based on receiving an indication that a viewer is Islamic, and replacing a reference to the Bible with a reference to the Quran; etc.).

Figure 17:
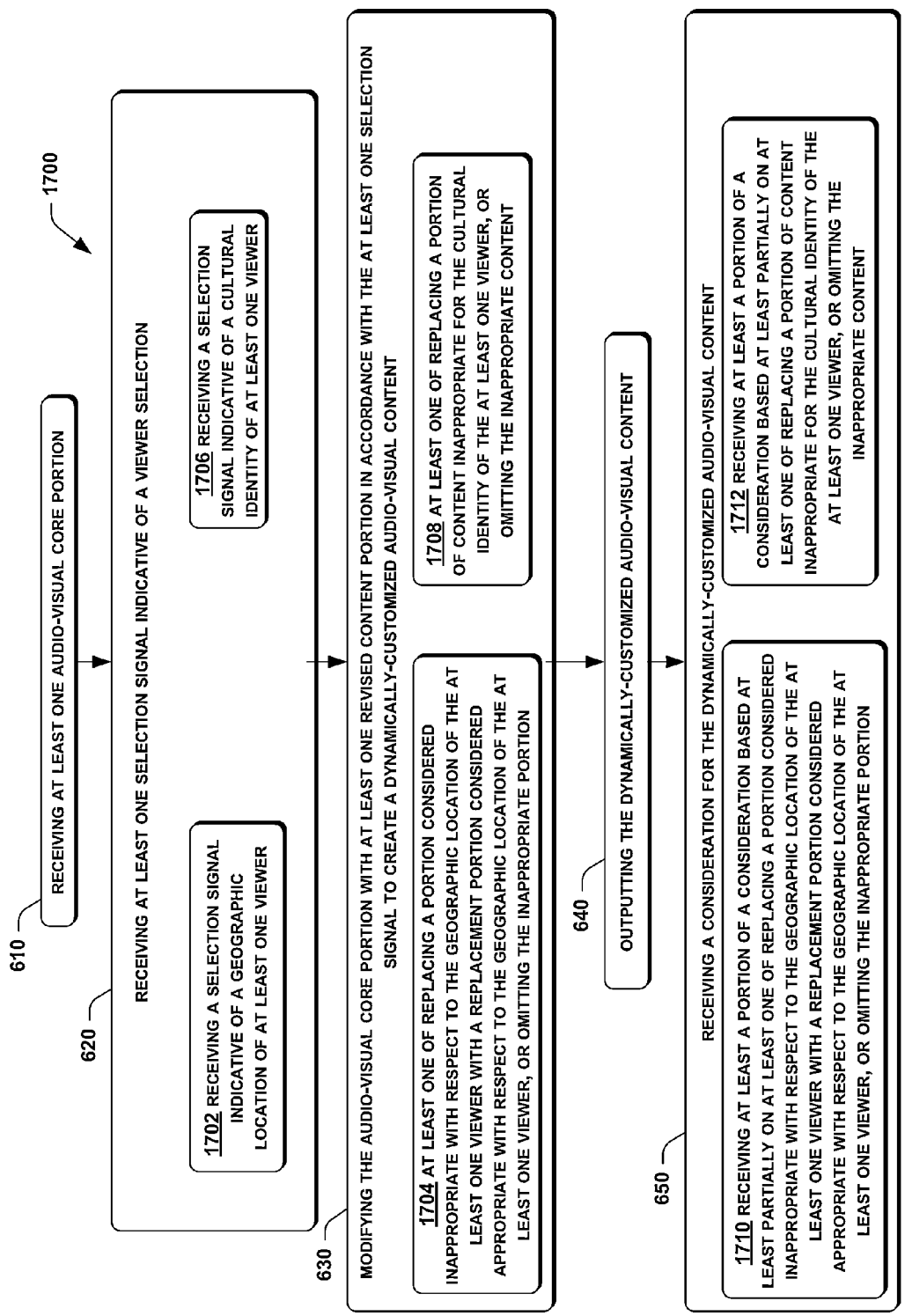

As shown in FIG. 17, in further implementations, receiving at least one selection signal indicative of a viewer preference at 620 may include receiving a selection signal indicative of a geographic location of at least one viewer at 1702, and modifying the audio-visual core portion with at least one revised content portion in accordance with the at least one selection signal to create a dynamically customized audio-visual content at 630 may include at least one of replacing a portion considered inappropriate with respect to the geographic location of the at least one viewer with a replacement portion considered appropriate with respect to the geographic location of the at least one viewer, or omitting the inappropriate portion at 1704 (e.g. receiving a signal, such as a GPS signal from a viewer's cell phone, indicating that the viewer is located in Brazil, and replacing a content portion that includes a hand gesture that is offensive in Brazil, such as a Texas Longhorns "hook-em-horns" hand gesture, with a benign hand gesture appropriate for the viewer located in Brazil; receiving a signal, such as a location of an IP address of a local Internet service provider, that indicates that a viewer is located within a Native American reservation, and replacing content that includes terminology offensive to Native Americans with replacement content that includes non-offensive terminology; etc.).

And in other implementations, receiving at least one selection signal indicative of a viewer preference at 620 may include receiving a selection signal indicative of a cultural identity of at least one viewer at 1706, and modifying the audio-visual core portion with at least one revised content portion in accordance with the at least one selection signal to create a dynamically customized audio-visual content at 630 may include at least one of replacing at least a portion of content inappropriate for the cultural identity of the at least one viewer with an appropriate portion of content, or omitting the inappropriate portion at 1708 (e.g. receiving a signal, such as a language selection of a software installed on a viewer's electronic device, indicating that the viewer is Arabic, and removing a content portion that is inappropriate to the Arabic culture; etc.).

With continued reference to FIG. 17, in some implementations, receiving a consideration for the dynamically-customized audio-visual content at 650 may include receiving at least a portion of a consideration based at least partially on at least one of replacing a portion considered inappropriate with respect to the geographic location of the at least one viewer with a replacement portion considered appropriate with respect to the geographic location of the at least one viewer, or omitting the inappropriate portion at 1710 (e.g. receiving payment based on receiving a signal, such as a GPS signal from a viewer's cell phone, indicating that the viewer is located in Brazil, and replacing a content portion that includes a hand gesture that is offensive in Brazil with a benign hand gesture appropriate for the viewer located in Brazil; etc.).

And in other implementations, receiving a consideration for the dynamically-customized audio-visual content at 650 may include receiving at least a portion of a consideration based at least partially on at least one of at least one of replacing at least a portion of content inappropriate for the cultural identity of the at least one viewer with an appropriate portion of content, or omitting the inappropriate portion at 1712 (e.g. receiving a signal, such as a language selection of a software installed on a viewer's electronic device, indicating that the viewer is Arabic, and removing a content portion that is inappropriate to the Arabic culture; etc.).

Figure 18:
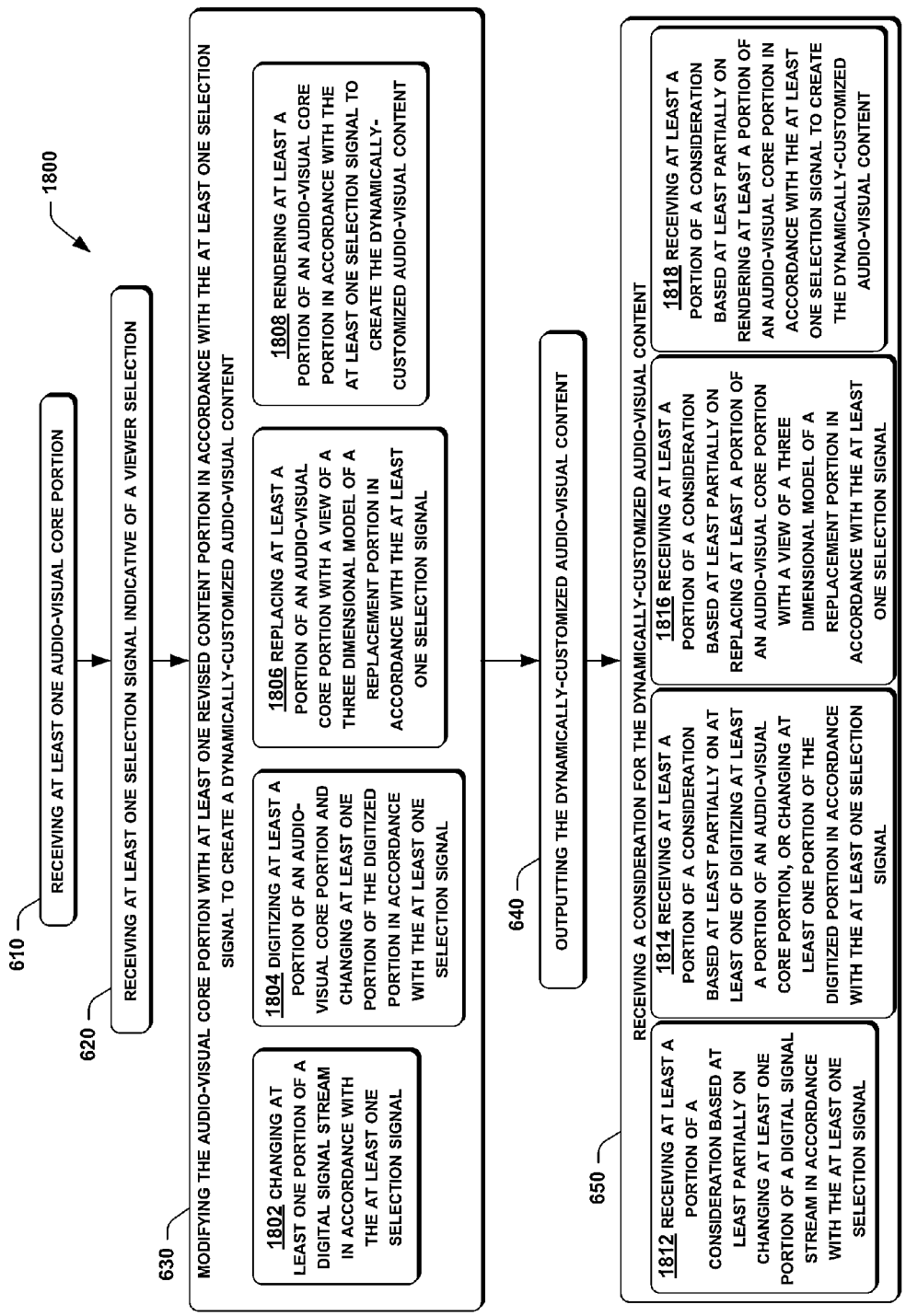

It will be appreciated that modifying the audio-visual core portion with at least one revised content portion in accordance with the at least one selection signal to create a dynamically customized audio-visual content at 630 may be accomplished in various ways. For example, as shown in FIG. 18, in some implementations, modifying the audio-visual core portion with at least one revised content portion in accordance with the at least one selection signal to create a dynamically customized audio-visual content at 630 may include changing at least one portion of a digital signal stream in accordance with the at least one selection signal (e.g. replacing original digitized signals of the audio-visual core portion with replacement digitized signals of the audio-visual core portion, supplementing original digitized signals of the audio-visual core portion with supplemental digitized signals, etc.) at 1802. In other implementations, modifying the audio-visual core portion with at least one revised content portion in accordance with the at least one selection signal to create a dynamically customized audio-visual content at 630 may include digitizing at least a portion of an audio-visual core portion, and changing at least one portion of the digitized portion in accordance with the at least one selection signal at 1804.

In further implementations, modifying the audio-visual core portion with at least one revised content portion in accordance with the at least one selection signal to create a dynamically customized audio-visual content at 630 may include replacing at least a portion of an audio-visual core portion with a view of a three dimensional model of a replacement portion in accordance with the at least one selection signal at 1806. Thus, if the one or more selection signals 144 indicates that the user prefers to see a dynamically-customized movie (e.g. the movie Cleopatra) with a desired lead actress (or actor) (e.g. Angelina Joli) rather than an original lead actress (or actor) (e.g. Elizabeth Taylor), the processing component 110 may retrieve a digital model of the desired lead actress (or actor) and may substitute appropriate portions of the incoming core portion 102 with appropriate views of the digital model of the desired lead actress (or actor). In still further implementations, modifying the audio-visual core portion with at least one revised content portion in accordance with the at least one selection signal to create a dynamically customized audio-visual content at 630 may include rendering at least a portion of an audio-visual core portion in accordance with the at least one selection signal to create the dynamically-customized audio-visual content at 1808.

With continued reference to FIG. 18, in some implementations, receiving a consideration for the dynamically-customized audio-visual content at 650 may include receiving at least a portion of a consideration based at least partially on changing at least one portion of a digital signal stream in accordance with the at least one selection signal at 1812 (e.g. receiving a payment portion based on replacing digitized signals with replacement digitized signals, etc.). In other implementations, receiving a consideration for the dynamically-customized audio-visual content at 650 may include receiving at least a portion of a consideration based at least partially on at least one of digitizing at least a portion of an audio-visual core portion, or changing at least one portion of the digitized portion in accordance with the at least one selection signal at 1814.

In further implementations, receiving a consideration for the dynamically-customized audio-visual content at 650 may include receiving at least a portion of a consideration based at least partially on replacing at least a portion of an audio-visual core portion with a view of a three dimensional model of a replacement portion in accordance with the at least one selection signal at 1816. (e.g. receiving payment based on replacing a first actor with a 3D model of a replacement actor). In still further implementations, receiving a consideration for the dynamically-customized audio-visual content at 650 may include receiving at least a portion of a consideration based at least partially on rendering at least a portion of an audio-visual core portion in accordance with the at least one selection signal to create the dynamically-customized audio-visual content at 1818.

Figure 19:
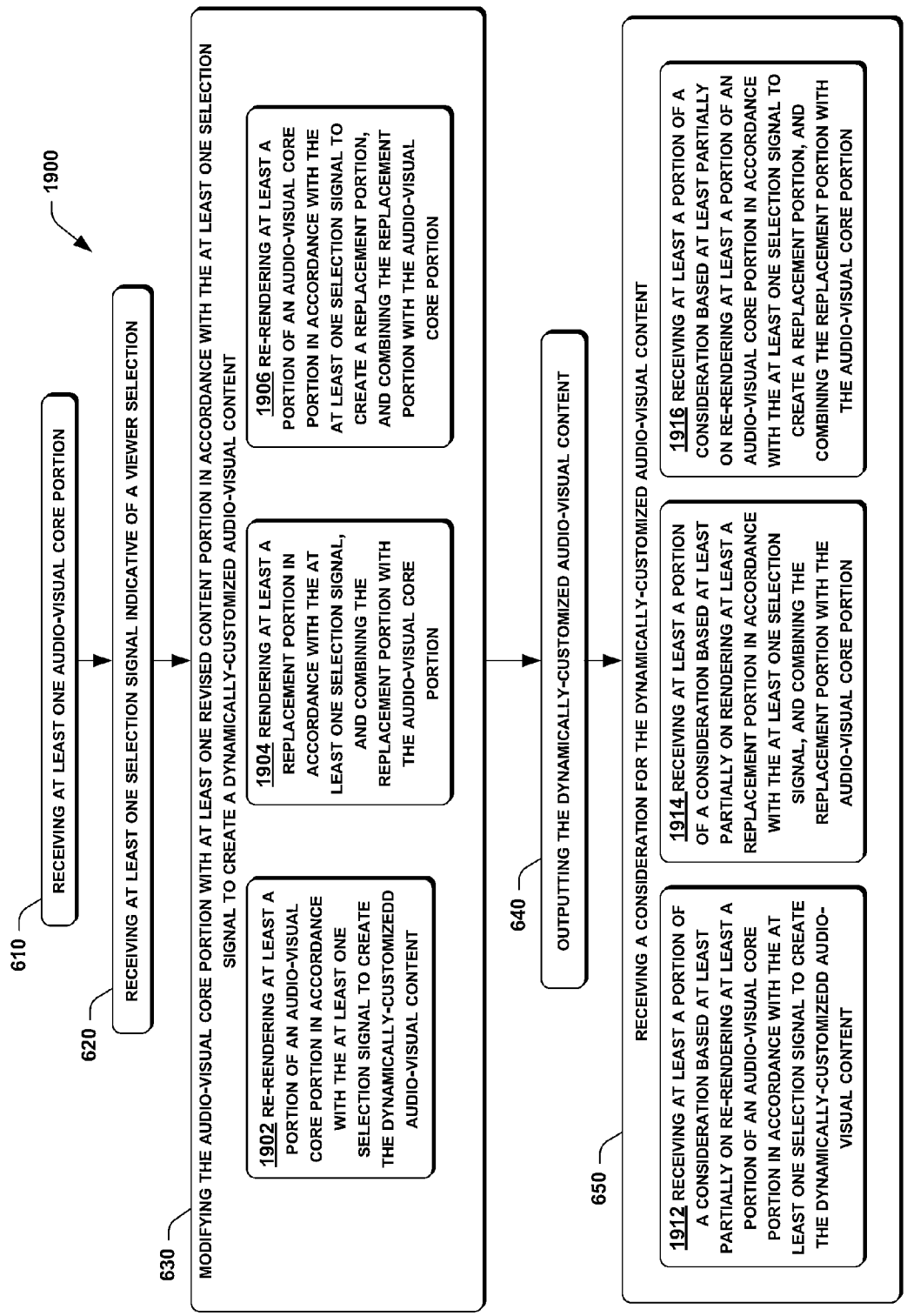

As shown in FIG. 19, in other implementations, modifying the audio-visual core portion with at least one revised content portion in accordance with the at least one selection signal to create a dynamically customized audio-visual content at 630 may include re-rendering at least a portion of an audio-visual core portion in accordance with the at least one selection signal to create the dynamically-customized audio-visual content at 1902. In additional implementations, modifying the audio-visual core portion with at least one revised content portion in accordance with the at least one selection signal to create a dynamically customized audio-visual content at 630 may include rendering at least a replacement portion in accordance with the at least one-relection signal, and combining the at least a replacement portion with the audio-visual core portion at 1904. In further implementations, modifying the audio-visual core portion with at least one revised content portion in accordance with the at least one selection signal to create a dynamically customized audio-visual content at 630 may include re-rendering at least a portion of an audio-visual core portion in accordance with the at least one-relection signal to create a replacement portion, and combining the replacement portion with the audio-visual core portion at 1906.

With continued reference to FIG. 19, in still other implementations, receiving a consideration for the dynamically-customized audio-visual content at 650 may include receiving at least a portion of a consideration based at least partially on re-rendering at least a portion of an audio-visual core portion in accordance with the at least one selection signal to create the dynamically-customized audio-visual content at 1912. In additional implementations, receiving a consideration for the dynamically-customized audio-visual content at 650 may include receiving at least a portion of a consideration based at least partially on at least one of rendering at least a replacement portion in accordance with the at least one-relection signal, or combining the at least a replacement portion with the audio-visual core portion at 1914. In further implementations, receiving a consideration for the dynamically-customized audio-visual content at 650 may include receiving at least a portion of a consideration based at least partially on at least one of re-rendering at least a portion of an audio-visual core portion in accordance with the at least one-relection signal to create a replacement portion, or combining the replacement portion with the audio-visual core portion at 1916.

Figure 20:
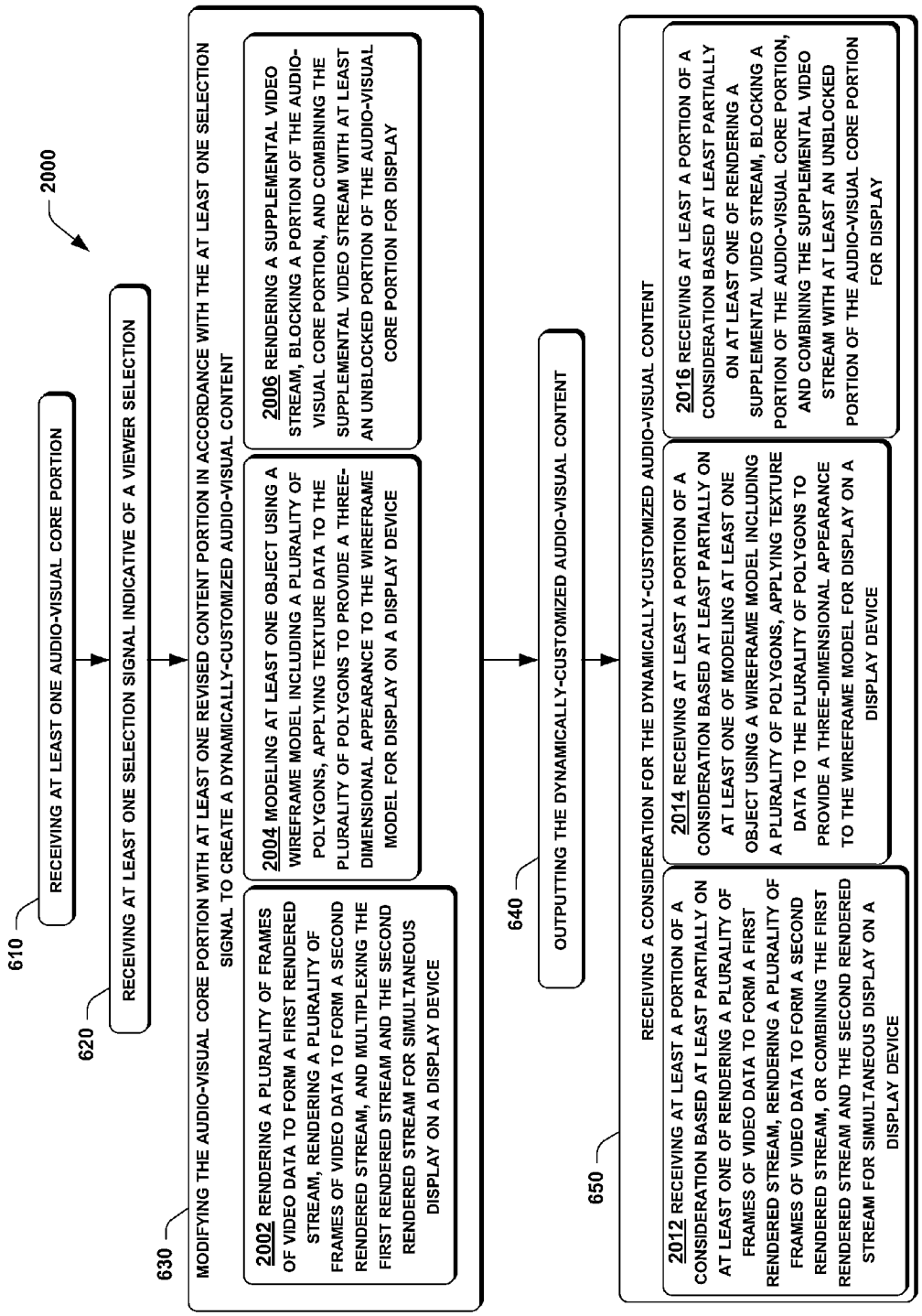

With reference to FIG. 20, in some implementations, modifying the audio-visual core portion with at least one revised content portion in accordance with the at least one selection signal to create a dynamically customized audio-visual content at 630 may include rendering a plurality of frames of video data to form a first rendered stream, rendering a plurality of frames of video data to form a second rendered stream, and combining the first rendered stream and the second rendered stream for substantially simultaneous display on a display device (e.g. multiplexing the first and second rendered streams) at 2002. In at least some implementations, the operations at 2002 may include, for example, those techniques disclosed in U.S. Pat. No. 8,059,201 issued to Aarts et al. (disclosing techniques for real-time and non-real-time rendering of video data streams), which patent is incorporated herein by reference.

In other implementations, modifying the audio-visual core portion with at least one revised content portion in accordance with the at least one selection signal to create a dynamically customized audio-visual content at 630 may include modeling at least one object using a wireframe model including a plurality of polygons, and applying texture data to the plurality of polygons to provide a three-dimensional appearance to the wireframe model for display on a display device at 2004. In at least some implementations, the operations at 2004 may include, for example, those techniques disclosed in U.S. Pat. No. 8,016,653 issued to Pendleton et al. (disclosing techniques for three dimensional rendering of live events), which patent is incorporated herein by reference.

In still other implementations, modifying the audio-visual core portion with at least one revised content portion in accordance with the at least one selection signal to create a dynamically customized audio-visual content at 630 may include rendering a supplemental video stream, blocking a portion of the audio-visual core portion, and combining the supplemental video stream with at least an unblocked portion of the audio-visual core portion at 2006. In at least some implementations, the operations at 2006 may include, for example, those techniques disclosed in U.S. Pat. Nos. 7,945,926 and 7,631,327 issued to Dempski et al. (disclosing techniques for video animation and merging with television broadcasts and supplemental content sources), which patents are incorporated herein by reference.

With continued reference to FIG. 20, in some implementations, receiving a consideration for the dynamically-customized audio-visual content at 650 may include receiving at least a portion of a consideration based at least partially on at least one of rendering a plurality of frames of video data to form a first rendered stream, rendering a plurality of frames of video data to form a second rendered stream, or combining the first rendered stream and the second rendered stream for substantially simultaneous display on a display device at 2012 (e.g. receiving a payment based on multiplexing first and second rendered streams).

In other implementations, receiving a consideration for the dynamically-customized audio-visual content at 650 may include receiving at least a portion of a consideration based at least partially on at least one of modeling at least one object using a wireframe model including a plurality of polygons, or applying texture data to the plurality of polygons to provide a three-dimensional appearance to the wireframe model for display on a display device at 2014. In still other implementations, receiving a consideration for the dynamically-customized audio-visual content at 650 may include receiving at least a portion of a consideration based at least partially on at least one of rendering a supplemental video stream, blocking a portion of the audio-visual core portion, or combining the supplemental video stream with at least an unblocked portion of the audio-visual core portion at 2016.

Figure 21:
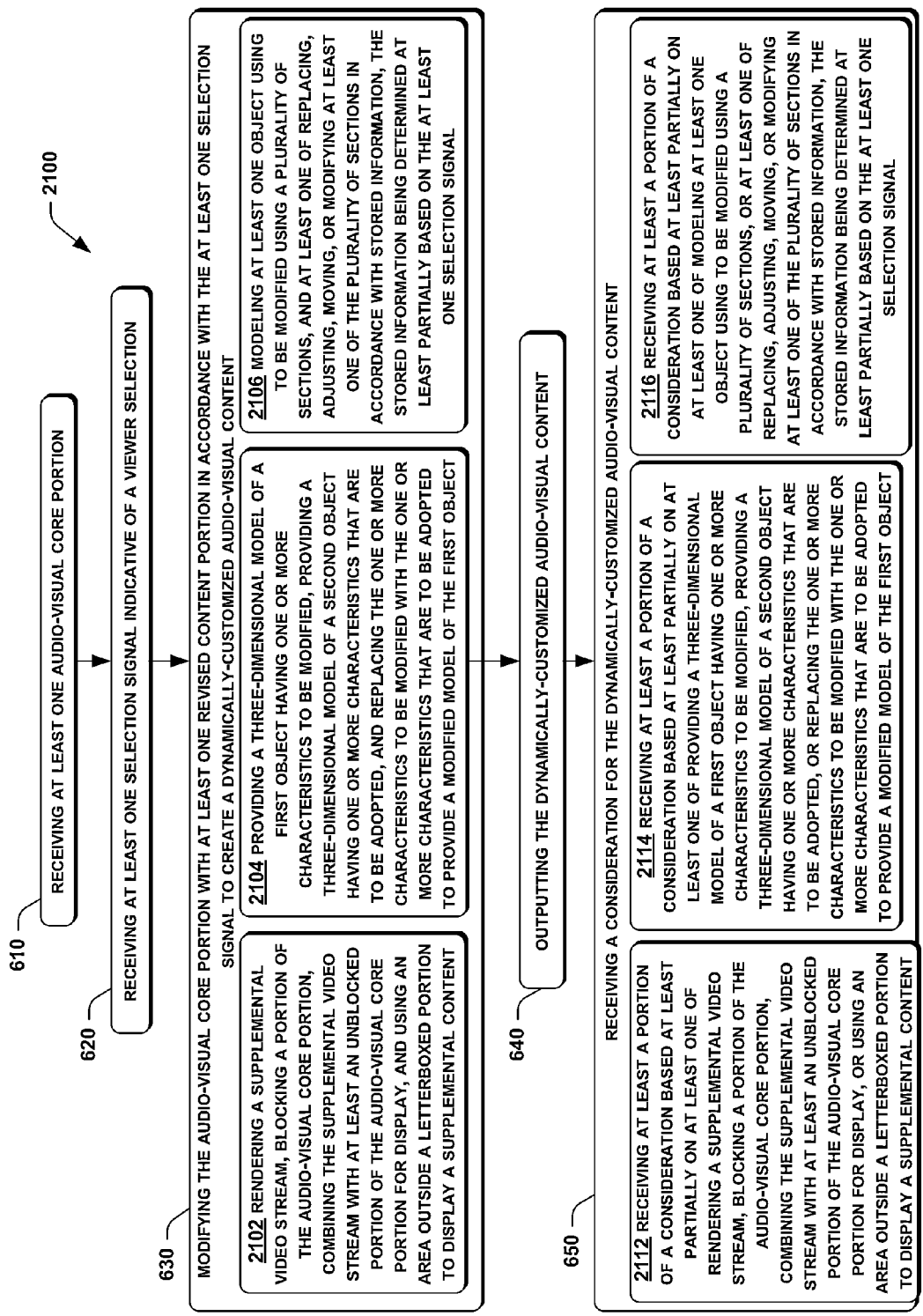

As shown in FIG. 21, in other implementations, modifying the audio-visual core portion with at least one revised content portion in accordance with the at least one selection signal to create a dynamically customized audio-visual content at 630 may include rendering a supplemental video stream, blocking a portion of the audio-visual core portion, combining the supplemental video stream with at least an unblocked portion of the audio-visual core portion, and using an area outside a letterboxed portion to display a supplemental content at 2102. In at least some implementations, the operations at 2102 may include, for example, those techniques disclosed in U.S. Pat. Nos. 7,945,926 and 7,631,327 issued to Dempski et al. (disclosing techniques for video animation and merging with television broadcasts and supplemental content sources), which patents were previously incorporated herein by reference.

In further implementations, modifying the audio-visual core portion with at least one revised content portion in accordance with the at least one selection signal to create a dynamically customized audio-visual content at 630 may include providing a three-dimensional model of a first object having one or more characteristics to be modified, providing a three-dimensional model of a second object having one or more characteristics that are to be adopted, and replacing the one or more characteristics to be modified with the one or more characteristics that are to be adopted to provide a modified model of the first object at 2104. For example, the "providing" operations at 2104 may, in at least some implementations, be accomplished by a dynamic customization system (e.g. system 160 of FIG. 1), and may include executing one or more instructions that create a three-dimensional (3D) model, or may involve operations similar to those commonly referred to as "drag and drop" in commercially-available software (e.g. Microsoft Visio, etc.) to select pre-formed objects from a series of graphical menus, databases, or other suitable storage structures, and may also include a capability for alteration, modification, or individualization by a viewer. In particular implementations, the "adopting" operations at 2104 may include one or more of reusing operations, copying operations, grafting operations, re-skinning operations, illuminating operations, or any other suitable operations. In at least some implementations, the operations at 2104 may include, for example, those techniques disclosed in U.S. Pat. No. 7,109,993 and U.S. Patent Publication No. 20070165022 by Peleg et al. (disclosing generating a head model and modifying portions of facial features), which patent and pending application are incorporated herein by reference.

In additional implementations, modifying the audio-visual core portion with at least one revised content portion in accordance with the at least one selection signal to create a dynamically customized audio-visual content at 630 may include modeling at least one object to be modified using a plurality of sections, and at least one of replacing, adjusting, moving, or modifying at least one of the plurality of sections in accordance with a stored information, the stored information being determined at least partially based on the at least one selection signal at 2106. In at least some implementations, the operations at 2106 may include, for example, those techniques disclosed in U.S. Pat. No. 6,054,999 issued to Strandberg (disclosing producing graphic movement sequences from recordings of measured data from strategic parts of actors), which patent is incorporated herein by reference.

With continued reference to FIG. 21, in still other implementations, receiving a consideration for the dynamically-customized audio-visual content at 650 may include receiving at least a portion of a consideration based at least partially on at least one of rendering a supplemental video stream, blocking a portion of the audio-visual core portion, combining the supplemental video stream with at least an unblocked portion of the audio-visual core portion, or using an area outside a letterboxed portion to display a supplemental content at 2112. In further implementations, receiving a consideration for the dynamically-customized audio-visual content at 650 may include receiving at least a portion of a consideration based at least partially on at least one of providing a three-dimensional model of a first object having one or more characteristics to be modified, providing a three-dimensional model of a second object having one or more characteristics that are to be adopted, or replacing the one or more characteristics to be modified with the one or more characteristics that are to be adopted to provide a modified model of the first object at 2114. In additional implementations, receiving a consideration for the dynamically-customized audio-visual content at 650 may include receiving at least a portion of a consideration based at least partially on at least one of modeling at least one object to be modified using a plurality of sections, or at least one of replacing, adjusting, moving, or modifying at least one of the plurality of sections in accordance with a stored information, the stored information being determined at least partially based on the at least one selection signal at 2116.

Figure 22:
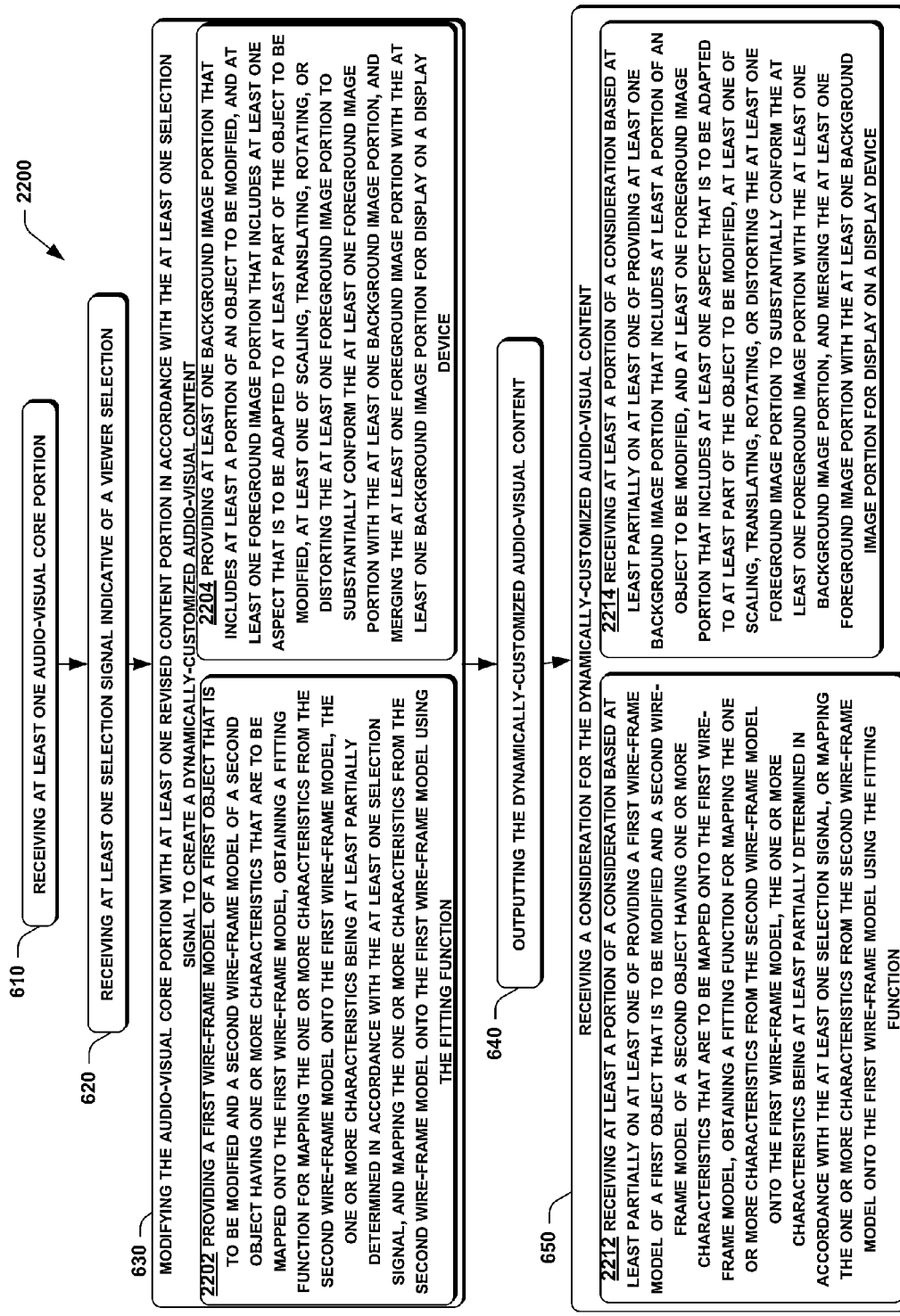

As shown in FIG. 22, in other implementations, modifying the audio-visual core portion with at least one revised content portion in accordance with the at least one selection signal to create a dynamically customized audio-visual content at 630 may include providing a first wire-frame model of a first object that is to be modified and a second wire-frame model of a second object having one or more characteristics that are to be mapped onto the first wire-frame model, obtaining a fitting function for mapping the one or more characteristics from the second wire-frame model onto the first wire-frame model, the one or more characteristics being at least partially determined in accordance with the at least one selection signal, and mapping the one or more characteristics from the second wire-frame model onto the first wire-frame model using the fitting function at 2202. In at least some implementations, the operations at 2202 may include, for example, those techniques disclosed in U.S. Pat. No. 5,926,575 issued to Ohzeki et al. (disclosing techniques for image deformation or distortion based on correspondence to a reference image, wire-frame modeling of images and texture mapping), which patent is incorporated herein by reference.

In still other implementations, modifying the audio-visual core portion with at least one revised content portion in accordance with the at least one selection signal to create a dynamically customized audio-visual content at 630 may include providing at least one background image portion that includes at least a portion of an object to be modified, and at least one foreground image portion that includes at least one aspect that is to be adapted to at least part of the object to be modified, at least one of scaling, translating, rotating, or distorting the at least one foreground image portion to substantially conform the at least one foreground image portion with the at least one background image portion, and merging the at least one foreground image portion with the at least one background image portion for display on a display device at 2204. In at least some implementations, the operations at 2204 may include, for example, those techniques disclosed in U.S. Pat. No. 5,623,587 issued to Bulman (disclosing techniques for creation of composite electronic images from multiple individual images), which patent is incorporated herein by reference.

With continued reference to FIG. 22, in still other implementations, receiving a consideration for the dynamically-customized audio-visual content at 650 may include receiving at least a portion of a consideration based at least partially on at least one of providing a first wire-frame model of a first object that is to be modified and a second wire-frame model of a second object having one or more characteristics that are to be mapped onto the first wire-frame model, obtaining a fitting function for mapping the one or more characteristics from the second wire-frame model onto the first wire-frame model, the one or more characteristics being at least partially determined in accordance with the at least one selection signal, or mapping the one or more characteristics from the second wire-frame model onto the first wire-frame model using the fitting function at 2202. In still other implementations, receiving a consideration for the dynamically-customized audio-visual content at 650 may include receiving at least a portion of a consideration based at least partially on at least one of providing at least one background image portion that includes at least a portion of an object to be modified, and at least one foreground image portion that includes at least one aspect that is to be adapted to at least part of the object to be modified, at least one of scaling, translating, rotating, or distorting the at least one foreground image portion to substantially conform the at least one foreground image portion with the at least one background image portion, or merging the at least one foreground image portion with the at least one background image portion for display on a display device at 2214.

Figure 23:
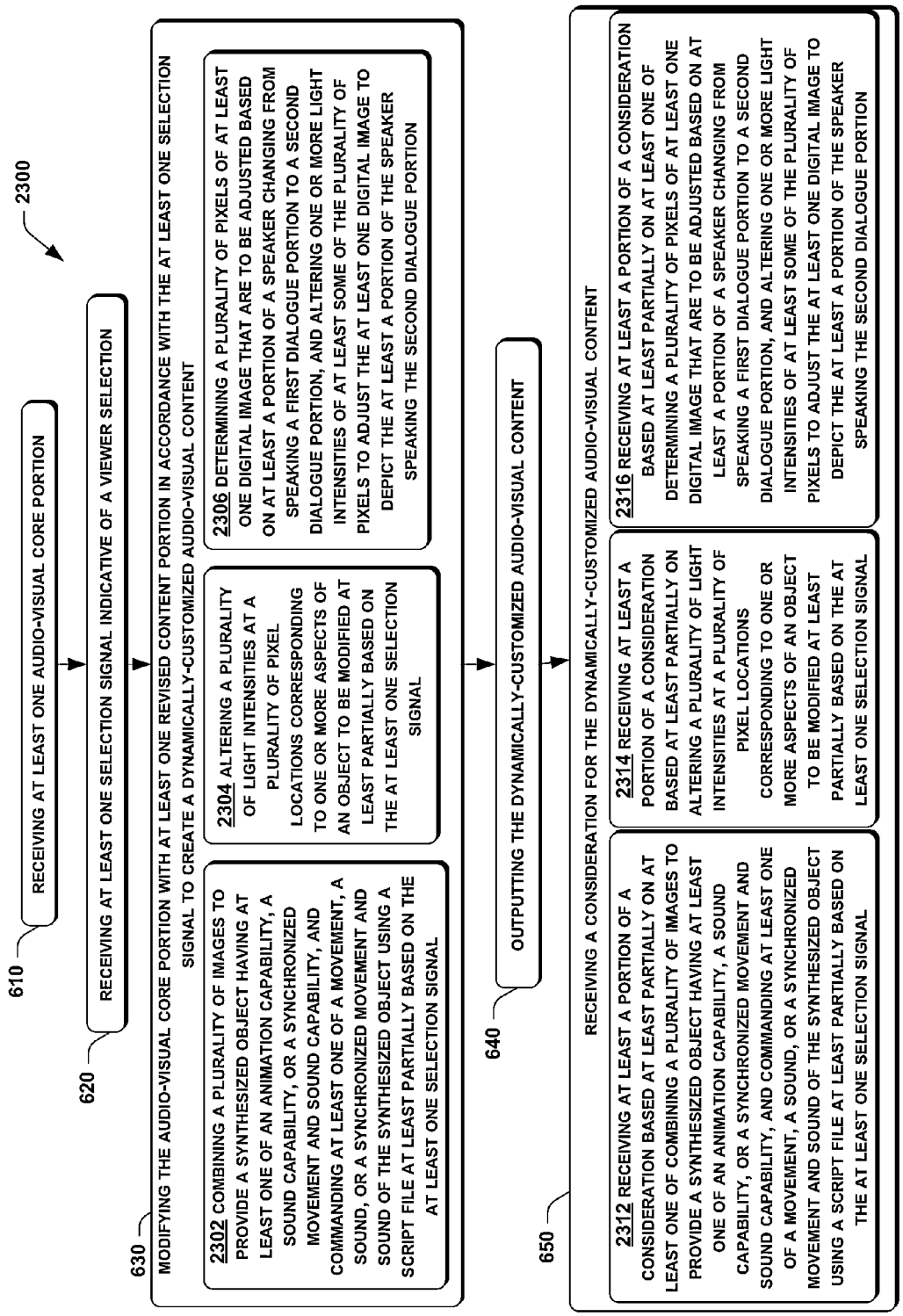

As shown in FIG. 23, in further implementations, modifying the audio-visual core portion with at least one revised content portion in accordance with the at least one selection signal to create a dynamically customized audio-visual content at 630 may include combining a plurality of images to provide a synthesized object having at least one of an animation capability, a sound capability, or a synchronized animation and sound capability, and commanding at least one of a movement, a sound, or a synchronized movement and sound of the synthesized object using a script file at least partially based on the at least one selection signal at 2302. In at least some implementations, the operations at 2302 may include, for example, those techniques disclosed in U.S. Pat. No. 5,111,409 issued to Gasper et al. (disclosing techniques for synchronization of synthesized actors), and U.S. Pat. Nos. 4,884,972 and 4,884,972 issued to Gasper (disclosing techniques for synchronization of animated objects), which patents are incorporated herein by reference.

In other implementations, modifying the audio-visual core portion with at least one revised content portion in accordance with the at least one selection signal to create a dynamically customized audio-visual content at 630 may include altering a plurality of light intensities at a plurality of pixel locations corresponding to one or more aspects of an object to be modified at least partially based on the at least one selection signal at 2304. In further implementations, modifying the audio-visual core portion with at least one revised content portion in accordance with the at least one selection signal to create a dynamically customized audio-visual content at 630 may include determining a plurality of pixels of at least one digital image that are to be adjusted based on at least a portion of a speaker changing from speaking a first dialogue portion to a second dialogue portion, and altering one or more light intensities of at least some of the plurality of pixels to adjust the at least one digital image to depict the at least a portion of the speaker speaking the second dialogue portion at 2306. In at least some implementations, the operations at 2304 and 2306 may include, for example, those techniques disclosed in U.S. Pat. Nos. 4,827,532 and 4,600,281 and 4,260,229 issued to Bloomstein (disclosing techniques for substitution of sound track language and corresponding lip movements), which patents are incorporated herein by reference.

With continued reference to FIG. 23, in further implementations, receiving a consideration for the dynamically-customized audio-visual content at 650 may include receiving at least a portion of a consideration based at least partially on at least one of combining a plurality of images to provide a synthesized object having at least one of an animation capability, a sound capability, or a synchronized animation and sound capability, or commanding at least one of a movement, a sound, or a synchronized movement and sound of the synthesized object using a script file at least partially based on the at least one selection signal at 2312. In other implementations, receiving a consideration for the dynamically-customized audio-visual content at 650 may include receiving at least a portion of a consideration based at least partially on altering a plurality of light intensities at a plurality of pixel locations corresponding to one or more aspects of an object to be modified at least partially based on the at least one selection signal at 2314. In further implementations, receiving a consideration for the dynamically-customized audio-visual content at 650 may include receiving at least a portion of a consideration based at least partially on at least one of determining a plurality of pixels of at least one digital image that are to be adjusted based on at least a portion of a speaker changing from speaking a first dialogue portion to a second dialogue portion, or altering one or more light intensities of at least some of the plurality of pixels to adjust the at least one digital image to depict the at least a portion of the speaker speaking the second dialogue portion at 2316.

Figure 24:
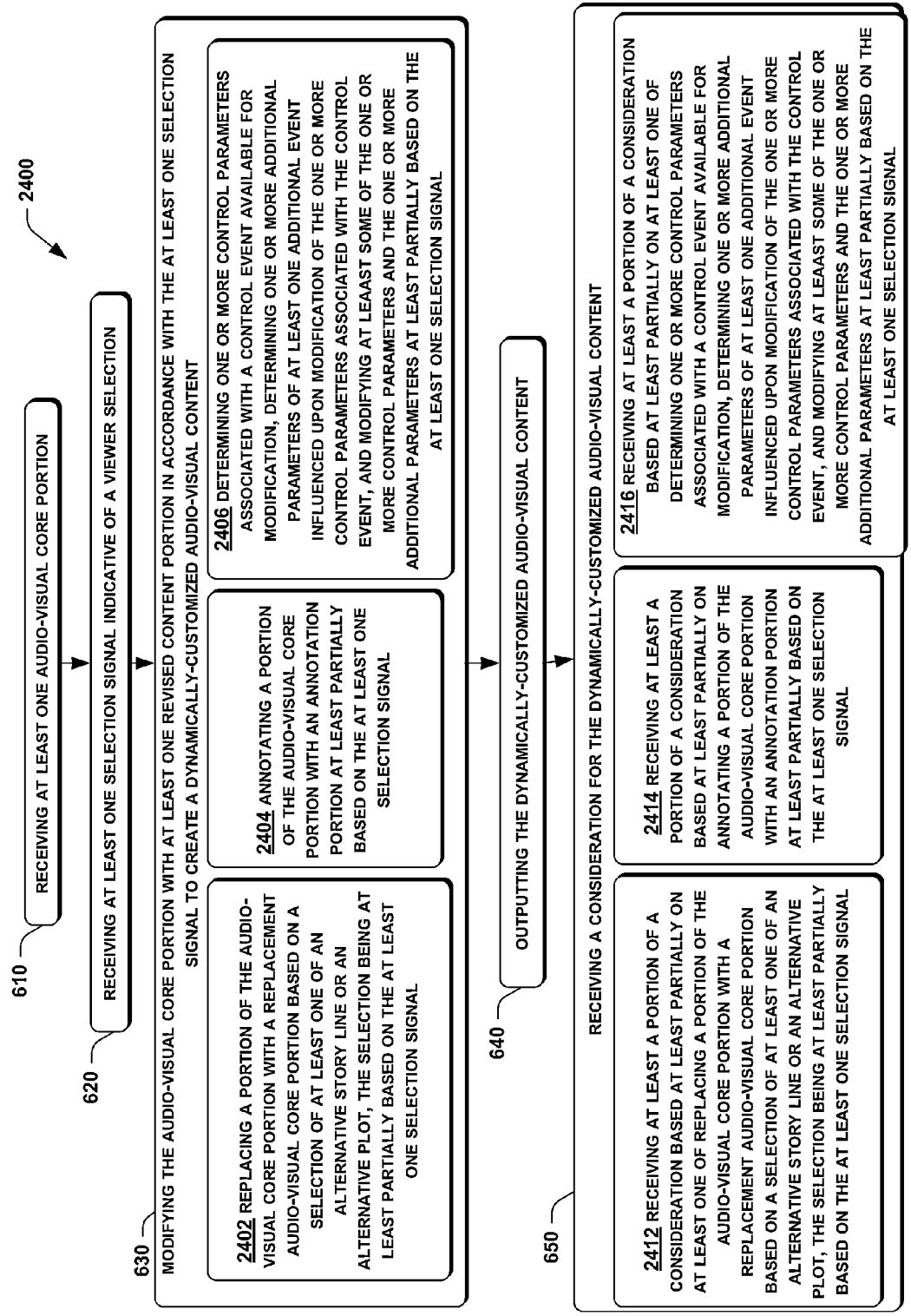

As shown in FIG. 24, in further implementations, modifying the audio-visual core portion with at least one revised content portion in accordance with the at least one selection signal to create a dynamically customized audio-visual content at 630 may include replacing a portion of the audio-visual core portion with a replacement audio-visual portion based on a selection of at least one of an alternative story line or an alternative plot, the selection being at least partially based on the at least one selection signal at 2402. In at least some implementations, the operations at 2402 may include, for example, those techniques disclosed in U.S. Pat. No. 4,569,026 issued to Best (disclosing techniques for interactive entertainment systems), which patent is incorporated herein by reference.

In still further implementations, modifying the audio-visual core portion with at least one revised content portion in accordance with the at least one selection signal to create a dynamically customized audio-visual content at 630 may include annotating a portion of the audio-visual core portion with an annotation portion at least partially based on the at least one selection signal at 2404. In at least some implementations, the operations at 2404 may include, for example, those techniques disclosed in U.S. Patent Publication No. 20040181592 by Samra et al. (disclosing techniques for annotating and versioning digital media), which pending patent application is incorporated herein by reference.

In yet other implementations, modifying the audio-visual core portion with at least one revised content portion in accordance with the at least one selection signal to create a dynamically customized audio-visual content at 630 may include determining one or more control parameters associated with a control event available for modification, determining one or more additional parameters of at least one additional event influenced upon modification of the one or more control parameters associated with the control event, and modifying at least some of the one or more control parameters and the one or more additional parameters at least partially based on the at least one selection signal at 2406. In at least some implementations, the operations at 2406 may include, for example, those techniques disclosed in U.S. Patent Publication No. 20110029099 by Benson (disclosing techniques for providing audio visual content), which pending patent application is incorporated herein by reference.

With continued reference to FIG. 24, in other implementations, receiving a consideration for the dynamically-customized audio-visual content at 650 may include receiving at least a portion of a consideration based at least partially on at least one of replacing a portion of the audio-visual core portion with a replacement audio-visual portion based on a selection of at least one of an alternative story line or an alternative plot, the selection being at least partially based on the at least one selection signal at 2412. In still further implementations, receiving a consideration for the dynamically-customized audio-visual content at 650 may include receiving at least a portion of a consideration based at least partially on annotating a portion of the audio-visual core portion with an annotation portion at least partially based on the at least one selection signal at 2414. In yet other implementations, receiving a consideration for the dynamically-customized audio-visual content at 650 may include receiving at least a portion of a consideration based at least partially on modifying an audio portion and not a visual portion at 2416.

Figure 25:
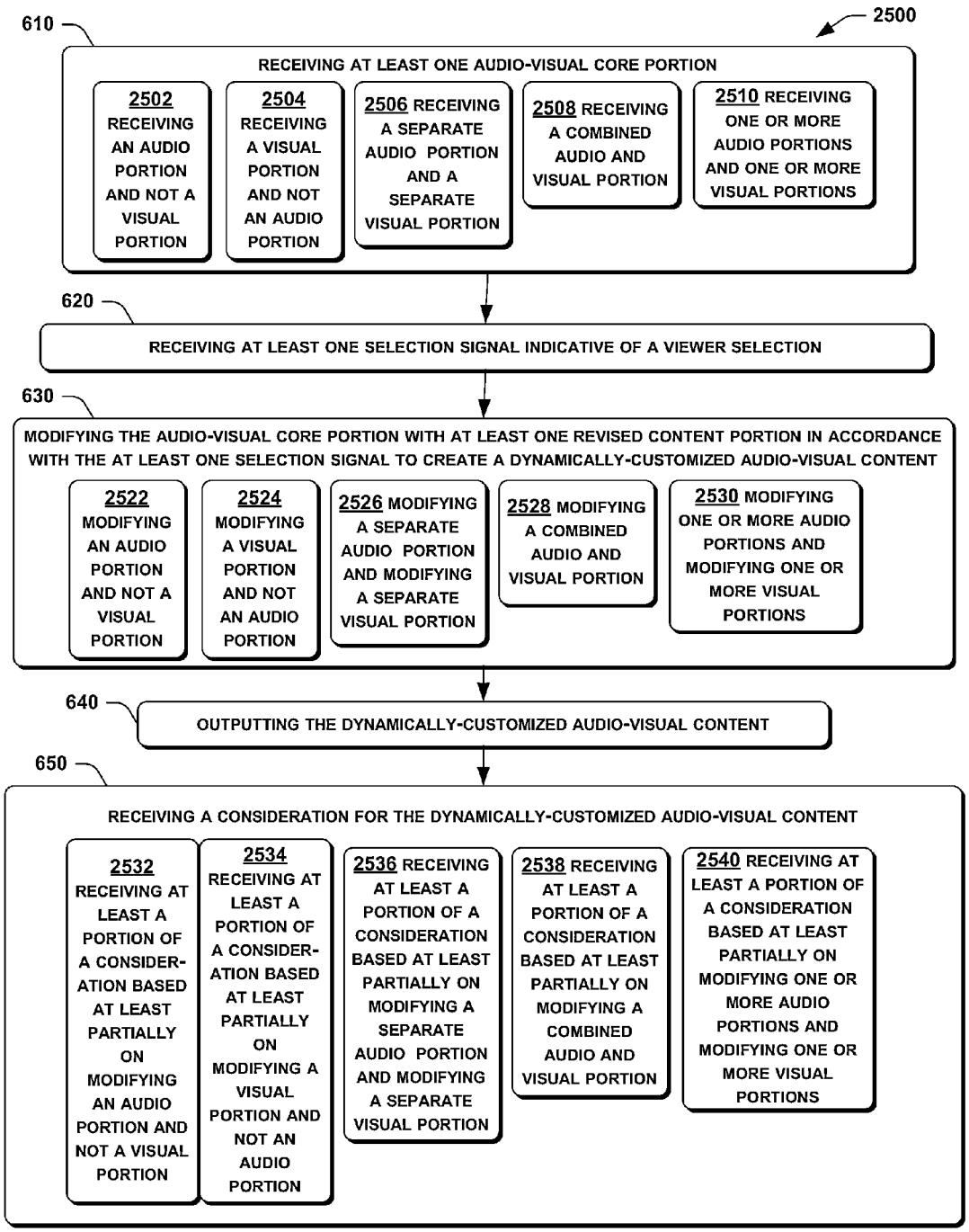

As shown in FIG. 25, receiving at least one audio-visual core portion at 610 may involve a variety of different ways and aspects. For example, in some implementations, receiving at least one audio-visual core portion at 610 may include receiving an audio portion and not a visual portion at 2502. In other implementations, receiving at least one audio-visual core portion at 610 may include receiving a visual portion and not an audio portion at 2504. In still other implementations, receiving at least one audio-visual core portion at 610 may include receiving a separate audio portion and a separate visual portion at 2506. In further implementations, receiving at least one audio-visual core portion at 610 may include receiving a combined audio and visual portion at 2508. In additional implementations, receiving at least one audio-visual core portion at 610 may include receiving one or more audio portions and one or more visual portions at 2510 (e.g. receiving a plurality of audio portions and a single video portion, receiving a single audio portion and a plurality of video portions, etc.).

Similarly, modifying the audio-visual core portion with at least one revised content portion in accordance with the at least one selection signal to create a dynamically customized audio-visual content at 630 may involve a variety of different ways and aspects. For example, in some implementations, modifying the audio-visual core portion with at least one revised content portion in accordance with the at least one selection signal to create a dynamically customized audio-visual contentat 630 may include modifying an audio portion and not a visual portion at 2522. In other implementations, modifying the audio-visual core portion with at least one revised content portion in accordance with the at least one selection signal to create a dynamically customized audio-visual contentat 630 may include modifying a visual portion and not an audio portion at 2524. In still other implementations, modifying the audio-visual core portion with at least one revised content portion in accordance with the at least one selection signal to create a dynamically customized audio-visual content at 630 may include modifying a separate audio portion and modifying a separate visual portion at 2526. In further implementations, modifying the audio-visual core portion with at least one revised content portion in accordance with the at least one selection signal to create a dynamically customized audio-visual content at 630 may include modifying a combined audio and visual portion at 2528. In additional implementations, modifying the audio-visual core portion with at least one revised content portion in accordance with the at least one selection signal to create a dynamically customized audio-visual content at 630 may include modifying one or more audio portions and modifying one or more visual portions at 2530 (e.g. modifying a plurality of audio portions and modifying a single video portion, modifying a single audio portion and modifying a plurality of video portions, etc.).

With continued reference to FIG. 25, in some implementations, receiving a consideration for the dynamically-customized audio-visual content at 650 may include receiving at least a portion of a consideration based at least partially on modifying an audio portion and not a visual portion at 2532. In other implementations, receiving a consideration for the dynamically-customized audio-visual content at 650 may include receiving at least a portion of a consideration based at least partially on modifying a visual portion and not an audio portion at 2534. In still other implementations, receiving a consideration for the dynamically-customized audio-visual content at 650 may include receiving at least a portion of a consideration based at least partially on modifying a separate audio portion and modifying a separate visual portion at 2536. In further implementations, receiving a consideration for the dynamically-customized audio-visual content at 650 may include receiving at least a portion of a consideration based at least partially on modifying a combined audio and visual portion at 2538. In additional implementations, receiving a consideration for the dynamically-customized audio-visual content at 650 may include receiving at least a portion of a consideration based at least partially on modifying one or more audio portions and modifying one or more visual portions at 2530 (e.g. receiving payment for modifying a plurality of audio portions and modifying a single video portion, modifying a single audio portion and modifying a plurality of video portions, etc.).

Figure 26:
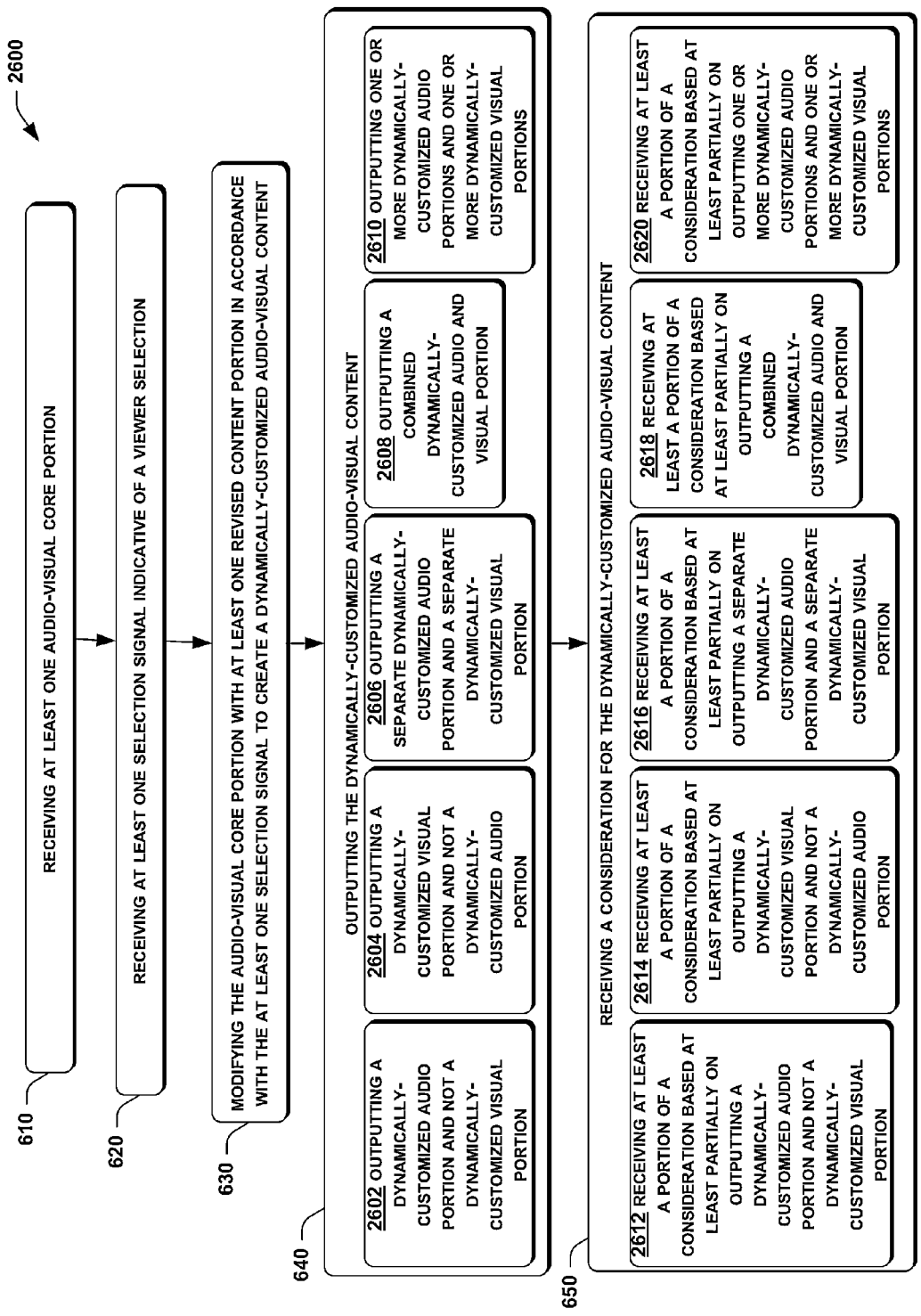

As shown in FIG. 26, outputting the dynamically-customized audio-visual content at 640 may involve a variety of different ways and aspects. For example, in some implementations, outputting the dynamically-customized audio-visual content at 640 may include outputting a dynamically-customized audio at 2602. In other implementations, outputting the dynamically-customized audio-visual content at 640 may include outputting a dynamically-customized visual portion and not a dynamically-customized audio portion at 2604. In still other implementations, outputting the dynamically-customized audio-visual content at 640 may include outputting a separate dynamically-customized audio portion and a separate dynamically-customized visual portion at 2606. In further implementations, outputting the dynamically-customized audio-visual content at 640 may include outputting a combined dynamically-customized audio and visual portion at 2608. In additional implementations, outputting the dynamically-customized audio-visual content at 640 may include outputting one or more dynamically-customized audio portions and one or more dynamically-customized visual portions at 2610 (e.g. outputting a plurality of audio portions and outputting a single video portion, outputting a single audio portion and outputting a plurality of video portions, etc.).

With continued reference to FIG. 26, in other implementations, receiving a consideration for the dynamically-customized audio-visual content at 650 may include receiving at least a portion of a consideration based at least partially on outputting a dynamically-customized audio at 2612. In other implementations, receiving a consideration for the dynamically-customized audio-visual content at 650 may include receiving at least a portion of a consideration based at least partially on outputting a dynamically-customized visual portion and not a dynamically-customized audio portion at 2614. In still other implementations, receiving a consideration for the dynamically-customized audio-visual content at 640 may include receiving at least a portion of a consideration based at least partially on outputting a separate dynamically-customized audio portion and a separate dynamically-customized visual portion at 2616. In further implementations, receiving a consideration for the dynamically-customized audio-visual content at 650 may include receiving at least a portion of a consideration based at least partially on outputting a combined dynamically-customized audio and visual portion at 2628. In additional implementations, receiving a consideration for the dynamically-customized audio-visual content at 650 may include receiving at least a portion of a consideration based at least partially on outputting one or more dynamically-customized audio portions and one or more dynamically-customized visual portions at 2630 (e.g. receiving payment for outputting a plurality of audio portions and outputting a single video portion, outputting a single audio portion and outputting a plurality of video portions, etc.).

Figure 27:
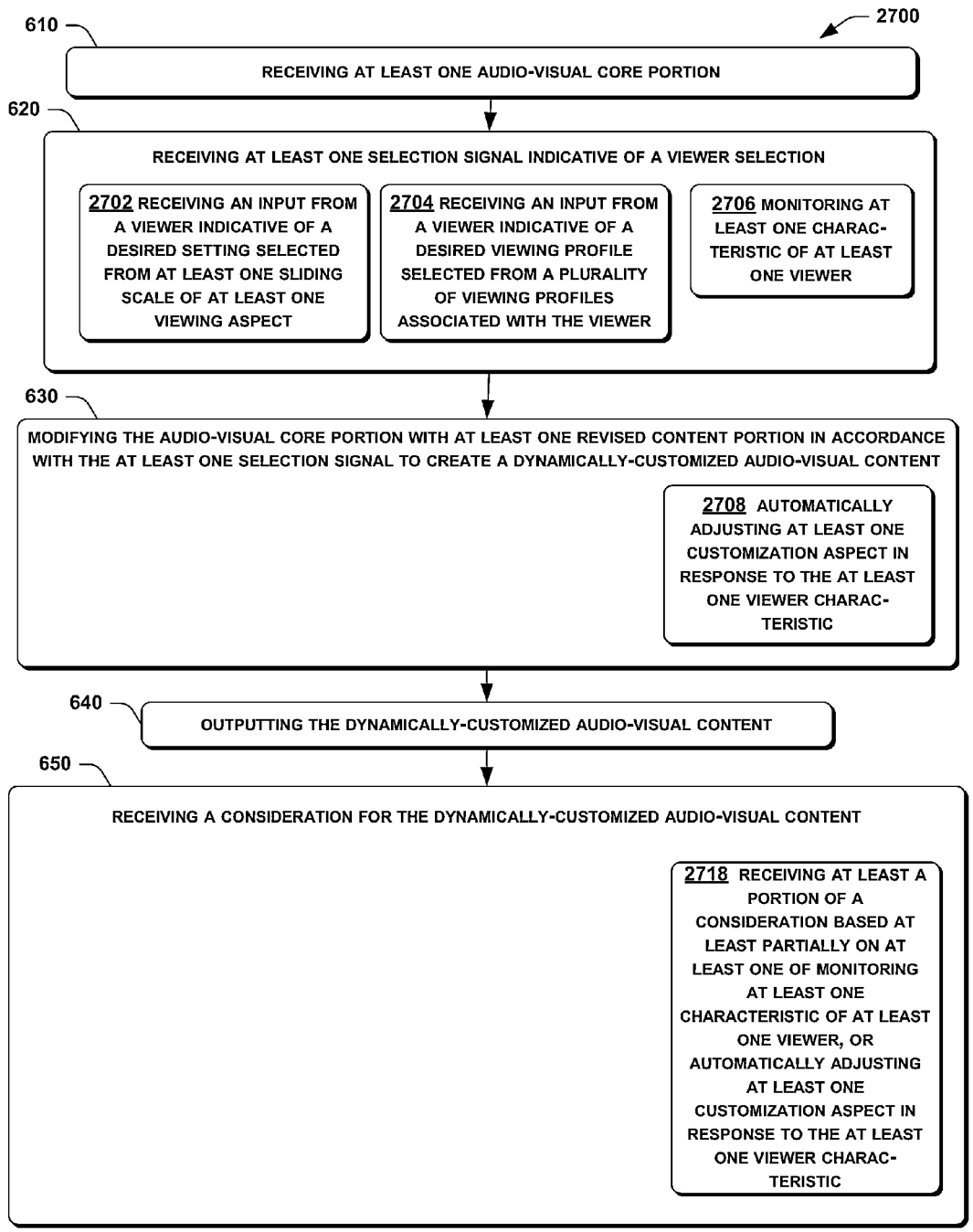
Figures 28, 29:
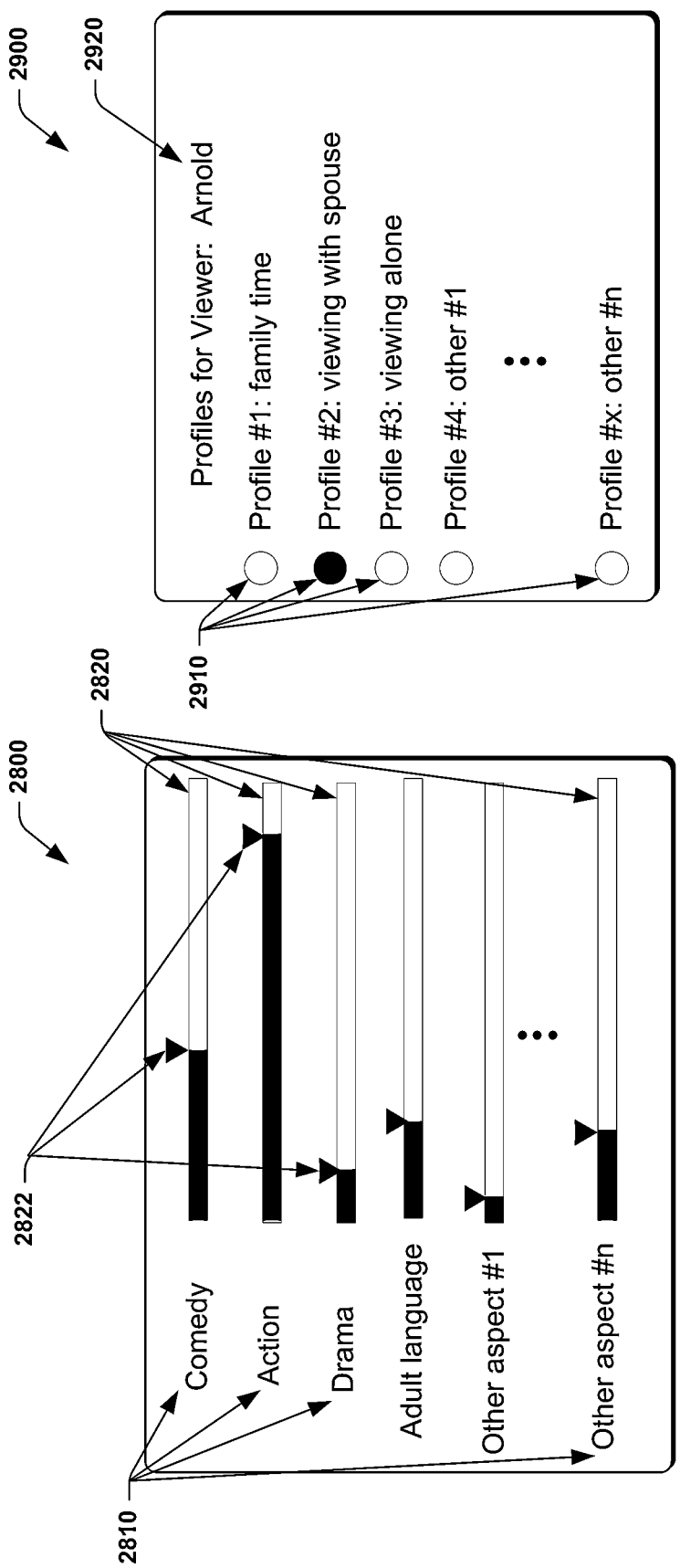

A variety of alternate embodiments of receiving at least one selection signal indicative of a viewer preference for dynamic customization of audio-visual content in accordance with the present disclosure may be conceived. For example, as shown in FIG. 27, in some implementations, receiving at least one selection signal indicative of a viewer preference at 620 may include receiving an input from a viewer indicative of a desired setting selected from at least one sliding scale of at least one viewing aspect at 2702. FIG. 28 shows one possible implementation of a user interface 2800 in accordance with the teachings of the present disclosure. In this implementation, the user interface 2800 displays a plurality of customization aspects 2810 having a corresponding plurality of sliding scales 2820 (e.g. comedy scale, action scale, drama scale, etc.). In operation, a viewer may position each selector 2822 associated with each sliding scale 2820 to indicate their desired preferences associated with each customization aspect 2810, resulting in a suitably customized audio-visual content.

Referring again to FIG. 27, in further implementations, receiving at least one selection signal indicative of a viewer preference at 620 may include receiving an input from a viewer indicative of a desired viewing profile selected from a plurality of viewing profiles associated with the viewer at 2704. For example, FIG. 29 shows one possible implementation of a user interface 2900 in accordance with the teachings of the present disclosure. In this implementation, the user interface 2900 displays a plurality of customization profiles 2910 (e.g. family time, viewing with spouse, viewing alone, etc.) associated with a particular viewer 2920 (e.g. "Arnold"). In operation, the particular viewer 2220 may select the desired profile 2910 depending upon who else (if anyone) may be present in the viewing area with the particular viewer 2920, resulting in a suitably customized audio-visual content.

In still other implementations, receiving at least one selection signal indicative of a viewer preference at 620 may include monitoring at least one characteristic of at least one viewer at 2706 (e.g. facial features, smile, frown, scowl, displeasure, interest, lack of interest, laughter, tears, fear, anxiety, sadness, disgust, shock, distaste, etc.), and modifying the audio-visual core portion with at least one revised content portion in accordance with the at least one selection signal to create a dynamically customized audio-visual content at 630 may include automatically adjusting at least one customization aspect in response to the at least one characteristic of the at least one viewer (e.g. increasing comedy aspects, reducing horror aspects, increasing dramatic aspects, reducing profanity aspects, etc.) at 1708. For example, in some implementations, a monitoring device (e.g. the sensor 250, Microsoft Kinect®, Nintendo Wii®, etc.) may sense facial features associated with displeasure at particular occurrences of profane dialogue, and may automatically reduce the amount of profanity contained in the dialogue. Alternately, the monitoring device may sense a higher-than-desired level of fear, and may automatically reduce the horror aspects of the dynamically customized audio-visual content so provide a desired level of fear to the viewer. receiving at least one selection signal indicative of a viewer preference.

With continued reference to FIG. 27, in further implementations, receiving a consideration for the dynamically-customized audio-visual content at 650 may include receiving at least a portion of a consideration based at least partially on at least one of monitoring at least one characteristic of at least one viewer, or automatically adjusting at least one customization aspect in response to the at least one characteristic of the at least one viewer (e.g. receiving payment for increasing comedy aspects, receiving payment for reducing horror aspects, receiving payment for increasing dramatic aspects, receiving payment for reducing profanity aspects, etc.) at 2718.

Figure 30:
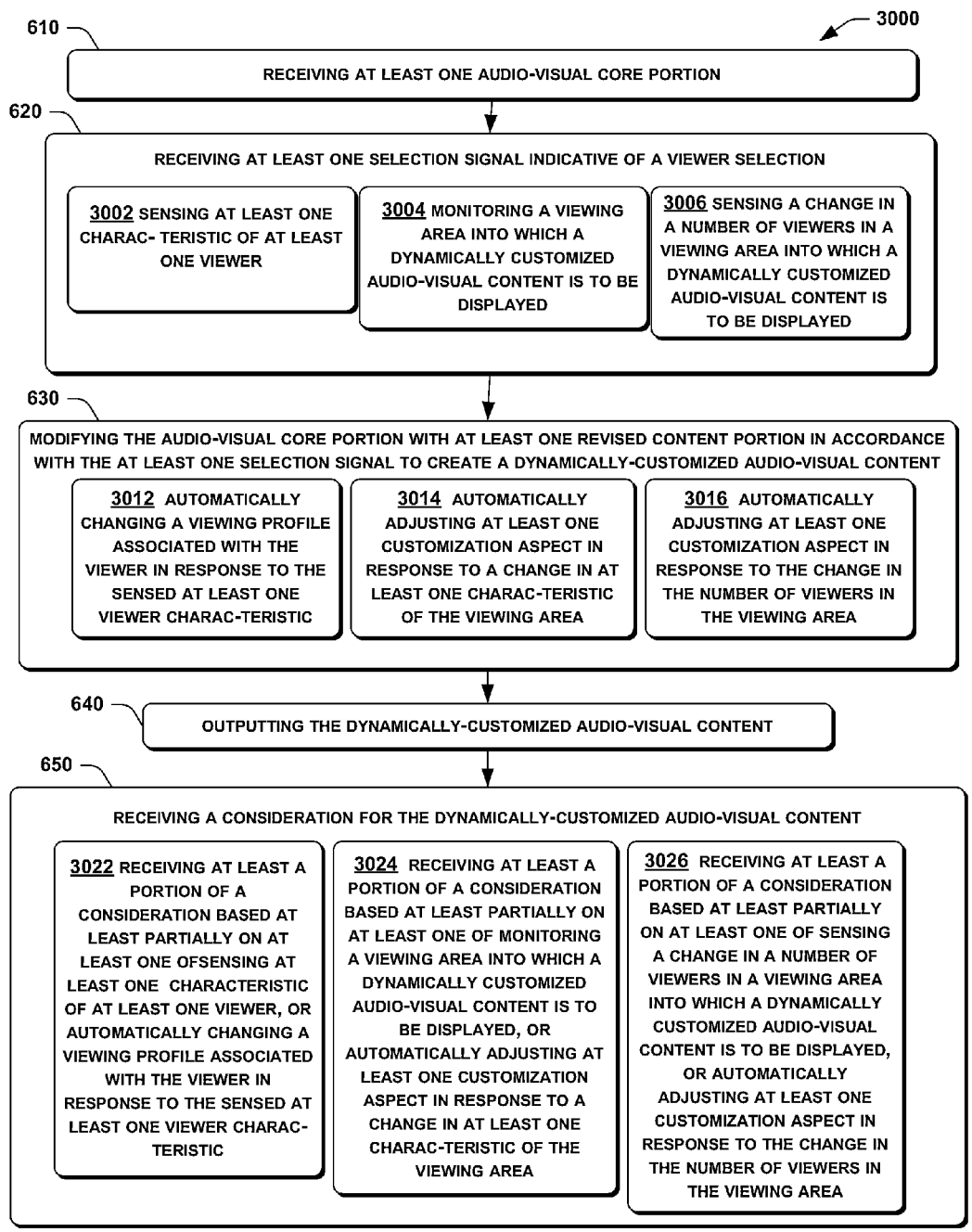

As shown in FIG. 30, in still further implementations, receiving at least one selection signal indicative of a viewer preference at 620 may include sensing at least one characteristic of at least one viewer at 3002, and modifying the audio-visual core portion with at least one revised content portion in accordance with the at least one selection signal to create a dynamically customized audio-visual content at 630 may include automatically changing a viewing profile associated with the viewer in response to the sensed at least one characteristic of the at least one viewer at 3012. For example, in some implementations, a sensing device (e.g. a Kinect® device, Nintendo Wii®, etc.) may sense interest from the viewer in particular occurrences of content being displayed (e.g. history-related content), and may automatically change from a first viewing profile (e.g. a profile that has increased emphasis on comedy) to a second viewing profile (e.g. a profile that has increased emphasis on historical topics or documentary topics). Alternately, the monitoring device may sense a higher-than-desired level of fear, and may automatically reduce the horror aspects of the dynamically customized audio-visual content so provide a desired level of fear to the viewer. receiving at least one selection signal indicative of a viewer preference receiving at least one selection signal indicative of a viewer preference With continued reference to FIG. 30, in other implementations, receiving at least one selection signal indicative of a viewer preference at 620 may include monitoring a viewing area into which a dynamically-customized audio-visual content is to be displayed at 3004, and modifying the audio-visual core portion with at least one revised content portion in accordance with the at least one selection signal to create a dynamically customized audio-visual content at 630 may include automatically adjusting at least one customization aspect in response to a change in at least one characteristic of the viewing area at 3014. For example, in some implementations, a monitoring device may sense that a less than desired amount of laughter is occurring in the viewing area (e.g. using pattern recognition techniques, etc.), and may automatically increase a comedy level of the dynamically customized audio-visual content. Alternately, the sensing device may sense that more than a desired level of screaming is occurring within the viewing area, and may automatically reduce a horror level of the dynamically customized audio-visual content.

In additional implementations, receiving at least one selection signal indicative of a viewer preference at 620 may include sensing a change in a number of viewers in a viewing area into which a dynamically-customized audio-visual content is to be displayed at 3006, and modifying the audio-visual core portion with at least one revised content portion in accordance with the at least one selection signal to create a dynamically customized audio-visual content at 630 may include automatically adjusting at least one customization aspect in response to a change in the number of viewers in the viewing area at 3016. For example, in some implementations, a monitoring device may sense that a viewer's spouse has entered the viewing area (e.g. using facial recognition techniques, body recognition techniques, voice recognition techniques, etc.), and may automatically change from a first viewing profile (e.g. a profile associated with "viewing alone") to a second viewing profile (e.g. a profile associated with "viewing with spouse"). Alternately, the sensing device may sense that a viewer's children have departed from the viewing area, and may automatically change from a family-oriented viewing profile to an individual-oriented viewing profile.

With continued reference to FIG. 30, in other implementations, receiving a consideration for the dynamically-customized audio-visual content at 650 may include receiving at least a portion of a consideration based at least partially on at least one of sensing at least one characteristic of at least one viewer, or automatically changing a viewing profile associated with the viewer in response to the sensed at least one characteristic of the at least one viewer at 3022. (e.g. receiving payment for sensing a viewer's emotion with a Kinect® device, and automatically changing from a first viewing profile to a second viewing profile that better fits the viewer's emotion). In further implementations, receiving a consideration for the dynamically-customized audio-visual content at 650 may include receiving at least a portion of a consideration based at least partially on at least one of monitoring a viewing area into which a dynamically-customized audio-visual content is to be displayed, or automatically adjusting at least one customization aspect in response to a change in at least one characteristic of the viewing area at 3024 (e.g. receiving payment for a monitoring device indicating that more than a desired level of screaming is occurring within the viewing area, and may automatically reduce a honor level of the dynamically customized audio-visual content).

In additional implementations, receiving a consideration for the dynamically-customized audio-visual content at 650 may include receiving at least a portion of a consideration based at least partially on at least one of sensing a change in a number of viewers in a viewing area into which a dynamically-customized audio-visual content is to be displayed, or automatically adjusting at least one customization aspect in response to a change in the number of viewers in the viewing area at 3016 (e.g. receiving payment for a monitoring device sensing that a viewer's spouse has entered the viewing area, and automatically changing from a "viewing alone" profile to a "viewing with spouse" profile, etc.).

Figure 31:
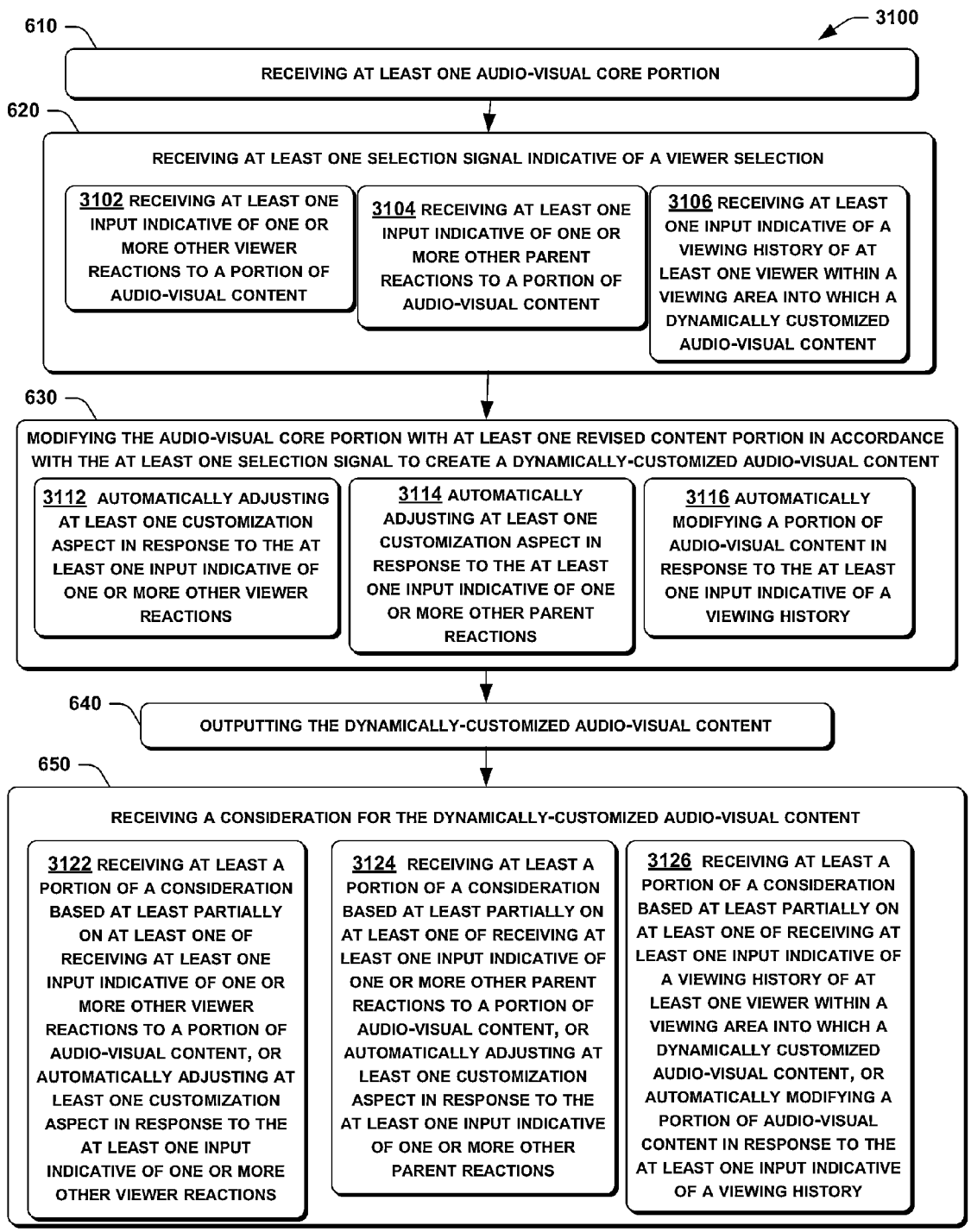

FIG. 31 shows additional embodiments of processes for dynamic customization of audio-visual content in accordance with the present disclosure. More specifically, in some implementations, receiving at least one selection signal indicative of a viewer preference at 620 may include receiving at least one input indicative of one or more other viewer reactions to a portion of audio-visual content at 3102, and modifying the audio-visual core portion with at least one revised content portion in accordance with the at least one selection signal to create a dynamically customized audio-visual content at 630 may include adjusting at least one customization aspect in response to the at least one input indicative of one or more other viewer reactions at 3112. For example, in some implementations, an input signal may be received (e.g. from a repository of information on viewer reactions, from a service that assesses viewer reactions, etc.) that indicates that other demographically-similar viewers (e.g. other viewers of same age, other viewers of same gender, other viewers of same ethnic heritage, etc.) reacted negatively to a particular portion of audio-visual content (e.g. a scene, a portion of dialogue, a visual image, etc.), and in response to the at least one input, automatically adjusting at least one customization aspect (e.g. deleting a scene, changing a dialogue, changing an actor ethnicity, etc.) of the dynamically customized audio-visual content.

In other implementations, receiving at least one selection signal indicative of a viewer preference at 620 may include receiving at least one input indicative of one or more other parent reactions to a portion of audio-visual content at 3104, and modifying the audio-visual core portion with at least one revised content portion in accordance with the at least one selection signal to create a dynamically customized audio-visual content at 630 may include modifying a portion of audio-visual content in response to the at least one input indicative of one or more other parent reactions at 3114. For example, in some implementations, an input may be received indicating that a majority of parents reacted negatively to a particular portion of audio-visual content (e.g. dialogue that includes profanity, scenes that include violent content, scenes that include adult situations, etc.), and in response to the at least one input, automatically modifying one or more aspects (e.g. deleting a scene, changing a dialogue, adjusting a clothing of actors, etc.) of the dynamically customized audio-visual content in response to the at least one input indicative of one or more other parent reactions.

In further implementations, receiving at least one selection signal indicative of a viewer preference at 620 may include receiving at least one input indicative of a viewing history of at least one viewer within a viewing area into which a dynamically customized audio-visual content is to be displayed at 3106, and modifying the audio-visual core portion with at least one revised content portion in accordance with the at least one selection signal to create a dynamically customized audio-visual content at 630 may include modifying a portion of audio-visual content in response to the at least one input indicative of a viewing history at 3116. For example, in some implementations, an input may be received indicating that a viewer has repeatedly changed a channel whenever a particular portion of audio-visual content has been displayed, and in response to the at least one input, the audio-visual core portion is automatically replacing the particular portion of audio-visual content with a replacement portion of content.

With continued reference to FIG. 31, in some implementations, receiving a consideration for the dynamically-customized audio-visual content at 650 may include receiving at least a portion of a consideration based at least partially on at least one of receiving at least one input indicative of one or more other viewer reactions to a portion of audio-visual content, or adjusting at least one customization aspect in response to the at least one input indicative of one or more other viewer reactions at 3122 (e.g. receiving a payment for receiving an input from a service that assesses viewer reactions, and modifying content based on other demographically-similar viewers, etc.). In other implementations, receiving a consideration for the dynamically-customized audio-visual content at 650 may include receiving at least a portion of a consideration based at least partially on at least one of receiving at least one input indicative of one or more other parent reactions to a portion of audio-visual content, or modifying a portion of audio-visual content in response to the at least one input indicative of one or more other parent reactions at 3124 (e.g. receiving a payment for receiving an input indicating that a majority of parents reacted negatively to a particular portion of audio-visual content, and automatically modifying one or more aspects of the content to improve parental satisfaction, etc.). In further implementations, receiving a consideration for the dynamically-customized audio-visual content at 650 may include receiving at least a portion of a consideration based at least partially on at least one of receiving at least one input indicative of a viewing history of at least one viewer within a viewing area into which a dynamically customized audio-visual content is to be displayed, or modifying a portion of audio-visual content in response to the at least one input indicative of a viewing history at 3126 (e.g. receiving a payment for determining that a viewer has repeatedly changed a channel whenever a particular actor has appeared, and automatically replacing the particular actor with a replacement actor based on the viewer's history).

Figure 32:
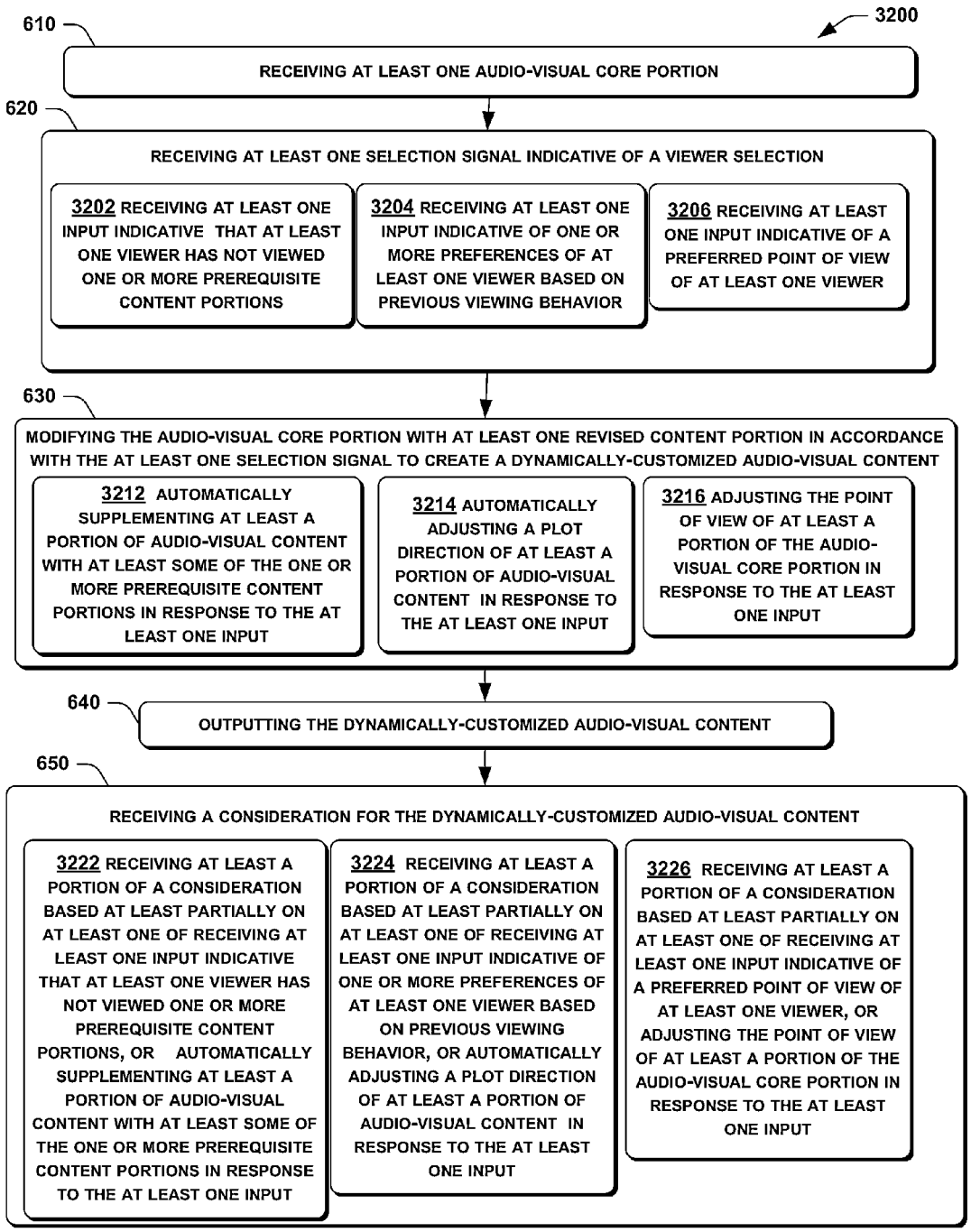

As shown in FIG. 32, in still further implementations, receiving at least one selection signal indicative of a viewer preference at 620 may include receiving at least one input indicative that at least one viewer has not viewed one or more prerequisite content portions at 3202, and modifying the audio-visual core portion with at least one revised content portion in accordance with the at least one selection signal to create a dynamically customized audio-visual content at 630 may include supplementing at least a portion of audio-visual content with at least some of the one or more prerequisite content portions in response to the at least one input at 3212. For example, in some implementations, an input may be received indicating that a viewer has missed previous episodes of a series, and in response to the at least one input, the audio-visual core portion is automatically supplemented with one or more scenes that provide essential plot points that the viewer will need to view in order to be brought up to speed for the upcoming episode.

In additional implementations, receiving at least one selection signal indicative of a viewer preference at 620 may include receiving at least one input indicative of one or more preferences of at least one viewer based on previous viewing behavior at 3204, and modifying the audio-visual core portion with at least one revised content portion in accordance with the at least one selection signal to create a dynamically customized audio-visual content at 630 may include automatically adjusting a plot direction of at least a portion of audio-visual content in response to the at least one input at 3214. For example, in some implementations, an input may be received indicating that a viewer prefers sad endings over happy endings, and in response to the at least one input, the audio-visual core portion is automatically modified to provide a plot direction that ends up with a sad ending rather than a happy ending.

In still other implementations, receiving at least one selection signal indicative of a viewer preference at 620 may include receiving at least one input indicative of a preferred point of view of at least one viewer at 3206, and modifying the audio-visual core portion with at least one revised content portion in accordance with the at least one selection signal to create a dynamically customized audio-visual content at 630 may include adjusting the point of view of at least a portion of the audio-visual core portion in response to the at least one input at 3216. For example, in some implementations, a viewer may manually select from a menu of available points of view (e.g. from a first person perspective of one of the characters, from a third party perspective, a top view, side view, etc.), and in response to the at least one input, the audio-visual core portion is automatically adjusted to show content from the selected perspective (e.g. a fight scene from the perspective of one of the fighters, etc.).

With continued reference to FIG. 32, in some implementations, receiving a consideration for the dynamically-customized audio-visual content at 650 may include receiving at least a portion of a consideration based at least partially on at least one of receiving at least one input indicative that at least one viewer has not viewed one or more prerequisite content portions, or supplementing at least a portion of audio-visual content with at least some of the one or more prerequisite content portions in response to the at least one input at 3222 (e.g. receiving payment for receiving an indication that a viewer has missed previous episodes of a series, and automatically supplementing the content with one or more scenes that provide essential plot points). In additional implementations, receiving a consideration for the dynamically-customized audio-visual content at 650 may include receiving at least a portion of a consideration based at least partially on at least one of receiving at least one input indicative of one or more preferences of at least one viewer based on previous viewing behavior, or automatically adjusting a plot direction of at least a portion of audio-visual content in response to the at least one input at 3224 (e.g. receiving payment for receiving an indication that a viewer prefers sad endings over happy endings, and automatically modifying the content to provide a plot direction that ends up with a sad ending rather than a happy ending). In still other implementations, receiving a consideration for the dynamically-customized audio-visual content at 650 may include receiving at least a portion of a consideration based at least partially on at least one of receiving at least one input indicative of a preferred point of view of at least one viewer, or adjusting the point of view of at least a portion of the audio-visual core portion in response to the at least one input at 3216 (e.g. receiving payment for receiving an indication that a viewer prefers viewing fighting scenes from a top view, and automatically adjusting a perspective of a fight scene accordingly).

Figure 33:
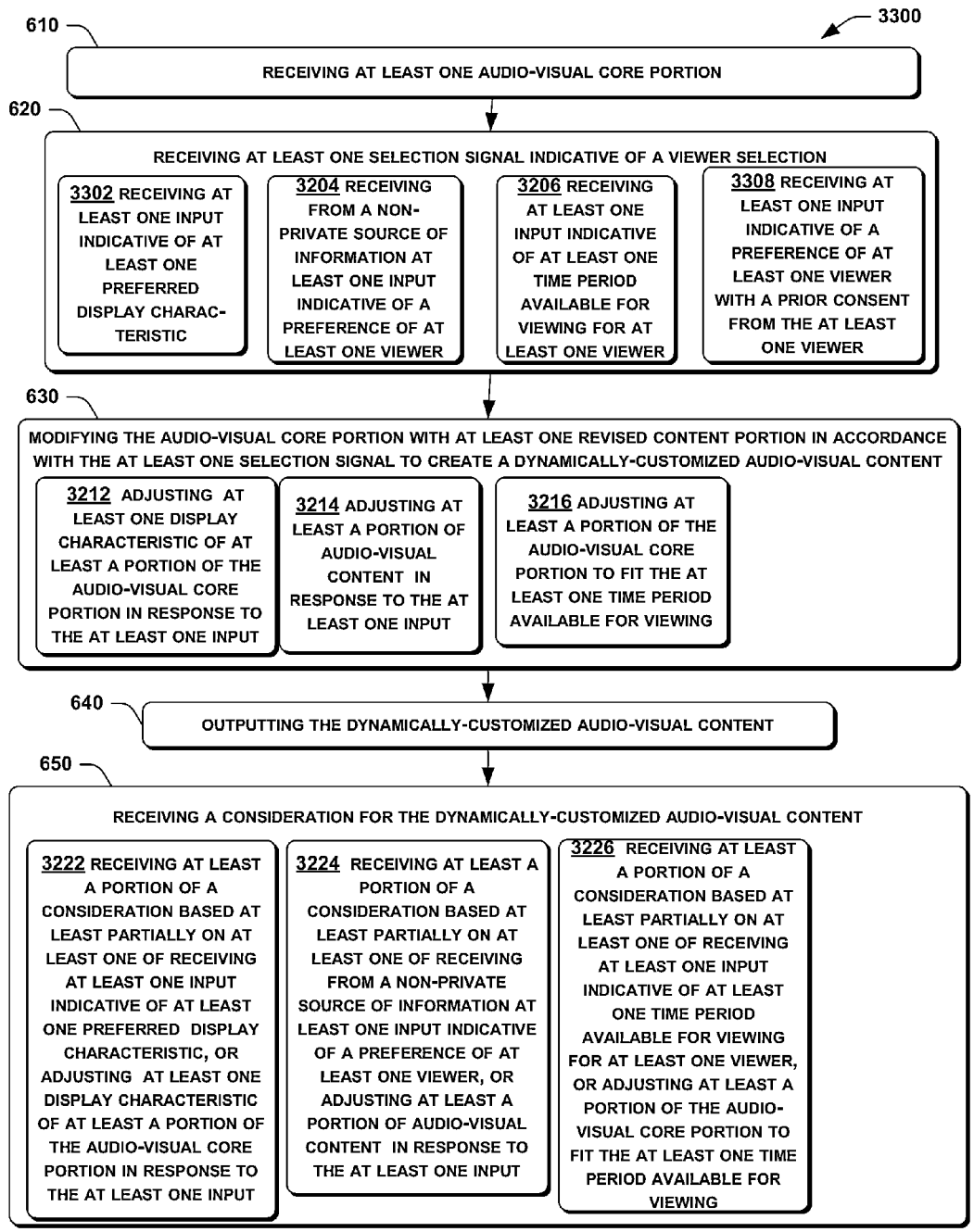

As shown in FIG. 33, in other implementations, receiving at least one selection signal indicative of a viewer preference at 620 may include receiving at least one input indicative of at least one preferred display characteristic at 3302, and modifying the audio-visual core portion with at least one revised content portion in accordance with the at least one selection signal to create a dynamically customized audio-visual content at 630 may include adjusting at least one display characteristic of at least a portion of the audio-visual core portion in response to the at least one input at 3312. For example, in some implementations, an input may be received that indicates a display characteristic suitable to a particular viewing environment (e.g. a brightness, a contrast, a volume level, an outdoor viewing environment, etc.) or suitable to a particular viewing device (e.g. an aspect ratio, a display resolution value, a screen size, etc.), and the audio-visual core portion may be adjusted to be optimally displayed in accordance with the display characteristic.

In additional implementations, receiving at least one selection signal indicative of a viewer preference at 620 may include receiving from a non-private source of information at least one input indicative of a preference of at least one viewer at 3204 (e.g. receiving an input from a viewer's public blog indicating a preference, receiving an input from a viewer's public information placed on a social networking site indicating a preference, etc.), and modifying the audio-visual core portion with at least one revised content portion in accordance with the at least one selection signal to create a dynamically customized audio-visual content at 630 may include adjusting at least a portion of the audio-visual core portion in response to the at least one input at 3214.

In yet other implementations, receiving at least one selection signal indicative of a viewer preference at 620 may include receiving at least one input indicative of a time period available for viewing for at least one viewer at 3206 (e.g. receiving a manual input from a viewer, reading a viewer's calendar or scheduling software, etc.), and modifying the audio-visual core portion with at least one revised content portion in accordance with the at least one selection signal to create a dynamically customized audio-visual content at 630 may include adjusting at least one a portion of the audio-visual core portion to fit the at least one time period available for viewing at 3216 (e.g. omitting a non-essential portion of the audio-visual core portion, etc.). In still other implementations, receiving at least one selection signal indicative of a viewer preference at 620 may include receiving at least one input indicative of a preference of at least one viewer with a prior consent from the at least one viewer at 3208 (e.g. receiving an input indicating a preference after a viewer "opts in").

With continued reference to FIG. 33, in some implementations, receiving a consideration for the dynamically-customized audio-visual content at 650 may include receiving at least a portion of a consideration based at least partially on at least one of receiving at least one input indicative of at least one preferred display characteristic, or adjusting at least one display characteristic of at least a portion of the audio-visual core portion in response to the at least one input at 3322. In additional implementations, receiving a consideration for the dynamically-customized audio-visual content at 650 may include receiving at least a portion of a consideration based at least partially on at least one of receiving from a non-private source of information at least one input indicative of a preference of at least one viewer, or adjusting at least a portion of the audio-visual core portion in response to the at least one input at 3224. In yet other implementations, receiving a consideration for the dynamically-customized audio-visual content at 650 may include receiving at least a portion of a consideration based at least partially on at least one of receiving at least one input indicative of a time period available for viewing for at least one viewer, or adjusting at least one a portion of the audio-visual core portion to fit the at least one time period available for viewing at 3226.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A system for providing audio-visual content, comprising:
   a device configured to be operatively positioned proximate to a display and to be operatively coupled to the display, the device including a processor and a memory configured with one or more instructions that, when executed by the processor, configure the processor to provide at least:
   circuitry for receiving at least one audio-visual core portion at the device configured to be operatively positioned proximate to the display;
   circuitry for determining at least one selection signal indicative of a viewer preference without requiring a viewing area into which a dynamically-customized audio-visual content is to be displayed for presence of at least one viewer, the circuitry for determining at least one selection signal indicative of a viewer preference being based at least partially on:
      determining information received from a memory of a communication device associated with the at least one viewer present within the viewing area, the information including at least one of an online shopping characteristic or a browsing history characteristic;
      determining, based at least partially on the information, at least one similar viewer having at least one similarity to the at least one viewer; and
      determining the at least one selection signal based on at least one indication of a reaction by the at least one similar viewer determined based at least partially on the information including at least one of the online shopping characteristic or the browsing history characteristic;
   circuitry for modifying the audio-visual core portion, at the device configured to be operatively positioned proximate to the display, with at least one revised content portion in accordance with the at least one selection signal to create the dynamically customized audio-visual content, including at least:
      circuitry for automatically adjusting at least one customization aspect in response to the information received from the memory of the communication device associated with the at least one viewer within the viewing area; and
      circuitry for modifying the audio-visual core portion with at least one revised content portion, the at least one revised content portion including at least one of a revised facial appearance of an actor, a revised voice of an actor, a revised movement of an actor, a revised story-line, or a revised plot direction of at least one of a movie, a sitcom, or a story-related content within the audio-visual core portion;

circuitry for outputting the dynamically-customized audio-visual content for display within the viewing area; and circuitry for facilitating a payment based on the modifying of the audio-visual core portion in accordance with the at least one selection signal based on the at least one indication of the reaction by the at least one similar viewer determined based at least partially on the information including at least one of the online shopping characteristic or the browsing history characteristic received from the memory of the communication device.

2. The system of claim 1, wherein circuitry for modifying the audio-visual core portion with at least one revised content portion in accordance with the at least one selection signal to create a dynamically customized audio-visual content comprises:
at least one of:
circuitry for replacing at least one actor of the audio-visual core portion with at least one replacement actor;
circuitry for replacing one or more of a facial appearance, a voice, a body appearance, or an apparel with a corresponding one or more of a replacement facial appearance, a replacement voice, a replacement body appearance, or a replacement apparel;
circuitry for replacing at least one of a setting aspect, an environmental aspect, or a background aspect of the audio-visual core portion with a corresponding at least one of a replacement setting aspect, a replacement environmental aspect, or a replacement background aspect;
circuitry for receiving an input from a viewer indicative of a desired setting selected from at least one sliding scale of at least one viewing aspect; or
circuitry for replacing at least a city in which at least one scene is set without requiring interaction by the at least one viewer.

3. The system of claim 1, wherein circuitry for modifying the audio-visual core portion with at least one revised content portion in accordance with the at least one selection signal to create a dynamically customized audio-visual content comprises:
circuitry for replacing one or more audible portions with one or more replacement audible portions; and
circuitry for modifying one or more body movements corresponding to the one or more audible portions with one or more replacement body movements corresponding to the one or more replacement audible portions.

4. The system of claim 1, wherein circuitry for determining at least one selection signal indicative of a viewer preference comprises:
circuitry for determining a selection signal indicative of a geographic location of at least one viewer; and
wherein circuitry for modifying the audio-visual core portion with at least one revised content portion in accordance with the at least one selection signal to create a dynamically customized audio-visual content comprises:
circuitry for at least one of replacing a portion considered inappropriate with respect to the geographic location of the at least one viewer with a replacement portion considered appropriate with respect to the geographic location of the at least one viewer, or omitting the inappropriate portion.

5. The system of claim 1, wherein circuitry for determining at least one selection signal indicative of a viewer preference comprises:
circuitry for determining a selection signal of a cultural identity of at least one viewer; and
wherein circuitry for modifying the audio-visual core portion with at least one revised content portion in accordance with the at least one selection signal to create a dynamically customized audio-visual content comprises:
circuitry for at least one of replacing at least a portion of content inappropriate for the cultural identity of the at least one viewer with an appropriate portion of content, or omitting the inappropriate portion.

6. The system of claim 1, wherein circuitry for modifying the audio-visual core portion with at least one revised content portion in accordance with the at least one selection signal to create a dynamically customized audio-visual content comprises:
circuitry for determining a plurality of pixels of at least one digital image that are to be adjusted based on at least a portion of a speaker changing from speaking a first dialogue portion to a second dialogue portion; and
circuitry for altering one or more light intensities of at least some of the plurality of pixels to adjust the at least one digital image to depict the at least a portion of the speaker speaking the second dialogue portion.

7. The system of claim 1, wherein circuitry for modifying the audio-visual core portion with at least one revised content portion within the audio-visual core portion in accordance with the at least one selection signal to create a dynamically customized audio-visual content comprises:
circuitry for replacing a portion of the audio-visual core portion with a replacement audio-visual portion based on a selection of at least one of an alternative story line or an alternative plot, the selection being at least partially based on the at least one selection signal.

8. The system of claim 1, wherein circuitry for determining at least one selection signal indicative of a viewer preference comprises:
circuitry for monitoring at least one characteristic of at least one viewer; and
wherein circuitry for modifying the audio-visual core portion with at least one revised content portion within the audio-visual core portion in accordance with the at least one selection signal to create a dynamically customized audio-visual content comprises:
circuitry for automatically adjusting at least one customization aspect in response to the at least one characteristic of the at least one viewer.

9. The system of claim 1, wherein determining information received from a memory of a device associated with the at least one viewer present within the viewing area, the information including at least one of an online shopping characteristic or a browsing history characteristic comprises:
determining at least one online shopping characteristic of the at least one viewer based at least partially on a content of a memory of at least one electronic device associated with the at least one viewer; and
wherein circuitry for modifying the audio-visual core portion with at least one revised content portion within the audio-visual core portion in accordance with the at least one selection signal to create a dynamically customized audio-visual content comprises:

circuitry for automatically adjusting an audio characteristic of the at least one revised content portion in response to the determined at least one online shopping characteristic of the viewer based at least partially on the at least one online shopping characteristic of the at least one viewer.

10. The system of claim 1, wherein circuitry for determining at least one selection signal indicative of a viewer preference comprises:
   circuitry for detecting one or more actions of at least one viewer associated with at least one electronic device associated with the at least one viewer; and
   wherein circuitry for modifying the audio-visual core portion with at least one revised content portion in accordance with the at least one selection signal to create a dynamically customized audio-visual content comprises:
   circuitry for automatically adjusting at least one customization aspect in response to the detecting one or more actions of at least one viewer associated with at least one electronic device associated with the at least one viewer.

11. The system of claim 1, wherein circuitry for determining at least one selection signal indicative of a viewer preference comprises:
   circuitry for determining at least one input indicative of a viewing history of at least one viewer within a viewing area into which a dynamically customized audio-visual content is to be displayed; and
   wherein circuitry for modifying the audio-visual core portion with at least one revised content portion in accordance with the at least one selection signal to create a dynamically customized audio-visual content comprises:
   circuitry for modifying a portion of audio-visual content in response to the at least one input indicative of a viewing history.

12. The system of claim 1, wherein circuitry for determining at least one selection signal indicative of a viewer preference comprises:
   circuitry for determining at least one input indicative that at least one viewer has not viewed one or more prerequisite content portions; and
   wherein circuitry for modifying the audio-visual core portion with at least one revised content portion in accordance with the at least one selection signal to create a dynamically customized audio-visual content comprises:
   circuitry for supplementing at least a portion of audio-visual content with at least some of the one or more prerequisite content portions in response to the at least one input.

13. The system of claim 1, wherein circuitry for determining at least one selection signal indicative of a viewer preference comprises:
   circuitry for determining at least one input indicative of one or more preferences of at least one viewer based on previous viewing behavior; and
   wherein circuitry for modifying the audio-visual core portion with at least one revised content portion in accordance with the at least one selection signal to create a dynamically customized audio-visual content comprises:
   circuitry for automatically adjusting a plot direction of at least a portion of audio-visual content in response to the at least one input.

14. The system of claim 1, wherein circuitry for determining at least one selection signal indicative of a viewer preference comprises:
   circuitry for determining at least one input indicative of a preferred viewing perspective of at least one viewer; and
   wherein circuitry for modifying the audio-visual core portion with at least one revised content portion in accordance with the at least one selection signal to create a dynamically customized audio-visual content comprises:
   circuitry for adjusting the viewing perspective of at least a portion of the audio-visual core portion in response to the at least one input.

15. The system of claim 1, wherein circuitry for determining at least one selection signal indicative of a viewer preference comprises:
   circuitry for determining from a non-private source of information at least one input indicative of a preference of at least one viewer; and
   wherein circuitry for modifying the audio-visual core portion with at least one revised content portion in accordance with the at least one selection signal to create a dynamically customized audio-visual content comprises:
   circuitry for adjusting at least a portion of the audio-visual core portion in response to the at least one input.

16. The system of claim 1, wherein determining information received from a memory of a communication device associated with the at least one viewer present within the viewing area, the information including at least one of an online shopping characteristic or a browsing history characteristic comprises:
   determining information received from a memory of a communication device, including information from at least one of calendar or scheduling software, indicative of a time period available for viewing for at least one viewer; and
   wherein circuitry for modifying the audio-visual core portion, at the device configured to operatively positioned proximate to the display, with at least one revised content portion in accordance with the at least one selection signal to create a dynamically customized audio-visual content comprises:
   circuitry for automatically adjusting at least one a portion of the audio-visual core portion, at the device configured to be operatively positioned proximate to the display, to fit the at least one time period available for viewing based on the information received from the memory of the communication device, including information from at least one of calendar or scheduling software, indicative of the time period available for viewing for at least one viewer.

17. The system of claim 1, wherein determining information receiving from a memory of a device associated with the at least one viewer present within the viewing area, the information including at least one of an online shopping characteristic or a browsing history characteristic comprises:
   determining information received from a memory of at least one portable communication device associated with the at least one viewer present within the viewing area, the at least one portable communication device being present within the viewing area simultaneously with the at least one viewer.

18. The system of claim 1, wherein determining information received from a memory of a device associated with the at least one viewer present within the viewing area comprises:
   determining information received from a memory of at least one portable communication device associated with the at least one viewer present within the viewing area without regard to an identity of the at least one viewer, the at least one portable communication device being present within the viewing area simultaneously with the at least one viewer.

19. The system of claim 1, wherein determining information received from a memory of a device associated with the at least one viewer present within the viewing area, the information including at least one of an online shopping characteristic or a browsing history characteristic comprises:
   determining information received from a memory of at least one portable communication device associated with the at least one viewer present within the viewing area, the at least one portable communication device being present within the viewing area simultaneously with the at least one viewer, the information being indicative of at least one online purchase associated with the at least one viewer.

20. The system of claim 1, wherein determining information received from a memory of a device associated with the at least one viewer present within the viewing area, the information including at least one of an online shopping characteristic or a browsing history characteristic comprises:
   determining information received from a memory of at least one portable communication device associated with the at least one viewer present within the viewing area, the at least one portable communication device being present within the viewing area simultaneously with the at least one viewer, the information being indicative of at least one online browsing activity associated with the at least one viewer.

21. The system of claim 1, wherein circuitry for modifying the audio-visual core portion with at least one revised content portion in accordance with the at least one selection signal to create a dynamically customized audio-visual content comprises:
   circuitry for replacing at least a landscape in which at least one scene is set without requiring interaction by the at least one viewer.

22. The system of claim 1, wherein circuitry for modifying the audio-visual core portion with at least one revised content portion in accordance with the at least one selection signal to create a dynamically customized audio-visual content comprises:
   circuitry for replacing at least a weather condition in which at least one scene is set.

23. The system of claim 1, wherein circuitry for modifying the audio-visual core portion with at least one revised content portion in accordance with the at least one selection to create a dynamically customized audio-visual content comprises:
   circuitry for replacing a portion considered inappropriate with respect to a cultural heritage of the at least one viewer with a replacement portion considered appropriate with respect to the cultural heritage of the at least one viewer.

24. The system of claim 1, wherein circuitry for modifying the audio-visual core portion with at least one revised content portion in accordance with the at least one selection signal to create a dynamically customized audio-visual content comprises:
   circuitry for modifying the audio-visual core portion with at least one revised content portion in accordance with the at least one selection signal to create a dynamically customized audio-visual content without requiring interaction by the at least one viewer and without regard to an identity of the at least one viewer.

25. The system of claim 1, wherein the information determined from the memory of the communication device further includes at least an indication of a subscription to a customization service, and wherein the payment comprises a payment in accordance with the indication of the subscription to the customization service.

26. The system of claim 1, wherein the information determined from the memory of the communication device further includes at least an indication grant of access to personal data, and wherein the payment comprises a payment in accordance with the indication of the grant of access to personal data.

27. The system of claim 1, wherein the payment includes at least one of a payment, a promise to pay, a promise to perform a deed, a grant of a right, a one-time payment, a subscription payment, a use-based payment, or an on-demand type of payment.

28. The system of claim 1, wherein the payment includes at least one of a grant of access to gather personal data, a grant to share data gathered, a grant of access private information, a grant to perform market testing, or a grant to perform market analysis.

29. A system for providing audio-visual content, comprising:
   a device configured to be operatively positioned proximate to a display and to be operatively coupled to the display, the device including a processor and a memory configured with one or more instructions that, when executed by the processor, configure the processor to provide at least:
   means for receiving at least one audio-visual core portion at the device configured to be operatively positioned proximate to the display;
   means for determining at least one selection signal indicative of a viewer preference without requiring interaction by the at least one viewer, including at least means for monitoring a viewing area into which a dynamically-customized audio-visual content is to be displayed for presence of at least one viewer, the means for determining at least one selection signal indicative of a viewer preference being based at least partially on:
      determining information received from a memory of a communication device associated with the at least one viewer present within the viewing area, the information including at least one of an online shopping characteristic or a browsing history characteristic;
      determining, based at least partially on the information, at least one similar viewer having at least one similarity to the at least one viewer; and
      determining the at least one selection signal based on at least one indication of a reaction by the at least one similar viewer determined based at least partially on the information including at least one of the online shopping characteristic or the browsing history characteristic;
   means for modifying the audio-visual core portion, at the device configured to be operatively positioned proximate to the display, with at least one revised content portion in accordance with the at least one selection signal to create the dynamically customized audio-visual content, including at least:
  means for automatically adjusting at least one customization aspect in response to the information received from the memory of the communication device associated with the at least one viewer within the viewing area; and
  means for modifying the audio-visual core portion including at least one revised content portion the at least one revised content portion including at least one of a revised facial appearance of an actor, a revised voice of an actor, a revised movement of an actor, a revised story-line, or a revised plot direction of at least one of a movie, a sitcom, or a story-related content within the audio-visual core portion;
means for outputting the dynamically-customized audio-visual content for display within the viewing area; and
means for facilitating a payment based on the modifying of the audio-visual core portion in accordance with the at least one selection signal based on the at least one indication of the reaction by the at least one similar viewer determined based at least partially on the information including at least one of the online shopping characteristic or the browsing history characteristic received from the memory of the communication device.

30. One or more non-transitory computer-readable media comprising:
  one or more instructions for receiving at least one audio-visual core portion at a device configured to be operatively positioned proximate to a display, the device including a processor configurable with one or more instructions, the at least one audio-visual core portion including at least one of a movie, a sitcom, or a story-related content;
  one or more instructions for determining at least one selection signal indicative of a viewer preference without requiring interaction by the at least one viewer, including at least one or more instructions for monitoring a viewing area into which a dynamically-customized audio-visual content is to be displayed for presence of at least one electronic device associated with at least one viewer, the one or more instructions for determining at least one selection signal indicative of a viewer preference being based at least partially on:
    determining information received from a memory of a communication device associated with the at least one viewer present within the viewing area, the information including at least one of an online shopping characteristic or a browsing history characteristic;
    determining, based at least partially on the information, at least one similar viewer having at least one similarity to the at least one viewer; and
    determining the at least one selection signal based on at least one indication of a reaction by the at least one similar viewer determined based at least partially on the information including at least one of the online shopping characteristic or the browsing history characteristic;
  one or more instructions for modifying the audio-visual core portion, at the device configured to be operatively positioned proximate to the display, with at least one revised content portion in accordance with the at least one selection signal to create a dynamically customized audio-visual content, including at least;
    one or more instructions for automatically adjusting at least one customization aspect in response to the information received from the memory of the communication device associated with the at least one viewer within the viewing area; and
    one or more instructions for modifying the audio-visual core portion, the at least one revised content portion including at least one of a revised facial appearance of an actor, a revised voice of an actor, a revised movement of an actor, a revised story-line, or a revised plot direction of at least one of a movie, a sitcom, or a story-related content within the audio-visual core portion;
  one or more instructions for outputting the dynamically-customized audio-visual content for display within the viewing area; and
  one or more instructions for facilitating a payment based on the modifying of the audio-visual core portion in accordance with the at least one selection signal based on the at least one indication of the reaction by the at least one similar viewer determined based at least partially on the information including at least one of the online shopping characteristic or the browsing history characteristic received from the memory of the communication device.

* * * * *

UNITED STATES PATENT AND TRADEMARK OFFICE
CERTIFICATE OF CORRECTION

PATENT NO. : 10,455,284 B2
APPLICATION NO. : 13/602058
DATED : October 22, 2019
INVENTOR(S) : Daniel A. Gerrity et al.

Page 1 of 1

It is certified that error appears in the above-identified patent and that said Letters Patent is hereby corrected as shown below:

In the Claims

Please replace Column 44, Lines 33-34, Claim 1:
". . .without requiring a viewing area into which. . ."
With:
--without requiring interaction by the at least one viewer, including at least circuitry for monitoring a viewing area into which--

Please replace Column 48, Line 42, Claim 16:
". . .at the device configured to operatively positioned. . ."
With:
--at the device configured to be operatively positioned--

Please replace Column 48, Line 47, Claim 16:
". . .adjusting at least one a portion"
With:
--adjusting at least one of a portion--

Signed and Sealed this
Tenth Day of December, 2019

Andrei Iancu
*Director of the United States Patent and Trademark Office*